(12) United States Patent
Yoakum

(10) Patent No.: US 10,250,848 B2
(45) Date of Patent: Apr. 2, 2019

(54) POSITIONAL CONTROLLED MUTING

(71) Applicant: Avaya Inc., Santa Clara, CA (US)

(72) Inventor: John H. Yoakum, Cary, NC (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/173,350

(22) Filed: Jun. 3, 2016

(65) Prior Publication Data

US 2017/0353694 A1    Dec. 7, 2017

(51) Int. Cl.
*H04N 7/15* (2006.01)
*G06F 3/16* (2006.01)
*H04M 3/56* (2006.01)
*H04M 7/00* (2006.01)

(52) U.S. Cl.
CPC ............... *H04N 7/15* (2013.01); *G06F 3/165* (2013.01); *H04M 3/566* (2013.01); *H04M 7/0027* (2013.01)

(58) Field of Classification Search
CPC combination set(s) only.
See application file for complete search history.

(56) References Cited

U.S. PATENT DOCUMENTS

| | | | |
|---|---|---|---|
| 2007/0294346 A1* | 12/2007 | Moore | H04L 63/065 709/204 |
| 2008/0160977 A1* | 7/2008 | Ahmaniemi | H04L 12/1822 455/416 |
| 2012/0060668 A1* | 3/2012 | Lengeling | G10H 1/42 84/645 |
| 2012/0128146 A1* | 5/2012 | Boss | H04M 3/56 379/202.01 |
| 2012/0140681 A1* | 6/2012 | Kaminsky | H04L 12/1822 370/261 |
| 2012/0166534 A1* | 6/2012 | Bentley | H04L 12/1822 709/204 |
| 2016/0142674 A1* | 5/2016 | Travis | H04N 7/15 348/14.07 |
| 2016/0285921 A1* | 9/2016 | Savostiyanov | H04L 65/4038 |
| 2016/0344780 A1* | 11/2016 | Kay | H04M 3/568 |

* cited by examiner

*Primary Examiner* — Duc Nguyen
*Assistant Examiner* — Assad Mohammed
(74) *Attorney, Agent, or Firm* — Sheridan Ross P.C.

(57) ABSTRACT

Systems and methods for controlling the privileges of participants in a multiparty interaction are described, wherein participants in the multiparty interaction are distributed among a plurality of areas, each area having different privileges, and further wherein a participant may obtain the privileges of another area by moving to the other area.

20 Claims, 18 Drawing Sheets

POSITIONAL CONTROLLED MUTING

FIELD

The present disclosure is generally related to virtual multiparty interactions, and more specifically to systems and methods for facilitating virtual multiparty interactions.

BACKGROUND

Advances in hardware, software, and networking have contributed to the increasing popularity of online meetings. Whereas in decades past individuals who wanted to meet together needed to travel to a single location for an in-person meeting, today virtual meetings occur on a regular basis, allowing meeting participants to engage with other meeting participants from the comfort of their respective homes or offices, using readily available hardware and software to share audio, video, and data communications across one or more networks.

BRIEF DESCRIPTION OF THE DRAWINGS

In the drawings, like reference characters generally refer to like figures and structural elements throughout the various figures. The following drawings are illustrative of embodiments of the disclosure and are not meant to limit the scope of claims.

DETAILED DESCRIPTION

Figure 1:
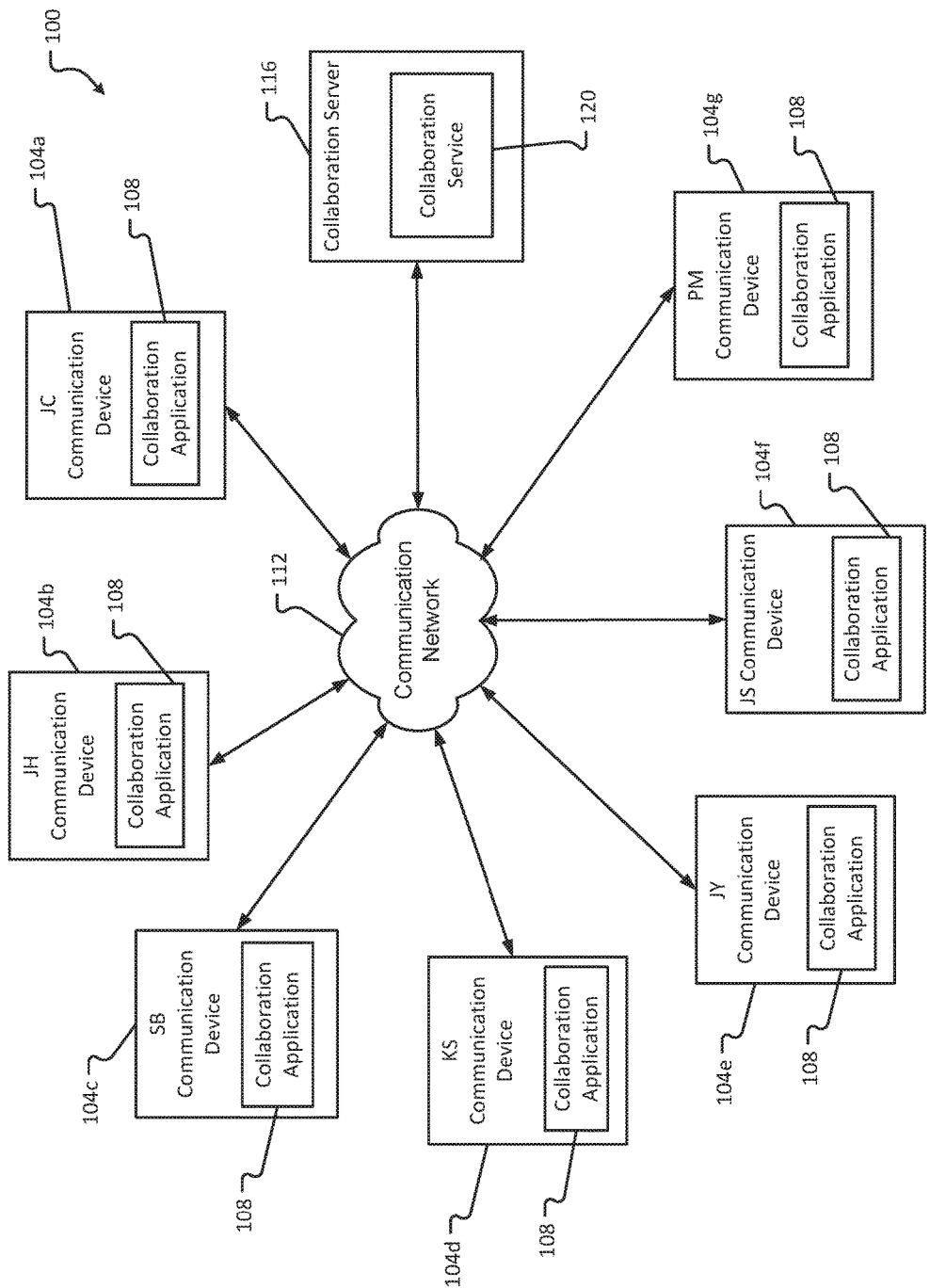
FIG. 1 is a diagram of a system for virtual multiparty interaction according to some embodiments of the present disclosure.

The terms "memory," "computer memory," and "computer-readable medium," as used herein, refer to any tangible data storage medium that participates in providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, an EEPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations and aspects of the present disclosure are stored.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The terms "a" or "an" are not intended to impose a limitation as to number. For example, "a" or "an" when used with respect to an entity refer to one or more of that entity. As such, the terms "a" (or "an"), "one or more" and "at least one" can be used interchangeably herein. It is also to be noted that the terms "comprising," "including," and "having" can be used interchangeably. The use of "comprising," "including," or "having" and variations thereof herein is meant to encompass the items listed thereafter and equivalents thereof as well as additional items.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C. § 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The term "select," as used herein with respect to an icon, tool, or other digital item, refers to tapping (e.g. with a finger or stylus), touching (e.g. with a finger or stylus), and/or clicking on (e.g. with a computer mouse, trackball, touchpad, or trackpad) the icon, tool, or other digital item. Selecting is intended to be an inclusive term that encompasses the foregoing options and any other suitable method of selecting a digital item.

The term "communication device" as used herein refers to any device that may be used to connect a participant to a virtual multiparty interaction, and may include any device having a processor, an interface for sending and receiving electronic communications, and a graphical user interface. Examples of communication devices include desktop computers, laptop computers, smart phones, and tablets.

A "computing device" may be any device that includes a processor, a memory or other computer readable storage medium storing instructions for execution by the processor, and at least one interface.

The term "media signals" may refer to audio signals, video signals, data signals, or any combination thereof.

Examples provided throughout the present disclosure (which may be, but need not be, denoted with "for example," "by way of example," "e.g.," or any other term or phrase suggesting that an example is being or will be described) are intended to illustrate one or more embodiments of the present disclosure, and are not given by way of limitation.

When people are interacting in electronic or virtual multiparty conferences or collaborations (also referred to herein as interactions or multiparty interactions) via communication devices, it is important for conference participants who are not actively speaking to have the audio input of their respective communication devices muted, as background noise is often very distractive to others. Interaction participants are constantly having to manually manage mute functions of their respective communication devices, and often fail to mute and unmute at the right time. To be highly effective and simple to use, multiparty interaction environments need automated ways to dynamically handle muting, especially of audio but in some situations of video as well.

This disclosure facilitates muting automation based upon characteristics of the interaction environment (also referred to herein as a multiparty interaction space, an interaction workspace, and a collaboration workspace) of a multiparty interaction, and further based on the movements of participants within the environment. Embodiments of the present disclosure use unique characteristics and configurations of a visually illustrated interaction environment to dynamically control participant muting characteristics as they participate in the environment.

The present disclosure describes a system, method, and apparatus for enabling naturally coordinated interactions in an organized multiparty interaction space. Participant icons are arranged into two or more areas, including an audience area and a presentation area or stage. The active presenter is in the presentation stage and may be displayed as live video with unmuted audio. Participants congregate in the audience area and may be represented as icons, still images, or live video images as they desire; however their audio is muted.

According to some embodiments of the present disclosure, an interaction workspace displayed on a graphical user interface of a communication device for use in a multiparty interaction may be divided into two or more areas each, with different interaction audio and/or video muting characteristics, where muting characteristics can be relative and different in relation to participants in the area itself or in relation to other areas. All participants in a specific area can have a first defined muting behavior (as in audio muted) as applied to a different interaction area, but a different second muting behavior in relation to the area in which the participants are located.

In some embodiments of the present disclosure, the automated control of audio and/or video muting characteristics of participants in a specific interaction area in a multiple area multiparty interaction space may be based on the participants' existence in, or movement in or out of, the specific interaction area. The area-specific audio and video muting characteristics may be different. The muting characteristics may be provisioned and saved in relation to each area. The muting characteristics of a specific area may be dynamically adjustable. The participants may automatically inherit and instantiate defined muting characteristics when they enter a specific area.

Additionally, muting characteristics as applied to one area may be relative to what is observed by participants in a different area. For example, those participants in a presentation area may have unmuted audio and/or video as observed by those in an audience area. Different muting characteristics may apply relative to different interaction areas at the same time. For example, participants in a private interaction area may be unmuted (with respect to audio, video, or both) for everyone in that private area but muted for everyone in presentation and audiences areas that those in the private area are observing.

Thus, the present disclosure uses unique characteristics and configurations of a visually illustrated interaction environment to dynamically control participant muting characteristics as they participate in the environment.

Also, many times in electronic or virtual multiparty interactions (including what is often referred to as conferencing), primarily one person at any instant is presenting material to the larger group, and it is rather hard to coordinate participation in related discussions by members of the group due to the difficulties that arise as several people try to interrupt at once. Various media performance issues like latency cause people to speak over each other or otherwise collide when they begin to talk. Other human factors such as dominant personalities create imbalance in the overall interaction. The present disclosure provides for both human controlled and automated moderation of the discussion by placing those that want to talk in a queue and servicing that queue to control the flow of interaction and eliminate dominance factors. The present disclosure provides for the automatic control of muting actions, freeing the individuals involved (including both moderators, if present, and individual participants) from those responsibilities. According to embodiments of the present disclosure, movement between interaction areas of a multiparty interaction space may be organized and coordinated via a queue, such that a participant may be promoted from the top of the queue and moved to a presentation area, where audio and video input from that participant to another area of the interaction space may be automatically enabled for that participant. Audio and video input from that participant may be disabled when the participant moves or is moved out of the presentation area after addressing the larger group.

According to embodiments of the present disclosure, when a participant in a multiparty interaction located in the audience area of a multiparty interaction space desires to address the audience, the participant may select an icon displayed in the multiparty interaction space that represents the participant (and/or the participant's communication device), in response to which the participant (or, more specifically, an identifier or other representation of the participant's communication device) may be placed into an interaction queue. When allowed by the current presenter, or automatically as desired, the first participant in the queue is promoted to the presentation stage. In some embodiments, participants promoted to the presentation stage are displayed on the presentation stage of the multiparty interaction space with live video, and the participant's audio input is unmuted automatically. When the participant is finished speaking or otherwise addressing the audience, the participant may select the icon that represents the participant within the multiparty interaction space, which may cause the participant's icon to return to the audience area. The returned icon may revert to the format it had before it was promoted to the presentation stage (e.g. a simple icon, a still image, or a live video feed), and the audio and/or video input from the participant corresponding to the icon may be muted. The next participant in the queue may then be promoted. Accordingly, embodiments of the present disclosure facilitate orderly interaction and eliminate the need for participants in a multiparty interaction to manage mute functions or step on each other when trying to gain the opportunity to interact.

According to some embodiments of the present disclosure, a participant in a multiparty interaction may signal a desire to address others, which signaling may cause that participant to be placed in an interaction queue maintained in the order that each participant's signal is received. The interaction queue may then be processed such that when a participant is promoted from the queue, that participant (or, more specifically, an icon representing that participant and/or that participant's communication device) is moved to the presentation area of the interaction space, and the participant's audio and/or video are automatically unmuted.

Also according to some embodiments of the present disclosure, when a participant in the presentation area of a multiparty interaction space signals that the participant is finished with the participant's presentation, the participant may be moved back to the audience area, where an icon representing the participant may resume its previous state (e.g. a simple icon, a still image, or a live video feed), the participant's audio and/or video input may be automatically muted, and the next participant in queue may be promoted.

In some embodiments, queue promotion may occur automatically or manually, based on a choice by a participant in or a moderator of a multiparty interaction, and the participant or moderator may have the ability to provision and save such a choice. Additionally, participants in a multiparty interaction may be assigned varying levels of priority, based upon individual or group membership data, when entering a queue, and embodiments of the present disclosure may provide the ability to provision, save, and act upon such individual or group membership data. Also in embodiments of the present disclosure, the muting of audio and video in each area of a multiparty interaction space may be coordinated without manual user control actions, based simply on each participant's location (e.g. the location within the multiparty interaction space of an icon representing each participant) in a particular area.

Thus, embodiments of the present disclosure use positional defined interaction privileges, possibly in conjunction with a queue that uses order-related processing or intelligent (not simply order-related) processing.

Most multiparty interactions have a single common set of interaction capabilities constantly available to all participants. To be highly productive, different participants can benefit from different interaction functionality at different times and situations in an interaction. Embodiments of the present disclosure facilitate such functionally based on an easily manipulated positional organization of participants. More particularly, according to some embodiments of the present disclosure, different areas in the overall interaction space enable unique interaction capabilities and behaviors for participants locating themselves (e.g. via an icon or other digital representation of each participant) in such areas.

In one embodiment according to the present disclosure, one or more interaction areas within an overall interaction space (that includes, e.g., a presentation area and an audience area) provide unique interaction behaviors including such behaviors as a whisper mode among individual participants, and/or the ability to actively participate in a small private group while still observing activities in other areas of the overall interaction space. Additional examples of different interaction behaviors or characteristics may include consuming different interactive content and opportunities independently in each unique interaction area while being able to easily move between unique interaction areas using simple drag motions of a communication device user interface.

Thus, in some embodiments of the present disclosure, a first interaction area of an overall interaction space provides one set of interaction capabilities for participants therein and a second interaction area of the overall interaction space provides a different set of interaction capabilities for participants therein, where the first and second interaction areas are part of an overall collective experience. In some embodiments, one set of interaction capabilities involves the ability to be seen and/or heard by participants within the same interaction area. In other embodiments, one set of interaction capabilities involves the ability to be seen and/or heard by participants in other specific interaction areas Also in some embodiments, one set of interaction capabilities involves a whisper mode between selected participants in the same interaction area. In other embodiments, one set of interaction capabilities involves a whisper mode broadcast to all participants in the same interaction area. In still other embodiments, one set of interaction capabilities involves selective individualized texting between participants in the same interaction area. In yet further embodiments, one set of interaction capabilities involves selective texting broadcast to all participants in the same interaction area. In some embodiments, one set of interaction capabilities involves selective texting broadcast to all participants in a different interaction area. In other embodiments, one set of interaction capabilities involves white-boarding (e.g. sharing notes, comments, or other information placed on a digital whiteboard by a participant via the participant's communication device) between participants in the same interaction area.

As can be seen from the foregoing, the present disclosure uses easily manipulated positional organization of participants in multiple interaction areas within a common interaction space to provide multiple sets of disparate communication capabilities.

People electronically attending a presentation, conference, or other virtual multiparty interaction often have a need to have a sidebar interaction among a small subset of participants while still observing but not disturbing the overall larger interaction. Today, people use additional communication channels like instant messaging, phone calls, or other methods as back-channels for holding such a sidebar outside of the primary communications event. The present disclosure defines a system and method to easily enable such interactions through a multiparty interaction workspace while still observing the event in progress without disturbing it.

Embodiments of the present disclosure provide the ability to dynamically add an additional interaction partition to an interaction area within an overall interaction space, such that when a participant establishes his or her presence in the additional interaction partition (e.g. by dragging, via a user interface of a communication device, an icon that represents the participant from outside of the additional interaction partition to inside of the interaction partition), the participant is able to interact with audio and/or video with everyone in the additional interaction partition while still hearing and observing activity in other areas of the overall interaction space, but not being heard or seen by participants within the overall interaction space but outside of the additional interaction partition. In some embodiments, audio communication from other participants is presented to a participant via the participant's communication device in a 3D spatial format, wherein audio from each area of the interaction space is reproduced with a different apparent source positioned consistent with the orientation of the various areas of the interaction space, making it easy for the participant to distinguish from which area of the interaction space the audio originates.

According to embodiments of the present disclosure, a participant may drag, within an interaction workspace and via a communication device, a partition creation instance (also referred to herein as a partition tool) from a tool pallet of the interaction workspace into an overall interaction space of the interaction workspace to create a new interaction partition or area with unique capabilities, while maintaining affiliations to existing interaction areas. In some embodiments, the unique interaction capabilities include 3D spatial audio positionally sensitive to the relative location of various participation areas and/or of icons representing one or more of the participants within the interaction workspace. Also in some embodiments, the unique interaction capabilities include specific audio and muting instances in each area of the interaction workspace.

In still further embodiments, dragging (e.g. via a communication device and within an interaction workspace) icons representing participants in a multiparty interaction from one interaction area to a new interaction area (e.g. an area created with the partition creation instance tool) initiates specific interaction capabilities in the new interaction area while maintaining the participants' presence, and a different set of interaction capabilities, in the original area(s). The muting of audio and video in an area may be coordinated without manual user control actions, based simply upon the participant's presence (e.g. via an icon within the multiparty interaction workspace) in the area.

As can be seen from the foregoing, the present disclosure defines the concept of dynamic addition of personal interaction spaces to group interactions via simple user interaction techniques, as well as the concept of providing unique characteristics to the dynamically added environments that are necessary to make such interactions productive. The unique characteristics may be defined by a participant in the multiparty interaction and/or by a moderator of the multiparty interaction. Once defined, the unique characteristics may be provided by a collaboration server or by a communication device running a collaboration application, and may be saved as default unique characteristics for dynamically added environments, and may be modified as desired (whether as a one-time modification for a specific dynamically added environment or as a modification to the default unique characteristics that will apply (at least by default) to dynamically added environments going forward.

It is not unusual for participants (and, in particular, for a subset of participants) in one conferencing event or other virtual multiparty interaction to encounter a need to move to a different interaction event. Unfortunately today such needs typically involve coordinating how to get together and exchanging some notification via email, instant message, or some other communication medium. Some of the most productive systems in place, like Avaya Flare, involve transferring phone calls of individual participants, which takes time and proper coordination. (Avaya Flare is a phone call centric user interface capable of manipulating caller representations to transfer calls of one or more parties.) The present disclosure provides a simple method to dynamically create a new interaction environment or event with similar characteristics to an existing event, and to easily place a group of participants from the initial event into the new event, such that the participants are transparently authenticated and readily able to interact. Embodiments of the present disclosure provide for dragging, within a virtual interaction workspace of a multiparty interaction and via a communication device, one or more participants (e.g. icons representing one or more participants) out of an overall multiparty interaction workspace to automatically define, instantiate, authenticate, and populate a new multiparty multimedia interaction workspace for the moved or transferred participants, where the new multiparty multimedia interaction workspace has substantially similar characteristics and materials as the previous multiparty interaction workspace, or, alternatively, where the new multiparty multimedia interaction workspace has characteristics and materials as desired and/or selected by one or more of the moved or transferred participants.

Embodiments of the present disclosure therefore provide the ability to drag (via a communication device and within a virtual multiparty interaction workspace of a multiparty interaction) a group of icons representing participants in the multiparty interaction from an area in the virtual multiparty interaction workspace out of the overall interaction workspace (not just an area of the overall interaction workspace) to instantiate a second or additional multiparty interaction workspace for the participants represented by the group of icons, where the new multiparty interaction workspace has characteristics similar to the multiparty interaction workspace just exited, and where the new participants are automatically properly authenticated into the new multiparty interaction workspace exactly as they were in the previous multiparty interaction workspace.

In embodiments of the present disclosure implemented in a browser paradigm, a participant in a multiparty interaction may use a communication device to drag participants (represented by icons in a virtual multiparty interaction workspace) one at a time, or collectively as a group, to a new tab, which action causes the new tab to instantiate the new multiparty interaction workspace.

In another embodiment, dragging participants (represented by icons in a virtual multiparty interaction workspace) outside of an existing multiparty interaction workspace in a particular direction (e.g. up, down, left, or right) instantiates the new multiparty interaction workspace, and each dragging direction can result in creation of a different new space. On mobile devices like smartphones and tablets, swiping the multiparty interaction workspace itself in a specific direction can cause the new interaction workspace that was created by dragging participants in that specific direction to be displayed. Thus, the direction of dragging can be used to define a specific multiparty interaction workspace. In some embodiments, the direction of dragging can also be used to define default characteristics of the new workspace. For example, dragging in one direction may comprise an indication that a first set of default characteristics should be applied to the new workspace, while dragging in another direction may comprise an indication that a second set of default characteristics should be applied to the new workspace.

According to some embodiments of the present disclosure, dragging one or more participants from an overall multiparty interaction workspace creates a new multiparty interaction workspace. The new interaction workspace may be substantially similar in nature and characteristics to the interaction workspace in which the participants previously existed together. The transferred or moved participants may be authenticated into the new space using the same credentials used to enter the initial space. Additionally, the moved or transferred participants may enjoy the same privileges in the new space that they enjoyed in the previous interaction workspace.

Also in embodiments of the present disclosure, the moved or transferred participants in the new workspace may be initially endowed with the same audio, video, graphical, and other characteristics they had at the time of they were moved or transferred from the previous interaction workspace (including, for example, the same audio and video muting attributes). The presentation materials existing in the initial interaction workspace may be automatically propagated or otherwise transferred to the new interaction workspace. Systems and methods of the present disclosure may provide for the proper establishment of all media flows in the new interaction workspace.

Still further in embodiments of the present disclosure, participants may be automatically removed from the previous interaction workspace when they enter the new interaction workspace. Alternatively, the moved or transferred participants may be suspended (e.g. the audio and/or video communication of the participants may be fully muted, and icons representing the participants may be grayed out) in the initial interaction workspace, but may nevertheless remain or otherwise maintain a presence in the initial interaction workspace while they occupy the new interaction workspace. In some such embodiments, participants who have relocated to the new interaction workspace may return to their suspended existences in the initial interaction workspace when they exit the new interaction workspace, and those suspended existences may be restored to the active configuration they had before they became suspended. Additional embodiments of the present disclosure provide the ability to provision and save options on what behaviors or events occur when new interaction workspaces are created.

Thus, embodiments of the present disclosure may be used to essentially clone a multiparty interaction workspace for selected participants while optionally maintaining an affiliation of the selected participants to the initial interaction workspace.

Before any embodiments of the disclosure are explained in further detail, it is to be understood that the disclosure is not limited in its application to the details of construction and the arrangement of components set forth in the following description and/or illustrated in the following drawings. The disclosure is capable of other embodiments and of being practiced or of being carried out in various ways. Also, it is to be understood that the phraseology and terminology used herein is for the purpose of description and should not be regarded as limiting.

Referring now to FIG. 1, a plurality of communication devices 104a-104g in a multiparty interaction system 100 according to one embodiment of the present disclosure participate in a multiparty interaction over a communication network 112. A collaboration server 116, also in communication with the communication network 112, may host the multiparty interaction, using a collaboration service 120. One or more of the communication devices 104a-104g may co-host the multiparty interaction together with the collaboration server 116, using a collaboration application 108. Alternatively, one or more of the communication devices 104a-104g may host or co-host the multiparty interaction without involvement of a collaboration server 116. In some embodiments, at least two communication devices 104 may establish a peer-to-peer connection and, using the collaboration application 108, establish a multiparty interaction over the peer-to-peer connection, without using a separate communication network 112 or a collaboration server 116.

In some embodiments, the coordination application 108 may be hosted in the cloud and provided through a Software-as-a-Service (SaaS) platform. The collaboration server 116 (processing instructions from the collaboration service 120) can receive a request from a communication device 104 to establish a multiparty interaction with two or more of communication devices 104a-104g, and can then establish a communication channel with the specified communication devices 104 over the communication network 112. Alternatively, the collaboration server 116 can open or establish a communication channel at a predetermined time based on a previously scheduled reservation, and host a log-in process whereby any communication device 104 may join the collaborative interaction upon receipt by the collaboration server 116 of proper credentials from the computing device in question. The communication network 112 may be any known communication network suitable for communications between or among computing devices, including a local area network, a wide area network, the Internet, a mesh network, and so forth. The communication channel between the communication management server 112 on the one hand and each of the communication devices 104 on the other hand may be secured using any known authentication and or authorization systems or methods. The operation of a system 100 is described in more detail with respect to FIG. 4-18 below.

A variety of protocols may be used to set up multiparty interactions according to embodiments of the present disclosure, including hypertext transfer protocol (HTTP), session initiation protocol (SIP), WebRTC (Web Real-Time Communication), HTML (hypertext markup language, including HTML5), dedicated video feeds, and the like. In embodiments using SIP or WebRTC, for example, media identification and negotiation may be achieved using the session description protocol (SDP). Transmission of media streams such as voice or other audio and video may be accomplished using Real-time Transport Protocol (RTP) or Secure Real-time Transport Protocol (SRTP). Where security is important, the protocol may be encrypted with Transport Layer Security (TLS). Each transaction of an SIP-enabled multiparty interaction consists of a client request (e.g. by a communication device 104) that invokes a particular method or function on the collaboration server 116, and at least one response. Thus, to initiate an SIP-enabled collaborative interaction, a communication device 104a may send an INVITE message to the collaboration server 116 (or, in some embodiments, to another communication device 104) together with one or more uniform resource identifiers (URI) indicating where the message should be sent, e.g. to one or more additional communication devices 104. The collaboration server 116 may forward the INVITE message to the specified communication device(s) 104, and respond to the INVITE message with a provisional response to the communication device 104a indicating that it has received and is processing the message. Once the specified communication device(s) 104 receives the INVITE message, it may send a success message to the collaboration server 116, which may in turn send a success message to the communication device 104a. The collaboration server 116 may then send an ACK message to the specified communication device(s) 104 to confirm reliable message exchanges, and the communication device 104a may also send an ACK message to the collaboration server 116 for the same purpose. Once reliable communications have been established between the communication device 104a and the collaboration server 116, and between the collaboration server 116 and the specified communication devices 104, media can be exchanged between or among the communication device 104a and the specified communication device(s) 104 via the collaboration server 116 using, by way of example but not limitation, RTP, SRTP, or WebRTC.

A communication device 104 may leave the multiparty interaction by sending a BYE message to the collaboration server 116, which may forward the BYE message to the communication device 104a and/or to one or more of any remaining specified communication devices 104. The collaboration server 116 may also send a success response to the communication device 104 that initiated the BYE message, to which the departing communication device 104 may send a success response to the collaboration server 116. In some embodiments, the multiparty interaction may be terminated either when one of two remaining communication devices 104 sends a BYE message as set forth above. Also in some embodiments, when the communication device 104a sends a BYE or other terminating message to the collaboration server 116, the entire multiparty interaction is terminated regardless of the number of remaining participants. In still other embodiments, the communication device 104a may send a special message to the collaboration server 116, different than the BYE message described above, that causes the multiparty interaction to terminate.

The above-described process of establishing and terminating a multiparty interaction using the SIP protocol is provided by way of example only, without limitation. Other protocols may be used to establish multiparty interactions according to embodiments of the present disclosure, and other processes may be followed to terminate multiparty interactions, whether using SIP or another protocol. A communication device 104 that initiates a multiparty interaction may specify the parameters of the interaction, including, without limitation, one or more of who may participate, whether there is a cap on the number of participants, who will be the presenter (at least initially), and which forms of media will be shared during the multiparty interaction (e.g. audio, video, data). The specified parameters may then be used to establish the multiparty interaction, and may in some embodiments be provided to each communication device 104 that joins the multiparty interaction. In some embodiments, certain interaction parameters are determined by each participant. Such parameters may include, for example and without limitation, which forms of media may be provided by the participant via the participant's communication device 104, and how the participant will be represented to other participants via their respective communication devices during the multiparty interaction.

Media and other data transferred between or among communication devices 104, whether through a communication network 112 and/or a collaboration server 116 or not, may utilize any available communication path. For example, in a local area network, data transfer among the participating devices may occur via Ethernet cables, or wirelessly via wireless modems and a wireless router. Alternatively, communications may occur over a wide area network such as the Internet, in which case the particular communication path between participating devices may be determined via TCP/IP or other networking protocols. In some embodiments, one or both of the collaboration service 120 and the collaboration application 108 is configured to identify a communication path that allows for the fastest transmission of data, or that allows for transmission of the greatest amount of data, from among a plurality of available communication paths, and to use the identified communication path.

Applications for establishing, maintaining, and terminating collaborative interactions as described herein may be stand-alone applications stored in a computer readable storage medium of a computing device 104 (e.g. collaboration application 108) and/or a collaboration server 116 (e.g. collaboration service 120). In other embodiments, however, such applications may be embedded in or operate as part of other applications, including browsers, operating systems, productivity applications, document processing applications, or the like.

Figure 2:
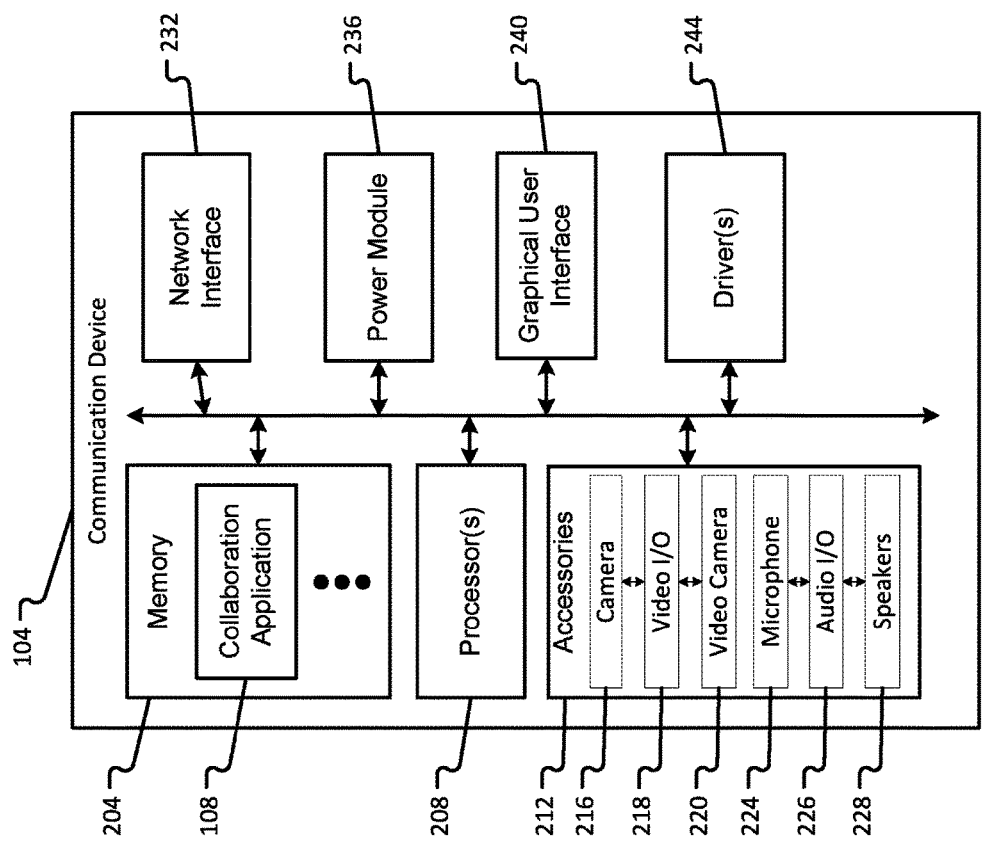
FIG. 2 is a block diagram of a communication device for use in a virtual multiparty interaction system according to some embodiments of the present disclosure.

Referring now to FIG. 2, a communication device 104 according to embodiments of the present disclosure that is suitable for use as in a multiparty interaction may include a memory (e.g. a computer readable storage medium) 204 (which, in embodiments, may have stored therein a collaboration application 108 that provides needed functionality to implement the systems and/or methods described herein), one or more processors 208, one or more accessories 212 (which may include, for example and without limitation, one or more cameras 216, one or more video cameras 220, one or more microphones 224, and one or more speakers, headsets, or other audio transducers 228), a network interface 232, a power module 236, a graphical user interface 240, and one or more drivers 244. Persons of ordinary skill in the art will recognize, based on the present disclosure, that additional or fewer components may be used in a communication device such as the communication device 104 to implement the systems and methods of the present disclosure.

A memory 204 as used in embodiments of the present disclosure may correspond to any type of non-transitory computer-readable medium. In some embodiments, the memory 204 may comprise volatile or non-volatile memory and a controller for the same. Non-limiting examples of a memory 204 that may be utilized in a communication device 104 include a portable computer diskette, a hard disk, a random access memory (RAM) (including any variety of random access memory, such as dynamic RAM (DRAM) and static RAM (SRAM)), a read-only memory (ROM), an erasable programmable read-only memory (EPROM or EEPROM or Flash memory), an optical fiber, a portable compact disc read-only memory (CD-ROM), an optical storage device, a magnetic storage device, or any suitable combination of the foregoing. The memory 204 stores instructions for execution by the processor 208, and may store some or all of drivers 328, as well as the collaboration application 108 and, in some embodiments, software and/or other instructions associated with the graphical user interface 240, the network interface 232, and/or one or more of the accessories 212.

A processor 208 as used in embodiments of the present disclosure may correspond to one or many microprocessors that are contained within a common housing, circuit board, or blade with the memory 204. The processor 208 may be a multipurpose, programmable device that accepts digital data as input, processes the digital data according to instructions stored in its internal memory, and provides results as output. The processor 208 may implement sequential digital logic as it has internal memory. As with most microprocessors, the processor 208 may operate on numbers and symbols represented in the binary numeral system. The processor 208 may be or include, without limitation, any one or more of a Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor 208 may execute instructions stored in the memory 204 to initiate, maintain, and/or terminate multiparty interactions as disclosed herein.

The one or more microphones 224 and speakers 228 may be connected to an audio I/O interface 226 to receive and transmit audio information signals (via the network interface 232) among the various components of the multiparty interaction system 100. By way of example, the audio I/O interface 226 may comprise one or more of an associated amplifier and analog to digital converter. Alternatively or additionally, the audio I/O interface 226 may be configured to separate audio information from a media stream provided to, or received from, the collaboration server 116. This information may be separated in real-time, or as the information is obtained or received by the communication device 104. The one or more microphones 224 and/or speakers 228 may optionally be used during a multiparty interaction according to embodiments of the present disclosure. In some embodiments, a plurality of speakers 228 are configured to provide surround sound and/or to provide 3D audio effects, including, without limitation, spatial audio. One or more drivers 244 may provide instructions, for execution by the processor, that implement these effects using the one or more speakers 228.

The graphical user interface 240, the camera 216, and/or the video camera 220 may be connected to or include a video I/O interface 218, which may be used to receive and transmit video signals (via the network interface 232) among the various components of the multiparty interaction system 100. Optionally, the video I/O interface 218 can operate with compressed and/or uncompressed video signals. The video I/O interface 218 can support high data rates associated with image capture devices such as the camera 216 and the video camera 220. Additionally or alternatively, the video I/O interface 218 may convert analog video signals to digital signals. A video I/O interface 218 may be configured to separate video information from a media stream provided to, or received from, the collaboration server 116. During a multiparty interaction according to embodiments of the present disclosure, the graphical user interface 240 is used to display a virtual multiparty interaction workspace (also referred to herein as a collaboration workspace, an interaction workspace, and an interactive space) to a participant of the multiparty interaction using the communication device 104 having the graphical user interface 240. The camera 216 and/or the video camera 220 may optionally be used during the multiparty interaction based on the preference of the participant using the communication device 104, one or more parameters set by the hosting participant, or one or more rules of the multiparty interaction, as described more fully below.

The network interface 232 (also referred to herein as a communication interface) may comprise hardware that facilitates communications with other communication devices 104 and/or with a collaboration server 116 over the communication network 112. In some embodiments, the network interface 232 may additionally or alternatively facilitate communications with other communication devices 104 via a peer-to-peer connection. The network interface 232 may include an Ethernet port, a Wi-Fi card, a Network Interface Card (NIC), a cellular interface (e.g., antenna, filters, and associated circuitry), or the like. The network interface 232 may be configured to establish and maintain a connection between the communication device 104 and the communication network 112, and may further be configured to encode and decode communications (e.g., packets) according to a protocol utilized by the communication network 112. During a multiparty interaction according to embodiments of the present disclosure, data corresponding to the information displayed on the graphical user interface 240 of the communication device 104 may be sent via the communication network 112 from the network interface 232, and information displayed on a graphical user interface of one or more other communication devices participating in the multiparty interaction may be received at the network interface 232 via the communication network 112. Additionally, the network interface 232 may be used to send and/or receive media signals (including audio signals, video signals, and data signals), commands, requests, indications, and other signals utilized in embodiments of the present disclosure.

The power module 236 may include a built-in power supply (e.g., battery) and/or a power converter that facilitates the conversion of externally-supplied AC power into DC power that is used to power the various components of the computing device 104. In some embodiments, the power module 236 may also include some implementation of surge protection circuitry to protect the components of the communication device 104, or other associated hardware, from power surges.

The graphical user interface 240 as used in embodiments of the present disclosure may be or include hardware (such as a computer monitor, television screen, laptop screen, tablet screen, smart phone screen, and the like, any one of which may be a resistive, capacitive, surface acoustic wave, or infrared touch screen, an LCD screen, an LED screen, a plasma screen, or a CRT screen), software (such as operating systems, browsers, applications, media players, and the like), or any combination thereof. During a multiparty interaction according to embodiments of the present disclosure, the graphical user interface 240 displays to the user of the communication device 104 a virtual interaction workspace. For example, the graphical user interface 240 displays the screenshots depicted in FIGS. 9 through 18. The graphical user interface 240 may also receive user input and commands and allow user interaction with an interaction workspace according to embodiments of the present disclosure. As discussed elsewhere in the present disclosure, embodiments of the present disclosure beneficially allow a user of a communication device (e.g. a participant in a multiparty interaction) to set or modify capabilities or parameters for interaction with other participants in the multiparty interaction by adjusting one or more aspects of the interaction workspace (including, by way of example but not limitation, using drag-and-drop commands and other graphical-user-interface facilitated interactions to move icons representative of participants in the multiparty interaction, and/or to apply one or more available tools to the interaction workspace.

The driver(s) 244 may correspond to hardware, software (including firmware), and/or controllers that provide specific instructions to hardware components of the computing device 104, thereby facilitating their operation and/or the operation of associated hardware components. For instance, the network interface 232, the power module 236, the accessories 212 (including the camera 216, the video I/O 218, the video camera 220, the microphone 224, the audio I/O 226, and the speaker 228), the memory 204, and/or the graphical user interface 240 may each have a dedicated driver 244 that provides appropriate control signals to effect its/their operation. The driver(s) 244 may also comprise the software or logic circuits that ensure the various hardware components are controlled appropriately and in accordance with desired protocols. For instance, the driver 244 of the network interface 232 may be adapted to ensure that the network interface 232 follows the appropriate network communication protocols (e.g., TCP/IP (at one or more layers in the OSI model), TCP, UDP, RTP, GSM, LTE, Wi-Fi, etc.) such that the network interface 232 can exchange communications via the communication network 112. As can be appreciated, the driver(s) 244 may also be configured to control wired hardware components (e.g., a USB driver, an Ethernet driver, fiber optic communications, etc.). The driver(s) 244 may be stored in the memory 204 and/or in one or more memories associated with individual hardware components of the communication device 104.

Figure 3:
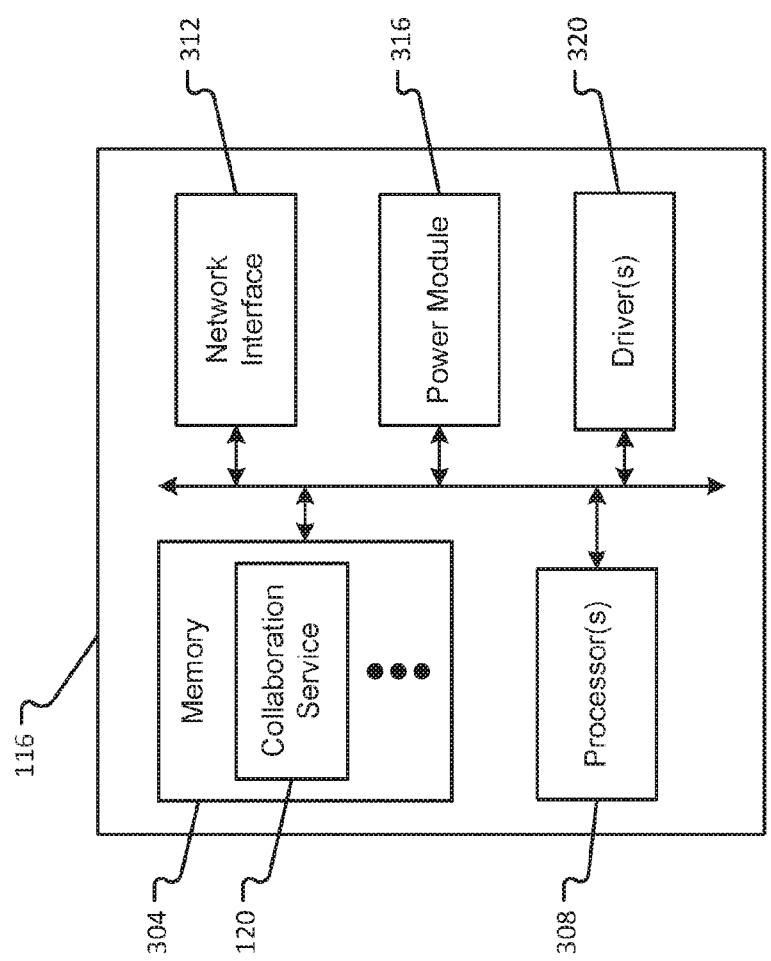
FIG. 3 is a block diagram of a collaboration server according to some embodiments of the present disclosure.

Referring now to FIG. 3, a collaboration server 116 may include a computer readable storage medium 304 (which, in embodiments, may have stored therein a collaboration service 120 that provides instructions for execution by the processor 308 that enable the processor 308 to implement the systems and methods described herein), one or more processors 308, a network interface 312, a power module 316, and one or more drivers 320. These components may be identical or similar to, and/or have an identical or similar purpose and/or functionality as the corresponding components described above with respect to communication device 104. The server 116 may be located (physically) remotely from any communication device 104, provided that the server 116 is connected to a communication network such as communication network 112 to which at least one of the communication devices 104 is also connected.

As may now be appreciated, a multiparty interaction as referred to herein is a virtual meeting (e.g. a meeting that is not in person) of two or more participants, each of whom participates in the multiparty interaction via a communication device such as the communication device 104. The multiparty interaction may be hosted by a collaboration server 116, or the multiparty interaction may be hosted by one or more communication devices 104 belonging to participants in the multiparty interaction. A virtual multiparty interaction workspace (which may also be referred to as an interaction workspace, a collaboration interface, or an interactive space) is a graphical representation of the multiparty interaction, and is displayed on the graphical user interfaces 240 of the communication devices 104 used by the participants in the multiparty interaction. For purposes of the present disclosure, references to moving, transferring, dragging, dropping, or otherwise acting on a participant should be understood to mean moving, transferring, dragging, dropping, or otherwise acting on a virtual representation of the participant and/or of the participant's communication device within a virtual multiparty interaction workspace. Likewise, references to a participant being located in a particular area of an interaction workspace should be understood to mean that a virtual representation of the participant is located in the particular area of the interaction workspace.

A method 400 according to an embodiment of the present disclosure will now be described with reference to FIGS. 4 and 9-18. When a multiparty interaction is initiated, an interaction workspace 900 may comprise only an audience area 904, in which each participant in the multiparty interaction is represented by a simple icon 912. One icon 912 may be distinguishable from another icon 912 by, for example, participant initials displayed within the icon 912 representing that participant. For example, in FIG. 9, the icon 912a represents a participant having the initials JC, the icon 912b represents a participant having the initials JH, and so on for icons 912c through 912g. The icons 912 may also be distinguishable from one another by, for example, color, shape, size, text indicating a location of the participant, text indicating a name of the participant, or in any other suitable manner.

The interaction workspace may be, for example and without limitation, displayed in a browser configured to utilize HTML5. The browser may support multiple tabs, wherein each tab is capable of supporting an independent browsing session or, more particularly for present purposes, an independent multiparty interaction workspace. Examples of suitable browsers include Google Chrome, Mozilla Firefox, Opera, and Apple Safari. Depending on the capabilities of his or her communication device 104 and the graphical user interface 240 thereof (on which the interaction workspace is displayed), a participant may be able to manipulate one or more aspects of the interaction workspace via touch, and/or via a mouse, a trackball, a trackpad, a keyboard, eye gaze, or another user input mechanism or device. In some embodiments, a multiparty interaction may be scheduled in advance, and invitations containing a link to the interaction workspace for the multiparty interaction may be sent via email, text message, instant message, or other suitable communication means to selected participants. The invitations may include a URL or other link that, when clicked by a recipient of the invitation, cause the communication device of the participant to open the browser or other program in which the interaction workspace may be displayed. The URL or other link may be customized for each selected participant, such that when a selected participant clicks on the URL or other link, any needed credentials for obtaining access to the multiparty interaction are automatically populated in the browser or other program, such that the selected participant need not take any additional steps to join the multiparty interaction. Alternatively, the selected participant may be required to provide one or more log-in credentials (e.g. name, screen name, email address, phone number, location, and/or password) via the browser or other program in order to gain access to the interaction workspace. In some embodiments, participants may be required to create an account with a service provider in order to gain access to an interaction workspace and participate in a multiparty interaction according to embodiments of the present disclosure.

In some embodiments, participants in the audience area 904 may be, at least initially and/or by default, in audio communication with each other, for example via an audio communication channel over which audio signals are transmitted from and received by the various communication devices 104 via their respective network interfaces 232, audio input/output interfaces 226, microphones 224, and speakers 228. To assist participants in recognizing which participant is speaking at a given point in time, the interaction workspace 900 may be configured to highlight the icon 912 of the current speaker with a highlight 916. Thus, in FIG. 9, participant JH is speaking, as evident from the highlight 916 on the icon 912*b* that represents participant JH. When participant JH stops speaking, the highlight 916 may be removed from the icon 912*b*, and when another participant—for example, participant PM—starts speaking, the highlight 916 may be placed on the icon 912*g* representing participant PM. In some embodiments, a highlight 916 may be used to highlight the icon 912 of any participant who is speaking (e.g., if multiple participants speak or otherwise transmit audio signals at the same time, each such participant's icon 912 may be highlighted with a highlight 916).

In multiparty interactions having large numbers of participants (e.g. more participants than can be represented by participant icons of suitable size within the confined space of a display screen), the collaboration server 116 and/or the communication devices 104 may be configured to cause a graphical user interface of the communication devices 104 to display only a limited number of participant icons corresponding to participating communication devices 104. For example, the graphical user interface of a given communication device may be caused to display only the participant icons of the participant using the given communication device, any participant who is currently speaking (e.g. a presenter participant), and any participant whose icon has been modified in any manner or for any purpose disclosed herein. In this way, the inherent size limitations of a given graphical user interface can be overcome in a way that does not meaningfully reduce the information available to the participant of the given communication device.

Also in some embodiments, the interaction workspace may be configured to automatically mute audio signals transmitted by a communication device 104 of any participant who is not currently the active speaker. For example, while the participant JH is speaking (and while the icon 912*b* of the participant JH is highlighted with highlight 916), any audio transmission from participants JC, SB, KS, JY, JS, or PM may be muted to ensure that no one interrupts participant JH. As soon as participant JH stops speaking, such that the highlight 916 is removed from the icon 912*b*, the muting of audio signals transmitted by the other participants may be terminated, such that any participant can transmit audio signals to any other participant. Then, when another participant begins to speak, that participant's icon 912 may be highlighted with the highlight 916, and audio transmissions from the remaining participants may again be muted.

Figure 15:
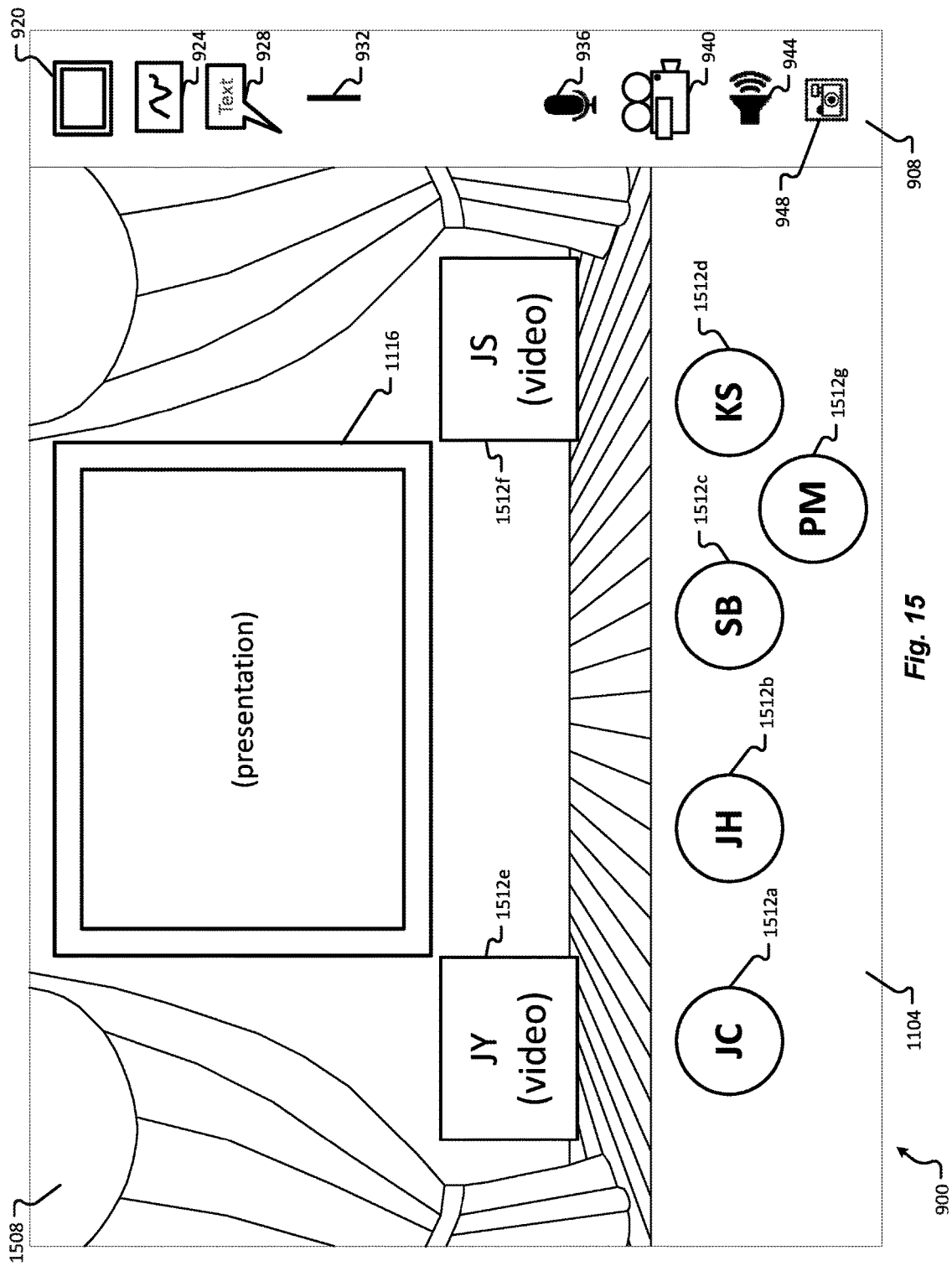
FIG. 15 is yet another screenshot displayed on a graphical user interface of a communication device according to some embodiments of the present disclosure.

In some embodiments, a participant may be able to customize aspects of the interaction workspace 900 according to his or her own preferences. Customizable aspects may include, without limitation, one or more of the shape of the icons 912 (collectively or individually), the size of the icons 912 (collectively or individually), the position of the icons 912 (collectively or individually), the order of the icons 912, the color of the icons 912 (collectively or individually), a background color of the interaction workspace 900, a background image of the interaction workspace 900, a background color of an area of the interaction workspace 900 (e.g. the audience area 1104, and/or the presentation area 1108), and a background image of an area of the interaction workspace 900. In some embodiments, a presenting participant may have control over one or more customizable aspects of the presentation area 1108. By way of example only, FIG. 15 illustrates a presentation area 1508 having a "curtains and stage" background image, which may have been selected by a participant viewing the presentation and may be displayed only on the participant's communication device 104, or which may have been selected by one or both of presenting participants JY and JS, and may be displayed on the communication devices 104 of all participants in the multiparty interaction.

The interaction workspace 900 may also comprise a tool area 908, from which various tools may be accessed. For example, a participant may click on, select, touch, or drag the snapshot or camera tool 948 to take a picture of the participant using a camera 216 of the communication device 104 being used by the participant, which picture may then be automatically sized and placed within the icon 912 corresponding to the participant. For example, in FIG. 10, the icon 1012*e* corresponding to the participant JY displays an image of the participant JY taken by a camera 216 of the communication device 104*e* in response to use by the participant JY of the camera tool 948. The picture may be saved to the memory 204 of the communication device 104. In some embodiments, the participant may be able to modify and save a setting that causes the picture to be used in the icon representing the participant during future interactions.

The tool area 908 may also comprise a speaker control tool 944. The speaker control tool 944 may be used by a participant to mute the speakers 228 of the participant's communication device 104. For example, if a participant is in his or her office using a communication device 104 to participate in a multiparty interaction, and is interrupted by an individual who walks into the participant's office and wants to talk, the participant can touch, click on, or otherwise select the speaker control tool 944 to mute the speakers 228. Similarly, the participant can again touch, click on, or otherwise select the speaker control tool 944 to unmute the speakers 228 once the participant is able to return his or her attention to the multiparty interaction. The speaker control tool 944 may also be used, in some embodiments, to control the volume of the speakers 228, e.g. by dragging the speaker control tool 944 up to increase the volume or down to decrease the volume. Also in some embodiments, the speaker control tool 944 may be dragged by a participant to one or more selected icons 912 in the interaction workspace 900 to cause the communication device 104 of the participant (but not other communication devices 104 participating in the multiparty interaction) to play only audio transmissions originating from the one or more selected icons 912 (or, more particularly, audio transmissions originating from the participant or communication device 104 corresponding to each of the one or more selected icons 912). Similarly, in some embodiments, the speaker control tool 944 may be dragged by a participant to one or more selected icons 912 in the interaction workspace 900 to cause the communication device 104 (but not other communication devices 104 participating in the multiparty interaction) to mute audio transmissions originating from one or more selected icons 912 (or, more particularly, audio transmissions originating from the participant or communication device 104 corresponding to each of the one or more selected icons 912).

Figure 10:
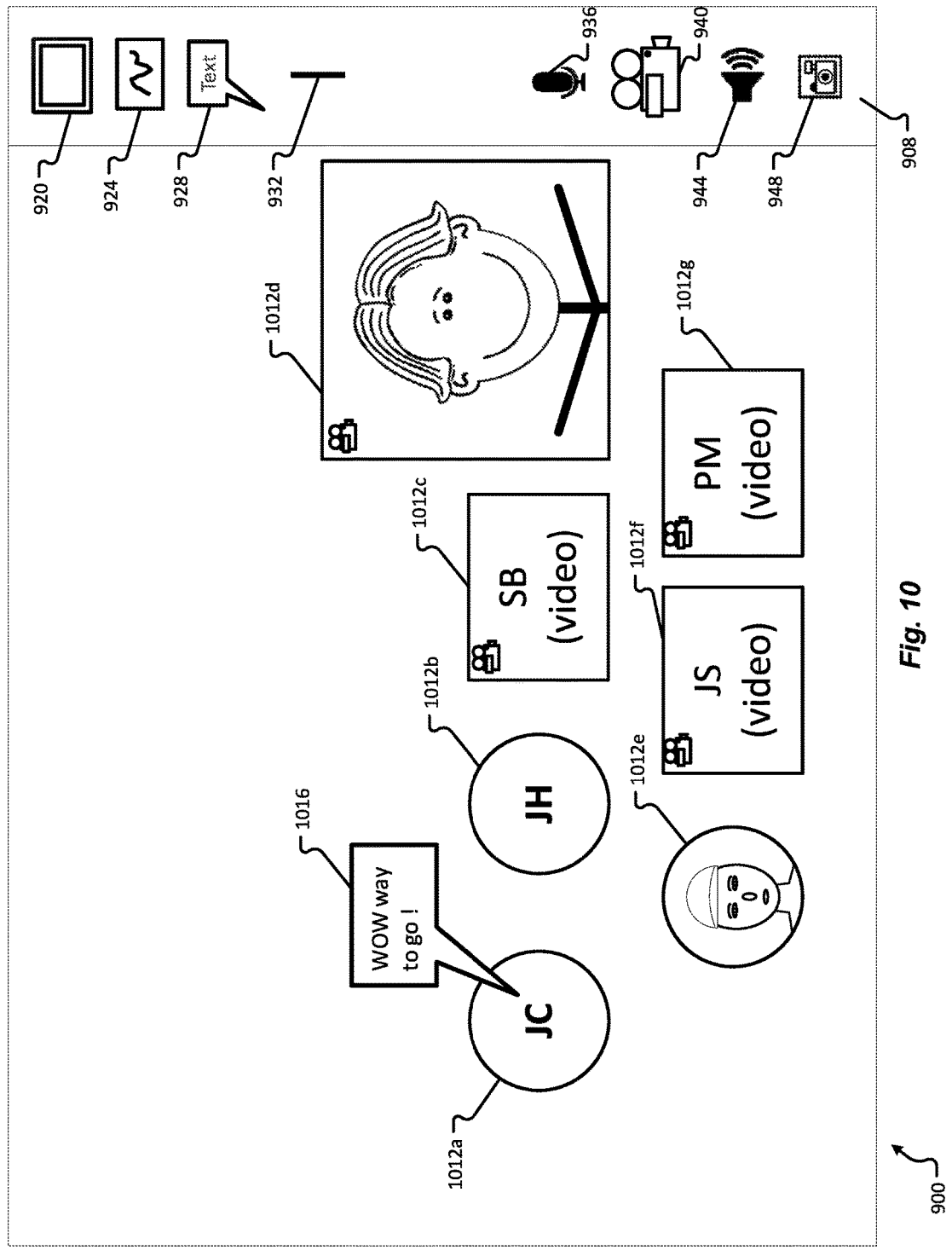
FIG. 10 is another screenshot displayed on a graphical user interface of a communication device according to some embodiments of the present disclosure.

Also contained within the tool area 908 may be a video tool 940. A participant may select the video tool 940 to transform the participant's icon 912 into a live video feed. For example, in FIG. 10, the icon 912c, 912d, 912f, and 912g of the participants SB, KS, JS, and PM have been modified into live video feeds 1012c, 1012d, 1012f, and 1012g. In some embodiments, a participant may adjust the size of one or more of the live video feeds in the interaction workspace 900 as displayed via the graphical user interface 240 of the participant's communication device 104. For example, FIG. 10 illustrates an interaction workspace 900 in which the participant viewing the interaction workspace 900 has increased the size of the live video feed 1012d relative to the other icons 1012a, 1012b, 1012c, 1012e, 1012f, and 1012g. In some embodiments, the interaction workspace 900 may be configured such that manipulating the video tool 940 (or other tools within the tool area 908) in different ways activates different features or functions. For example, dragging the video tool 940 to the participant's icon may initiate a live video feed from the participant's communication device 104 (using the video camera 220), while selecting the video tool 940 may pause an existing live video feed. Other such combinations will be readily identifiable to persons of ordinary skill in the art based on the present disclosure, and are encompassed within the scope of the present disclosure.

A microphone control tool 936 may also be included within the tool area 936. The microphone control tool 936 may be used by a participant, for example, to mute audio transmissions from the participant's communication device 104. Thus, if a participant needs to talk, listen to a message, or otherwise engage in audible activity that is not intended for consumption by other participants in the multiparty interaction, the participant can select the microphone control tool 936 to mute audio transmissions from the participant's communication device 104. When the participant again wishes to communicate audibly within the multiparty interaction, the participant can again select the microphone control tool 936 to unmute audio transmissions from the participant's communication device 104.

Notably, the interaction workspace 900 may be configured to accommodate any combination of audio and video. Thus, a participant may mute audio transmissions from the participant's communication device 104 using the microphone control tool 936, but may still transmit live video through a live video feed activated using video tool 940. Alternatively, a participant may pause the participant's live video feed using the video tool 940, but may leave the participant's microphone 224 unmuted. As another alternative, a participant may mute audio transmissions received from other participants in the multiparty interaction by selecting the speaker control tool 944, but may leave his or her microphone 224 unmuted so as to still be able to transmit audio to other participants within the multiparty interaction.

Yet another tool included within the tool area 908 may be a presentation tool 920, which may be used to initiate a presentation. For example, the participant JY (represented by the icon 912e) may drag a presentation tool 920 from the tool area 908 to the audience area 904 to initiate a presentation. In embodiments, initiation of a presentation may cause the creation of a presentation area 1108 within the interaction workspace 900, as well as movement of the icon 912e (e.g. the icon corresponding to the participant whose actions resulted in creation of the presentation area 1008) from the audience area 904 to the presentation area 1108. Initiation of the presentation may also cause the initiation of a data channel over which a slide show, video show (e.g. a video presentation different than a live video feed), screen share, or other presentation may be shared from JY's communication device 104e to the other participants' communication devices 104 via a presentation screen 1116. In some embodiments, initiation of a presentation may further cause the interaction workspace to mute audio transmissions from participants located in the audience area 1104, and to unmute (if necessary) audio transmissions from the one or more participants located in the presentation area 1108. Also in some embodiments, initiation of a presentation may cause the presenter's icon (here, icon 912e corresponding to participant JY) to automatically change from a simple icon to a live video feed (here, live video feed 1112e).

A whiteboard tool 924 may also be included within the tool area 908. A participant may drag the whiteboard tool 924 to the presentation area 1108 to add a virtual whiteboard to the presentation area 1108. The virtual whiteboard may be displayed in the presentation area 1108 in addition to the presentation 1116 screen (e.g. by dragging the whiteboard tool 924 to an empty space in the presentation area 1108) or instead of the presentation screen 1116 (e.g. by dragging the whiteboard tool 924 from the tool area 108 and releasing it on top of the presentation 1116). A presenting participant may control the size of the presentation screen 1116 and/or of the virtual whiteboard within the presentation area 1108 as it is displayed on the communication devices 104 of the various participants in the multiparty interaction. Alternatively, the size of the presentation screen 1116 and/or of the virtual whiteboard as displayed on the communication device 104 of each participant may be controlled by each participant, respectively. The virtual whiteboard may be configured to allow a presenting participant to write or draw (using, for example, a finger or stylus for communication devices 104 having a touch-sensitive interface, and/or a keyboard, trackpad, trackball, or mouse) on the virtual whiteboard, which writings or drawings may then be displayed on the virtual whiteboard to other participants in the multiparty interaction. In some embodiments, the interaction workspace 900 may be configured such that the presenting participant may select one or more other participants to write or draw on the virtual whiteboard.

Yet another tool that may be included within the tool area 908 is a texting tool 928. A participant in a multiparty interaction may use the texting tool 928 to initiate textual communications with one or more other participants in the interaction. For example, a participant may drag the texting tool 928 to an icon 912 corresponding to another participant with whom the participant would like to share a text message. The texting tool 928 may then cause a text box to open, in which the participant can type a message. Once the participant indicates that the message is complete (e.g. by selecting a send button, or by pressing "Enter," or by any other suitable command), the communication interface 104 of the texting participant sends the text message to the selected participant. In some embodiments, the text message appears within the interaction workspace 900 of the receiving participant in a comment box associated with the sending participant's icon 912. For example, FIG. 10 illustrates a comment box 1016 associated with the icon 1012*a* corresponding to the participant JC, indicating that the participant JC sent the text message "WOW way to go !" to the participant viewing the interaction workspace 900 of FIG. 10.

In some embodiments, a participant may use the texting tool 928 to send a text message to every other participant in the multiparty interaction. For example, the interaction workspace 900 may configured such that if the participant drags the texting tool 928 to his or her own icon, then the message provided by the participant will be sent to every other participant. Regardless of whether a message is sent to one or more participants, the interaction workspace 900 may be configured to display the message as a text box associated with the icon 912 of the sending participant in the interaction workspace 900 displayed on the communication devices 104 of the receiving participants. In other embodiments, the interaction workspace 900 may be configured to provide an indication to receiving participants of whether the text message was sent only to that participant, or to every participant, or to a subset of the participants.

A partition tool 932 may also be included in the tool area 908. The partition tool 932 may be used to create an audience and/or a presentation area within an interaction workspace 900. The partition tool 932 also may be used by a participant to create a new, private meeting area (also referred to herein as a private interaction area or a partition) within the interaction workspace 900 (e.g. the area 1612 created by the wall 1616 of FIG. 16). A tool area 908 may comprise a plurality of partition tools 932, each with different characteristics, or the tool area 908 may comprise a single partition tool 932 with selectable characteristics. In some embodiments, a tool area 908 may comprise a plurality of partition tools 932 each with some pre-defined characteristics and some selectable characteristics. Default characteristics of each area created with the partition tool 932 may be pre-defined (whether by a participant in a multiparty interaction, by a moderator of the multiparty interaction, by a system administrator, or by a third party who provides one or more embodiments of the systems and/or methods of the present disclosure. Regardless of whether newly created areas are provided with default characteristics, the characteristics of a newly created area may, in some embodiments, be changed as desired by a participant in or a moderator of a multiparty interaction.

Once a new area is created with the partition tool 932, the participant who created the new area may automatically be added to the new area, and may add other participants to the new area, e.g. by dragging their icons 912 to the new area. Where the new area is a private meeting area 1612, in some embodiments, all participants in the multiparty interaction may be able to see the private meeting area 1612 on their respective communication devices 104, and all participants may be permitted to move their respective icons into the private meeting area 1612 as desired. In such embodiments, the private meeting area 1612 provides an opportunity for participants in the multiparty interaction to figuratively move to the back or side of the conference room to engage in conversation or discussion with other meeting participants.

Figure 16:
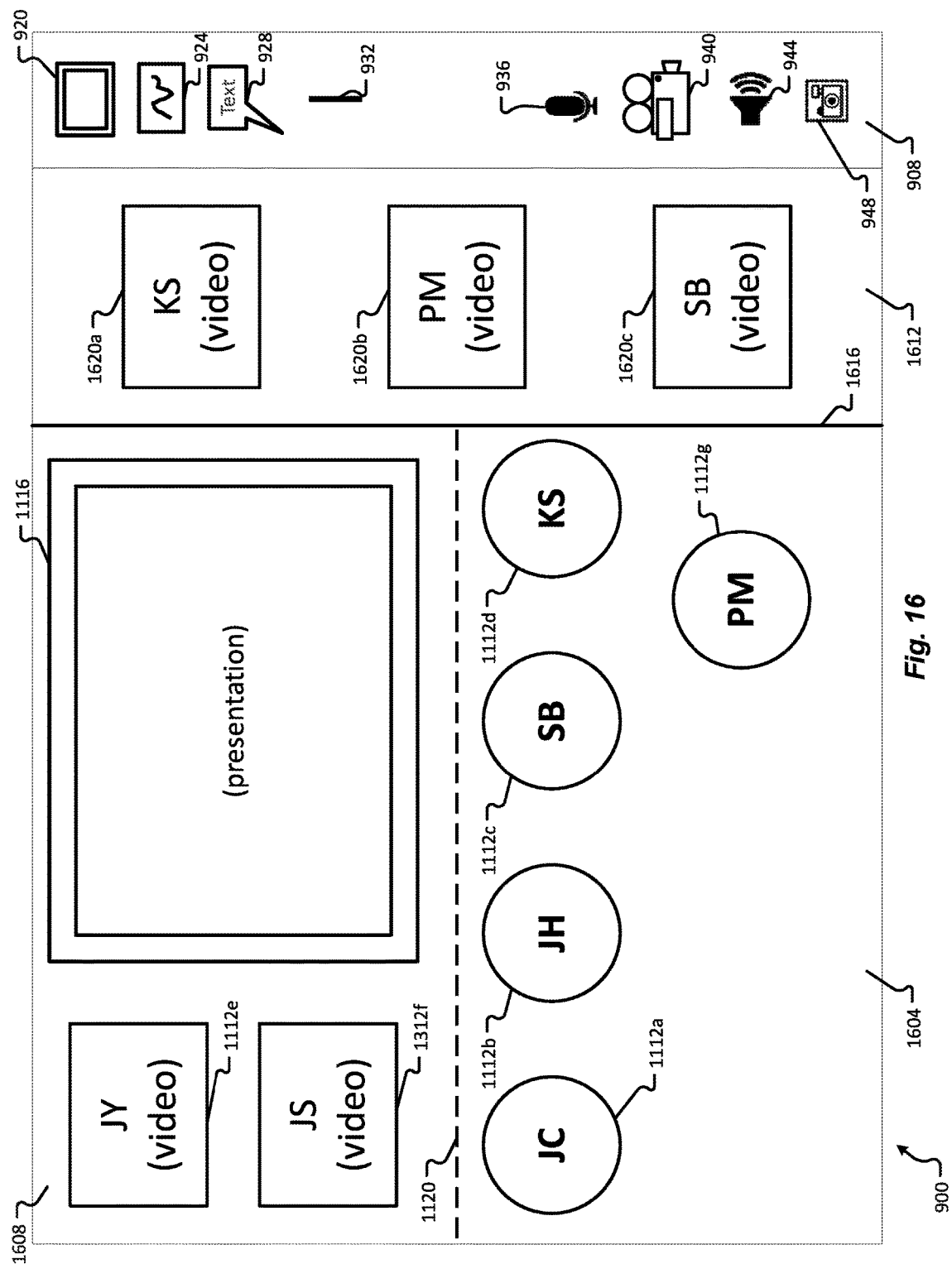
FIG. 16 is still another screenshot displayed on a graphical user interface of a communication device according to some embodiments of the present disclosure.
Figure 17:
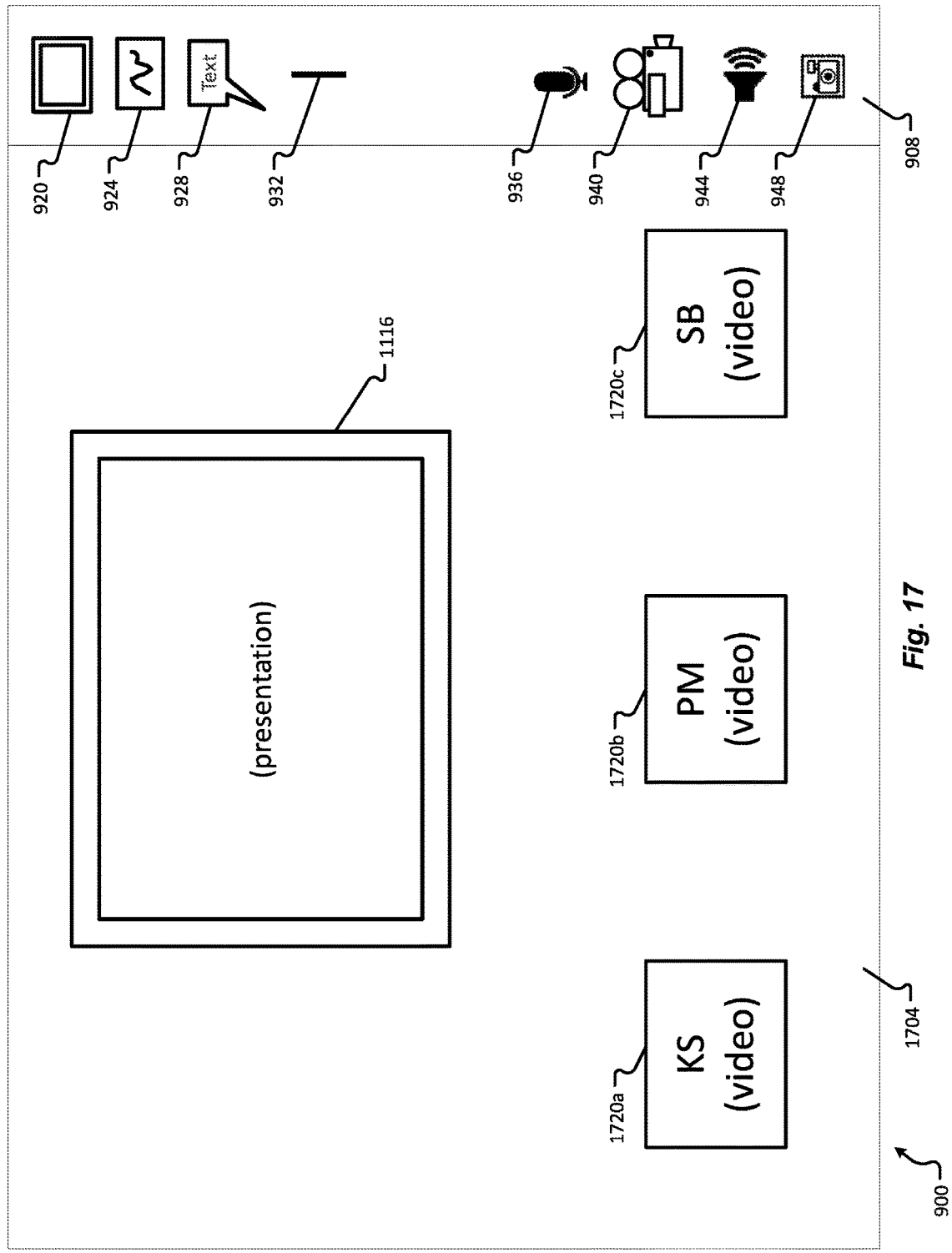
FIG. 17 is yet another screenshot displayed on a graphical user interface of a communication device according to some embodiments of the present disclosure.

As further explanation of how the partition tool 932 may be used to create a private meeting area 1612, in FIG. 16, for example, a participant KS may have created the private meeting area 1612 using the partition tool 932 to create a wall 1616. The participant KS may then have added the other participants SB and PM to the private meeting area 1612 (e.g. by dragging their icons 1112*c* and 1112*g* from the audience area 1604 to the private meeting area 1612), or the other participants SB and PM may have added themselves to the private meeting area 1612 (e.g. by dragging their own icons 1112*c* and 1112*g*, respectively, from the audience area 1604 to the private meeting area 1612). In some embodiments, participants in a partitioned area such as the area 1612 may communicate with each other (whether via audio, video, or data, which data may include, for example and without limitation, a presentation, a whiteboard, and/or a text message) without such communications being shared with participants who are not in the private meeting area 1612. In other embodiments, video and/or data communications, but not audio communications, may be shared with (e.g. received by and/or visible to) participants outside of the private meeting area 1612. In some embodiments, participants in the multiparty interaction may not be notified of the existence of the private meeting area 1612 and/or of the identity of participants in the private meeting area 1612 (whether by not being able to see the private meeting area 1612 and/or the icons 1620*a*, 1620*b*, and 1620*c* of the participants located therein on the graphical user interfaces 240 of their respective communication devices 104, or otherwise) unless they are invited to or included in the private meeting area 1612. Additionally, participants in a private meeting area 1612 may remain in one of an audience area 1604 and a presentation area 1608, as illustrated in FIG. 16 (where each of participants KS, PM, and SB are located in the audience area 1604 as well as the private meeting area 1612).

In some embodiments according to the present disclosure, a participant may choose whether to create a transparent wall or an opaque wall with the partition tool 932. Different types of walls created using the partition tool 932 may have different graphical representations within the interaction workspace 900 so as to be distinguishable to participants of the multiparty interaction with respect to which the walls were created. A transparent wall is a wall across which audio and/or video signals may be shared in at least one direction. For example, the transparent wall 1120 that divides the audience area 1104 from the presentation area 1108 may be configured to allow audio and/or video signals to be transmitted from the audience area 1104 to the presentation area 1108 and vice versa. Alternatively, the transparent wall 1120 may be configured to allow audio and video signals to be transmitted from the presentation area 1108 to the audience area 1104, but to allow no signals, or to allow only video signals, to be transmitted from the audience area 1104 to the presentation area 1108. Although some embodiments according to the present disclosure may utilize transparent walls to divide an audience area from a presentation area, other embodiments may not. For example, in some embodiments (which are described in greater detail below), each participant may be given certain capabilities based on the interaction area (e.g. the audience area or the presentation area) in which the participant is located (e.g. the capability to transmit audio to other participants in the same interaction area, or to other participants in a different interaction area; and/or the capability to transmit video to other participants in the same interaction area, or to other participants in a different interaction area), rather than using a transparent wall to filter communications between or among different interaction areas.

An opaque wall is a wall across which video signals, but no audio signals, may be shared. For example, the wall 1616 may be an opaque wall that prevents participants in the presentation area 1608 and the audience area 1604 from hearing audio communications from within the private interaction area 1612, and similarly prevents participants in the private interaction area 1612 from hearing audio from the audience area 1604 and the presentation area 1608. In the embodiment of FIG. 16, however, every participant in the private interaction area 1612 is also located in the audience area 1604 (as represented by icons 1112c, 1112d, and 1112g), and may still be able to receive audio communications from the presentation area 1608 and/or from other participants in the audience area 1604 by virtue of being located in the audience area 1604. If the wall 1616 were opaque, and if the participants SB, KS, and PM were not located in the audience area 1604, but were only located in the private interaction area 1612, then they would not receive any audio communications from the presentation area 1608 and the audience area 1604.

Figure 18:
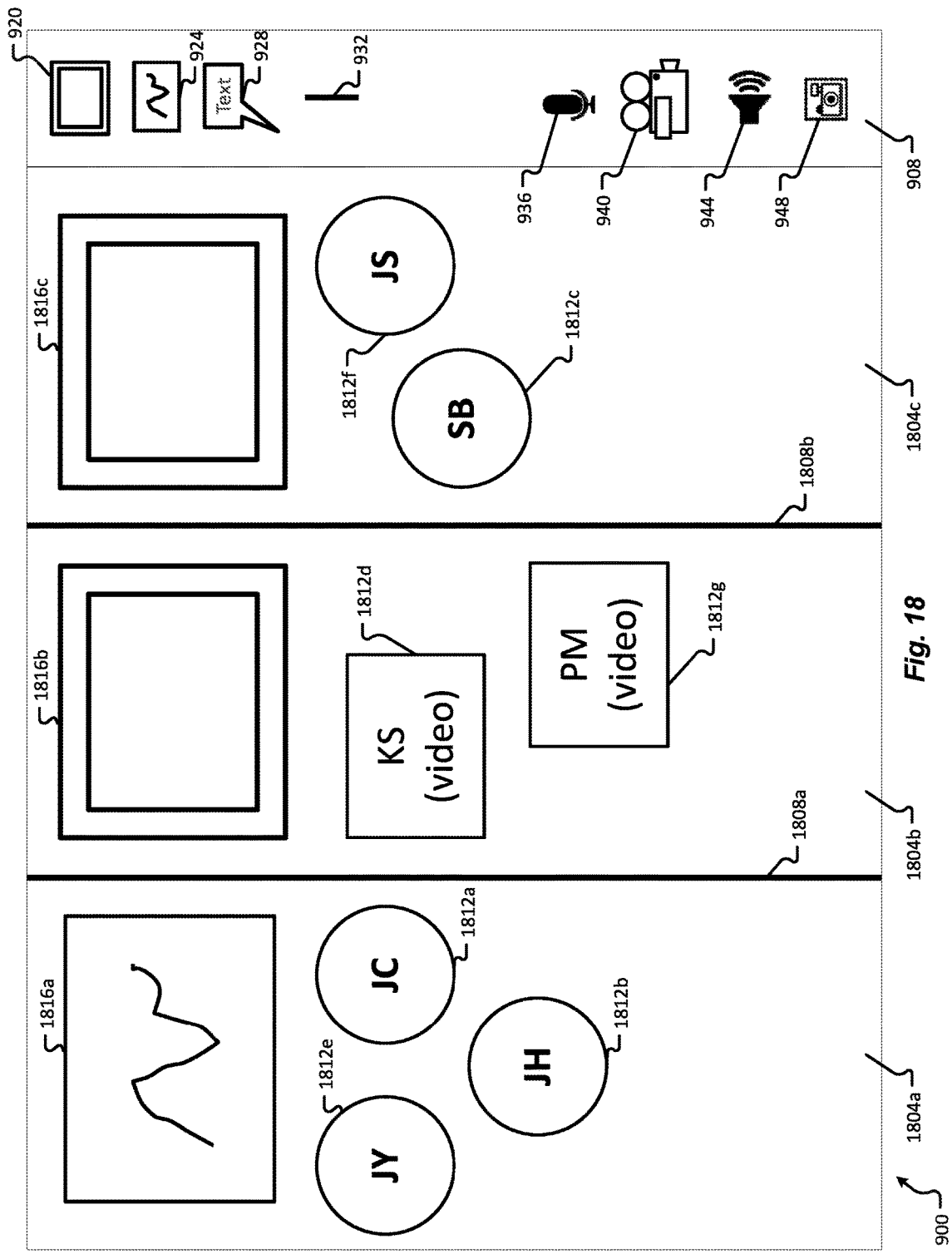
FIG. 18 is still another screenshot displayed on a graphical user interface of a communication device according to some embodiments of the present disclosure.

As another example of the use of opaque walls, the walls 1808a and 1808b of FIG. 18 may be opaque walls that prevent a participant in one interaction area from hearing audio from another interaction area. More specifically, the participant JY, represented by the icon 1812a located in the interaction area 1804a, may be able to view the live video feeds 1812d and 1812e from the participants KS and PM in the interaction area 1804b, but may not be able to hear the audio from the interaction area 1804b or from the interaction area 1804c without moving into those areas. Opaque walls are useful, for example, to establish multiple areas within a single multiparty interaction where participants can engage in small-group conversations, such as for breakout sessions during a break in a presentation, or for individual committee meetings during or after a large group meeting. Embodiments of the present disclosure are also useful for holding online trade shows (using opaque walls in the manner depicted in FIG. 18), wherein participants can move among virtual booths 1804a, 1804b, and 1804c. In embodiments, the opaque walls 1808a and 1808b may be configured to allow participants in any virtual booth 1804a, 1804b, or 1804c to see the whiteboard 1816a and presentation screens 1816b and 1816c of each virtual booth 1804, 1804b, and 1804c, respectively, such that a participant who notices a presentation of interest can move his or her icon (e.g. the icon 1812a, 1812b, 1812c, 1812d, 1812e, 1812f, or 1812g) to the corresponding booth 1804a, 1804b, or 1804c.

Whether a wall is transparent or opaque may also affect what happens (at least by default, in the absence of a customized setting) when an icon representing a participant in a multiparty interaction is dragged or otherwise moved across the wall. In some embodiments, when an icon is moved across a transparent wall, the icon continues to be displayed in the area in which it was previously located, and is also displayed in the area to which it was moved. In this manner, for example, the participant represented by the icon may continue to participate in a larger gathering of the presentation area and the audience area, while also joining another sidebar gathering on the other side of the transparent wall. On the other hand, when an icon representing a participant in a multiparty interaction is dragged or otherwise moved across an opaque wall or partition, the icon may no longer be displayed in the area from which it was moved, but rather may be displayed only in the private interaction area. In this manner, the participant represented by the icon may leave a larger gathering that encompasses the presentation area and the audience area, and join a smaller gathering that encompasses the private meeting area. Using transparent or opaque walls to enable this functionality beneficially allows participants in a multiparty interaction to engage in sidebar discussions within a partition of the interaction workspace 900 (in which participants are already involved) rather than having to use another communication format (e.g. telephone, text message, email, instant messaging, or the like) to set up and establish another interaction outside of the interaction workspace 900 (which often requires that one or more participants know other participants' contact information) for purposes of holding a sidebar discussion.

Figure 4:
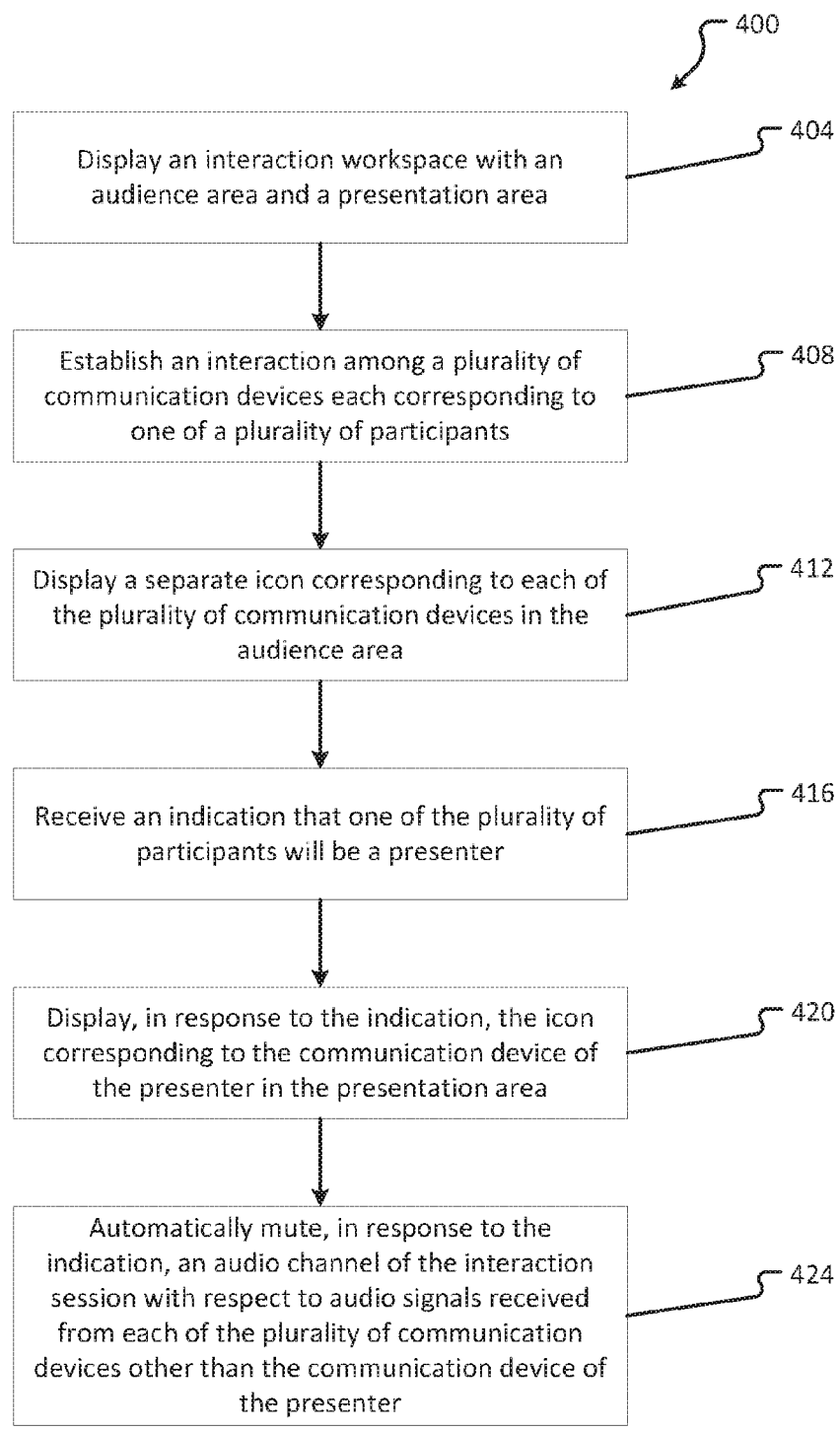
FIG. 4 is a flow diagram of a method according to an embodiment of the present disclosure.

Referring now primarily to FIG. 4, the method 400 comprises displaying an interaction workspace comprising an audience area and a presentation area (step 404). The interaction workspace may be an interaction workspace such as the interaction workspace 900. The interaction workspace may be displayed on a graphical user interface 240 of a communication device 104. The audience area may be, for example, an audience area such as the audience area 904 or 1104. The presentation area may be, for example, a presentation area such as the presentation area 1108.

The method 400 further comprises establishing an interaction among a plurality of communication devices, each corresponding to one of a plurality of participants (step 408). The interaction may be established over a communication network 112 or via a peer-to-peer connection between or among the plurality of communication devices. The interaction may be established or facilitated by a collaboration server 116 running a collaboration service 120, or it may be established or facilitated by a collaboration application 108 running one or more of the plurality of communication devices. The interaction may be initiated at a particular time by the collaboration server 116 based on a premade reservation, and/or when one or more of the plurality of participants clicks on a URL or other link in an invitation to join the interaction, and/or at the command or request of a first participant of the plurality of participants. Initiation of the interaction may comprise execution and completion of one or more authentication processes. For example, a communication device 104 of each participant who wishes to join the multiparty interaction may be required to complete an authentication process with a collaboration server 116 before the communication device 104 is joined to the multiparty interaction.

Establishing the interaction may further comprise creating at least one primary audio channel via which audio signals may be transmitted from each of the plurality of communication devices to every other one of the plurality of communication devices. The primary audio channel may permit, for example, a communication device 104a to transmit audio signals generated by the microphone 224 thereof to the communication devices 104*b* through 104*g*, which may then route the audio signals to the speakers 228 thereof, which may convert the audio signals into sound. Participants in the multiparty interaction may therefore speak into a microphone 224 of their respective communication devices 104, and be heard by the other participants in the multiparty interaction.

In some embodiments, establishing the interaction may further comprise creating at least one video channel via which video signals may be transmitted from each of the plurality of communication devices to every other one of the plurality of communication devices. The video channel may permit, for example, a communication device 104*a* to transmit video signals generated by the video camera 220 thereof to the communication devices 104*b* through 104*g*, which may then route the video signals to the graphical user interface 240 thereof for display of the video to participants using the communication devices 104*b* through 104*g*. The audio and video channels may or may not be combined into a single channel.

Another aspect of the method 400 comprises displaying, in the audience area, a separate icon corresponding to each of the plurality of communication devices (step 412). The separate icon for each communication device 104 may be a simple icon 912, and it may comprise a shape, a color, and/or text. Additionally or alternatively, the icon may comprise a still image of the corresponding participant (e.g. an image taken by a camera 216 in connection with the participant's use of the snapshot tool 948), or the icon may comprise another still image of the participant's choosing (e.g. a still image of a favorite landscape, a profile picture obtained from social media or elsewhere, or any other still image), which may or may not be stored in the memory 204 of the communication device 104. In still another alternative, the icon may comprise a still image selected by, or selected from an image repository of or available to, the interaction workspace 900, or a still image associated with an account of the participant with a service provider that manages the interaction workspace 900, or a still image selected by a moderator of the interaction workspace 900. As yet another alternative, the icon may comprise a live video feed of the corresponding participant, obtained via the video camera 220 of the participant's communication device 104. The icon may be static or dynamic in size, shape, color, and/or content. For example, the color of the icon may change over time, or the icon may alternately grow or shrink over time, or the icon may morph into different shapes over time, or the icon may display a plurality of still images over time.

The method 400 further comprises receiving an indication that one of the plurality of participants will be a presenter (step 416). The indication may comprise, for example, one of the plurality of participants dragging the presentation tool 920 from the tool area 908 of the interaction workspace 900 to the audience area 904 of the interaction workspace 900, which in some embodiments may cause a signal to be sent from the communication device 104 of the one of the plurality of participants to one or more of the communication devices 104 of the remainder of the plurality of participants, and/or to the collaboration server 116, that the one of the plurality of participants wishes to be a presenter. Alternatively, the indication may comprise initiation of the multiparty interaction by one of the plurality of participants, who may be the default presenter by virtue of having initiated the multiparty interaction. As another alternative, the indication may comprise a first of the plurality of participants dragging the presentation tool 920 from the tool area 908 to a second participant's icon, which in some embodiments may cause the second participant to become the presenter. As yet another alternative, the indication may comprise a participant dragging his or her icon 912 from an audience area 1104 to a presentation area 1108. In still another alternative, the indication may comprise a participant dragging an icon 912 corresponding to another participant from an audience area 1104 to a presentation area 1108.

Also included in the method 400 is displaying, in response to the indication, the icon corresponding to the communication device of the presenter in the presentation area (step 420). Thus, for example, upon receiving an indication that the participant JY will be a presenter, the interaction workspace 900 may move the icon 912*e* corresponding to the participant JY (and to the communication device 104*e* of the participant JY) from an audience area 904 or 1104 to a presentation area 1108. In some embodiments, the interaction workspace 900 may also convert the simple icon 912*e* into a live video feed 1112*e*. In addition to displaying the icon corresponding to the presenter in the presentation area, the workspace may also display a presentation screen 1116 in the presentation area, upon which a slideshow, video, or other presentation may be displayed. The presentation may originate from the communication device 104 of the presenter, or the presentation may originate from another communication device 104 of a participant in the multiparty interaction. Alternatively, the presentation may be stored in the cloud, and may be streamed into the multiparty interaction via a communication device 104 and/or via the collaboration server 116.

The method 400 further includes automatically muting, in response to the indication, an audio channel of the interaction with respect to audio signals received from each of the plurality of communication devices other than the communication device of the presenter (step 424). In other words, the presenter is able to communicate audio information to the other participants in the interaction, but other, non-presenting participants are unable to communicate audio information to the other participants in the interaction. In this way, the presenter can speak to the other participants without interruption (whether purposeful or inadvertent) by any of the other participants. Embodiments of the present disclosure thus avoid the problem of one or more non-presenting participants having to (and/or forgetting to) mute their microphones 224 before engaging in other conversations or audible activities. Embodiments of the present disclosure also avoid the problem of distracting and/or excessive background noise being transmitted from a non-presenting participant's communication device 104 to the communication devices 104 of other participants.

Muting an audio channel or audio signal for a given participant in a multiparty interaction may be accomplished in a variety of ways. For example, the muting may comprise turning off the microphone 224 of the participant's communication device 104. The muting may alternatively comprise sending or executing a command or instruction that causes the participant's communication device 104 to stop sending or transmitting audio signals via the audio channel of the interaction, or to stop sending or transmitting audio signals with meaningful data via the audio channel of the interaction. As another alternative, the muting may comprise causing other participants' communication devices 104 not to play (e.g. via their respective speakers 228) or to otherwise ignore or do nothing with audio signals received from the participant's communication device 104. As still another alternative, when a collaboration server 116 is used to facilitate a multiparty interaction, including by receiving audio signals from each participating communication device

104 and transmitting them for playback to every other communication device 104, the muting may comprise causing the collaboration server 116 not to transmit received audio signals from a muted communication device 104 to every other communication device 104.

Likewise, unmuting of an audio channel or audio signal for a given participant in a multiparty interaction may also be accomplished in a variety of ways. For example, the unmuting may comprise turning on the microphone 224 of the participant's communication device 104. The unmuting may alternatively comprise sending or executing a command or instruction that causes the participant's communication device 104 to start sending or transmitting audio signals via the audio channel of the interaction, or to start sending or transmitting audio signals with meaningful data via the audio channel of the interaction. As another alternative, the muting may comprise causing other participants' communication devices 104 to play (e.g. via their respective speakers 228) or to otherwise stop ignoring or doing nothing with audio signals received from the participant's communication device 104. As still another alternative, when a collaboration server 116 is used to facilitate a multiparty interaction, including by receiving audio signals from each participating communication device 104 and transmitting them for playback to every other communication device 104, the unmuting may comprise causing the collaboration server 116 to begin transmitting received audio signals from the newly unmuted communication device 104 to every other communication device 104.

While the method 400 is depicted in FIG. 4 as muting only audio signals from the non-presenting participants, in some embodiments video signals from the non-presenting participants may be muted as well. Muting of video signals (e.g. so that participants in the multiparty interaction see only live video from the presenter) may be particularly useful when limited bandwidth is available for communications among the multiparty interaction participants, as video feeds often require substantial bandwidth. Video signals may be muted and unmuted in ways similar to those described above for audio signals. Thus, for example, muting a video signal may comprise turning off the video camera 220 of the communication device 104 to be muted, or sending or executing a command or instruction to the communication device 104 corresponding to a participant whose video signals are to be muted that causes the communication device 104 to stop sending or transmitting video signals via a video channel of the interaction, or to stop sending or transmitting video signals with meaningful data via the video channel of the interaction. The muting of video signals may also comprise causing other participants' communication devices 104 not to play (e.g. via their graphical user interfaces 240) or to otherwise ignore or do nothing with video signals received from the participant's communication device 104. As still another alternative, when a collaboration server 116 is used to facilitate a multiparty interaction, including by receiving video signals from each participating communication device 104 and transmitting them for playback to every other communication device 104, the muting may comprise causing the collaboration server 116 not to transmit received video signals from a muted communication device 104 to every other communication device 104. Unmuting a video signal may comprise, for example, reversing any of the foregoing actions. As persons of ordinary skill in the art will recognize based on the foregoing disclosure, muting options that allow video signals to be sent over a video channel of an interaction, but that prevent playback of meaningful video data by communication devices 104 that receive the video signals, may not reduce bandwidth requirements, and therefore may be best utilized in embodiments where sufficient bandwidth is available to support multiple video streams.

Muting a communication device may refer to muting an audio signal from the communication device, muting a video signal from the communication device, or both. Similarly, references to muting audio, muting an audio input, muting the audio of a participant, and muting the audio of a communication device, all refer to muting an audio signal as described above, and references to muting video, muting a video input, muting the video of a participant, and muting the video of a communication device, all refer to muting a video signal as described above.

In some embodiments of the present disclosure, a participant's audio and/or video signals may be selectively muted for a given area of an interaction workspace 900 and/or for a given communication device 104. For example, the audio signals provided by communication devices corresponding to participants in an audience area 1104 of an interaction workspace 900 may be muted with respect to each other (so that one participant in the audience area 1104 cannot hear audio communications from another participant in the audience area 1104), but not with respect to the presenter in the presentation area 1108. Alternatively, the audio signals provided by communication devices corresponding to participants in an audience area 1104 may be muted with respect to any participants in the presentation area 1108, but not with respect to each other (so that one participant in the audience area 1104 can hear audio communications from another participant in the audience area 1104, but a participant in the presentation area 1108 cannot hear the same audio communications). In another alternative, the audio signals provided by communication devices corresponding to participants in a private meeting area 1612 created using the partition tool 932 may be muted with respect to participants in the audience area 1604 and the presentation area 1608, but not with respect to each other (so that one participant in the private meeting area 1612 can hear audio communications from another participant in the private meeting area 1612, but a participant in the audience area 1604 or in the presentation area 1608 cannot hear the same audio communications).

As another example, a first participant in a multiparty interaction may be provided with the capability to mute an audio or video signal from a second participant in the multiparty interaction, but only with respect to the first participant. In this way, if a given participant has insufficient bandwidth to support a live video feed from one or more other participants, the given participant can mute one or more live video streams of other participants to free up bandwidth for remaining live video streams, or for other purposes. Similarly, if a given participant were distracted by a background noise being transmitted via another participant's communication device 104, the given participant could mute the audio signals being transmitted by the other participant's communication device 104, so as to eliminate the distracting background noise for the given participant.

As may be appreciated based on the foregoing disclosure, different areas of the interaction workspace 900 may be characterized by one or more behaviors, including a muting behavior and a video behavior. When participants move from one area to another within the interaction workspace 900, the behaviors of the area into which the participants move may be applied to the newly arrived participants. Thus, if a participant SB moves from an audience area 1104 in which every participant's audio is muted to a presentation area 1108 in which every participant's audio is unmuted, the audio of the participant SB may switch from muted to unmuted when the participant SB is moved to the presentation area 1108. Similarly, if the presentation area 1108 is further characterized in that all participants in the presentation area 1108 provide a live video stream, then the simple icon 1112c corresponding to the participant SB may change into a live video feed 1212c when the participant SB is moved to the presentation area 1108. The reverse is also true; if the participant SB moves back to the audience area 1104 from the presentation area 1108, then the participant SB's audio may switch from unmuted to muted, and the participant SB's representation within the interaction worskpace 900 may switch from a live video feed 1212c to a simple icon 1312c.

In some embodiments, participant-specific muting or other behaviors or characteristics may not change when a participant moves from one area to another. Thus, if a first participant mutes an audio or video signal from a second participant (which muting would only apply to the first participant), then the muting may continue to apply regardless of whether the second participant moves into an area of the interaction workspace 900 characterized by every participant's audio or video signals being unmuted.

Also in some embodiments, the one or more behaviors that characterize a given area may be default behaviors that participants located within the area can selectively modify according to their individual preferences. For example, even though an audience area 1104 may be characterized by the muting of every participant located therein, individual participants may selectively unmute audio signals from other participants in the audience area, thus overriding the default behavior of the audience area 1104 of universal muting. Similarly, even though a presentation area 1108 may be characterized by every participant therein transmitting a live video feed, a given participant located within the presentation area 1108 may choose to be represented by a still image or by a simple icon rather than a live video feed, thus overriding the default behavior of the presentation area 1108 of every participant transmitting a live video feed.

The method 400 may include additional steps not illustrated in FIG. 4. For example, the method 400 may include receiving a second indication that a first of the plurality of participants wishes to establish a private meeting with a second of the plurality of participants. This indication may comprise, for example, the first of the plurality of participants dragging the partition tool 932 onto the second of the plurality of participants to create a new private meeting area in which both the first and the second of the plurality of participants are located, and/or dragging the icon 912 representing the second of the plurality of participants into an existing private meeting area. In some embodiments, the indication may also comprise the first of the plurality of participants dragging his or her icon 912 onto the icon 912 of the second of the plurality of participants, which may cause the interaction workspace 900 (or, more particularly, the collaboration application 108 or collaboration service 120) to create a new private meeting area within the interaction workspace 900 that is populated with the first and the second of the plurality of participants.

The method 400 may also include establishing, in response to the second indication, a secondary audio channel via which audio signals received from a communication device 104 corresponding to the first of the plurality of participants can be sent to a communication device 104 corresponding to the second of the plurality of participants and vice versa. The secondary audio channel may be separate from or part of the primary audio channel. In some embodiments, a secondary audio channel may not be needed, created, or used to facilitate audio communication among participants in the private meeting area.

The method 400 may further include displaying in a private meeting area, via the graphical user interfaces 240 of their respective communication devices 104 and in response to the second indication, the icons 912 corresponding to the first and second of the plurality of participants. For example, FIG. 16 illustrates a private meeting area 1612 displaying live video feeds 1620a, 1620b, and 1620c corresponding to the participants in the private meeting area 1612 (participants KS, PM, and SB). The private meeting area 1612 may be displayed only on the graphical user interface 240 of the communication devices 104 of the participants in the private meeting area 1612, so that other participants in the multiparty interaction are unaware of the existence of the private meeting area 1612. Alternatively, the private meeting area 1612 may be displayed on the graphical user interface 240 of the communication devices 104 of all of the participants in the multiparty interaction, allowing all participants to see the private meeting area. However, in the latter instance, the audio and, in some cases, the video of participants in the private meeting area may be muted with respect to participants in the audience area 1604 and the presentation area 1608 (e.g. so that communications among the participants in the private meeting area 1612 remain private).

Figure 5:
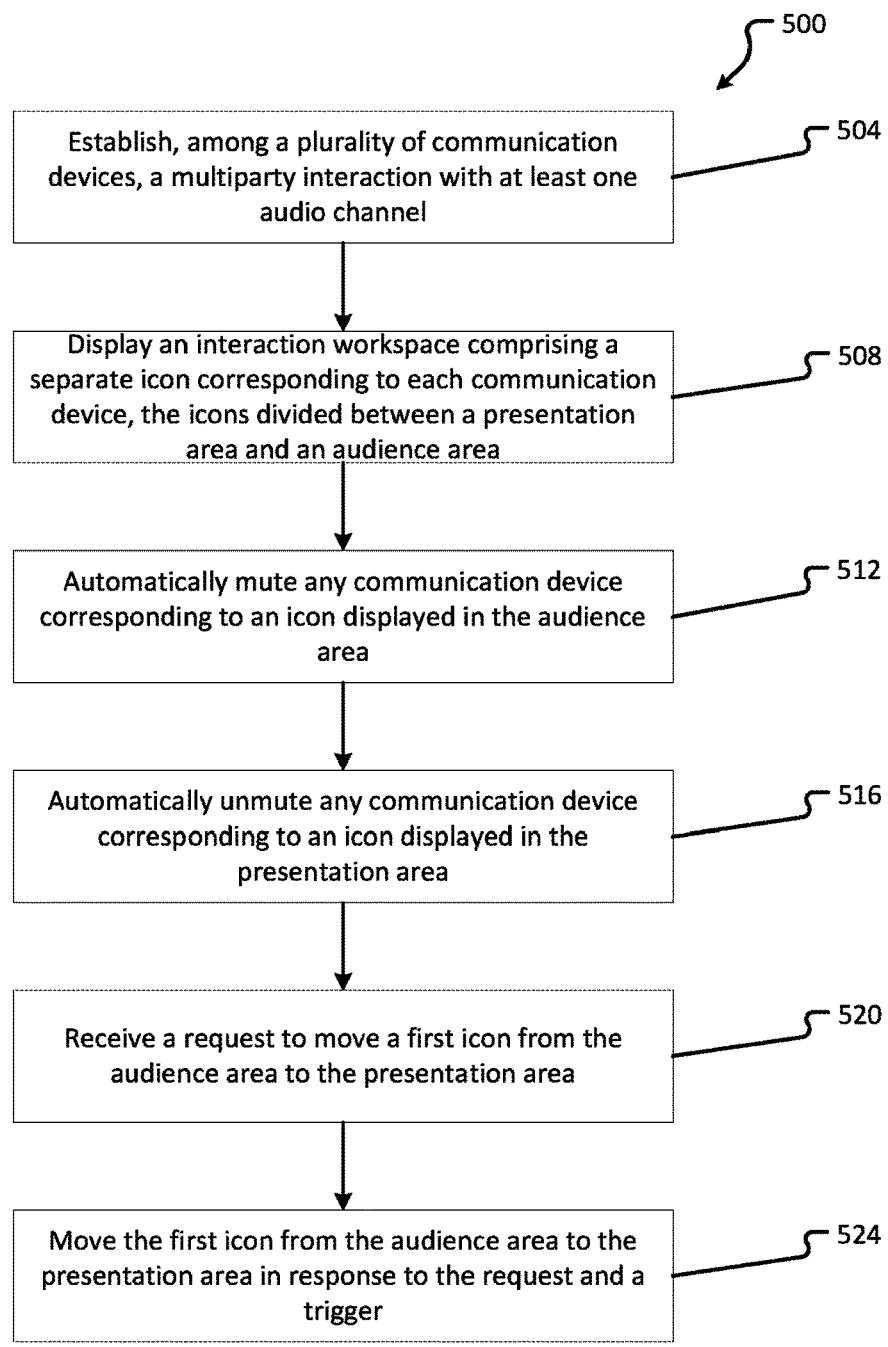
FIG. 5 is a flow diagram of a method according to another embodiment of the present disclosure.

Referring now to FIG. 5, a method 500 according to an embodiment of the present disclosure may comprise establishing, among a plurality of communication devices, a multiparty interaction with at least one audio channel (step 504). The multiparty interaction may be established substantially as described above with respect to step 408 of the method 400.

The method 500 may also comprise displaying an interaction workspace comprising a separate icon corresponding to each communication device of the plurality of communication devices, where the icons are divided between a presentation area and an audience area (step 508). The interaction workspace, including the audience area, the presentation area, and the icons corresponding to the communication devices of the participants in the multiparty interaction, may be displayed substantially as described above with respect to steps 404 and 412 of the method 400.

The method 500 may further comprise automatically muting any communication device corresponding to an icon displayed in the audience area (step 512). The muting may occur in any manner described within the present disclosure, and may comprise muting audio signals of a communication device, video signals of a communication device, or both.

The method 500 may still further comprise automatically unmuting any communication device corresponding to an icon displayed in the presentation area (step 516). The automatic unmuting may occur, for example, in response to the icon being moved from the audience area to the presentation area. Alternatively, in embodiments where a presenter is defined before a multiparty interaction is established or initiated (and in embodiments where the participant who caused the multiparty interaction to be established or initiated is placed in the presentation area by default), the automatic unmuting may occur when the multiparty interaction is first established or initiated. The automatic unmuting may comprise automatically unmuting audio signals of the communication device corresponding to the icon located in the presentation area, or automatically unmuting video signals of the communication device corresponding to the icon located in the presentation area, or both. Automatically unmuting video signals may comprise, for example, changing a simple icon 912 to a live video feed, such as the live video feed 1112e. Unmuting an audio or video signal may occur in any manner described in the present disclosure. In some embodiments, this step may not be necessary (e.g. if the communication device corresponding to the icon displayed in the presentation area was not previously muted).

Another aspect of the method 500 is receiving a first request to move or promote a first icon from the audience area to the presentation area (e.g. a "promotion request") (step 520). The first request may be generated by or in response to any signal that a participant would like to be promoted to the presentation area. For example, the first request may be generated by or in response to a participant selecting his or her icon 912, using his or her communication device 104. The first request may also be generated in response to a participant dragging his or her icon 912 to the presentation area. Additionally, the first request may be generated by a user opening a menu (e.g. by double tapping or right clicking on his or her icon 912, or elsewhere in the interaction workspace 912) and selecting an option that causes the first request to be generated and sent.

As persons of ordinary skill in the art will recognize based upon the foregoing disclosure, the first request to move or promote a first icon from the audience area to the presentation area is essentially a request by a participant corresponding to the first icon to be given the capabilities or privileges of a presenter—e.g., to have the participant's audio and/or video signal unmuted, to address the other participants in the multiparty interaction, and/or (perhaps) to control the presentation screen. Thus, in some embodiments, the first request is a request to be granted one or more of the capabilities or privileges of a presenter, even if it does not include a request to move a first icon from the audience area to the presentation area. For example, a participant SB represented by an icon 1112c may send a first request to be moved from the audience area 1104 to the presentation area 1108 so as to be able to ask a question of the participant/presenter JY (represented by the live video feed 1112e) that the remainder of the audience can hear. Alternatively, the participant SB may send a first request to be unmuted (but without requesting that the icon 1112c be moved from the audience area 1104 to the presentation area 1108), for the same purpose of being able to ask a question of the participant/presenter JY.

The method 500 also comprises moving the first icon from the audience area to the presentation area in response to the first request and a trigger (step 524). In some embodiments, the trigger may be an indication provided by a participant located in the presentation area. The indication may be, for example, an indication that the participant in the presentation area is willing to allow someone else to speak momentarily, or is ready to take questions, or is finished with his or her portion of a presentation. Thus, if the participant SB (corresponding to the icon 1112c) made the first request (e.g. through his or her communication device 104), then a participant/presenter JY (represented by the live video feed 1112e) may grant the first request by selecting the icon 1112c. In some embodiments, the trigger may comprise the presenter moving his or her icon 912 from the presentation area to the audience area, thus virtually "ceding the floor" to the participant who made the first request. Similarly, the trigger may comprise a second request by the presenter to move the presenter's icon from the presentation area to the audience area. In other embodiments, the trigger may comprise the presenter selecting his or her own icon, to indicate that his or presentation is paused or finished and that someone else may be granted (at least temporarily) the privileges and/or capabilities of a presenter. In still other embodiments, the trigger may comprise the presenter opening a menu and selecting an option corresponding to granting the first request.

According to some embodiments of the present disclosure, a multiparty interaction may be facilitated by a moderator, who controls the location of each participant within the various areas of an interaction workspace as well as, in some embodiments, one or more capabilities or privileges of each participant within the interaction. In such embodiments, the trigger may comprise an indication or other action by which the moderator grants the first request. In embodiments where the presenter makes a second request to move the presenter's icon from the presentation area to the audience area, the trigger may comprise the moderator granting the second request, which may automatically cause the first request to be granted as well. Indeed, in some embodiments, regardless of whether a moderator is used, the interaction workspace 900 may be configured such that the first request is granted automatically as soon as no other participants are located in the presentation area.

In still other embodiments, the trigger may comprise the expiration of a predetermined period of time. For example, one or more participants in a multiparty interaction may be allotted a predetermined period of time to speak to the remaining participants within the multiparty interaction. If the first request is made while a time-limited participant is speaking or otherwise presenting, then the expiration of the time-limited participant's time may be the trigger that causes the first request to be granted.

In still additional embodiments, the trigger may be a period of silence by a presenter. For example, the first request may be granted if a currently presenting participant is silent (e.g. if the communication device corresponding to the currently presenting participant does not transmit an audio communication) for three seconds, or for five seconds, or for ten seconds, or for any other predetermined amount of time. In other embodiments, a presenting participant and/or a moderator may be enabled to promote an audience member (e.g. a participant whose participant icon is located in the audience area) to the presentation area by selecting the audience member's icon, dragging the audience member's icon to the presentation area, or providing another predetermined indication, regardless of whether the audience member made a promotion request. This may be particularly useful, for example, in a multiparty interaction among a teacher or professor and his or her students.

Once the trigger is activated or initiated, (e.g. once the promotion request is granted), the icon 1112c may be moved from the audience area 1104 to the presentation area 1108. Additionally or alternatively, the participant SB may be granted the capabilities and/or privileges of a presenter (e.g. the capabilities and/or privileges of the presentation area), including the ability to transmit a live video stream from his or her communication device 104 to the remaining participants in the audience area 1108, (as illustrated by live video feed 1212c of FIG. 12) and/or to have his or her audio and/or video signals unmuted, so that he or she can communicate via audio or video with the remaining participants in the audience area 1108. The one or more participants already located in the presentation area may remain in the presentation area with the same capabilities they previously had (e.g. the ability to speak to the participants in the audience area, and the ability to utilize a presentation screen or whiteboard), or they may remain in the presentation area with reduced capabilities (e.g. their audio may be muted), or they may be moved from the presentation area to the audience area, where they may be given or assigned, or where they may adopt, the default or standard capabilities or characteristics of participants located in the audience area (e.g. muted audio and/or video, no ability to control a presentation screen or whiteboard).

When a first request to move or promote an icon from an audience area to a presentation area (or to give an icon one or more privileges or capabilities not currently associated with the icon, such as the ability to speak to the audience, and/or to provide a live video feed to the audience, and/or to control a presentation screen or whiteboard visible by the audience) is received, the icon corresponding to the participant that made the promotion request may be highlighted or otherwise modified as an indication to the presenter, to the requesting participant, and to other participants within the audience area that the participant corresponding to the highlighted icon has made the first request. For example, the highlighted icon 1112c in FIG. 11 indicates the participant SB has made a promotion request. (However, in some embodiments, a moderator, a presenting participant, or one or more non-presenting participants may be enabled to make a promotion request for another participant. For example, a participant associated with priority data indicating that the participant is the boss of another participant may be enabled to make a promotion request for the other participant.) Highlighting may be beneficial, for example, to let the presenter know that another participant would like to address the audience, or that the participant has a question, or that the participant has an answer to a question posed by the presenter to the audience. Highlighting may also be beneficial to the requesting participant, as the highlighting provides an indication to the requesting participant that the request was successfully made. Highlighting or otherwise modifying the icon corresponding to the participant that made the first request may also be beneficial to the audience, for example to allow other audience members to see that another participant has made the request, which may or may not influence whether other participants in the audience which to make a promotion request.

The method 500 may comprise additional steps beyond those illustrated in FIG. 5. For example, the method 500 may comprise receiving, from other participants in the audience area of the interaction workspace, additional promotion requests to move the icons corresponding to the other participants to the presentation area, or for one or more privileges or capabilities associated with the presentation area. As each promotion request is received, the participant who made the request may be added to a promotion queue, which tracks the order in which promotion requests are made. For example, the promotion requests may be granted in the order they were received, or they may be granted based on a relative importance of the participants in the queue.

Figure 11:
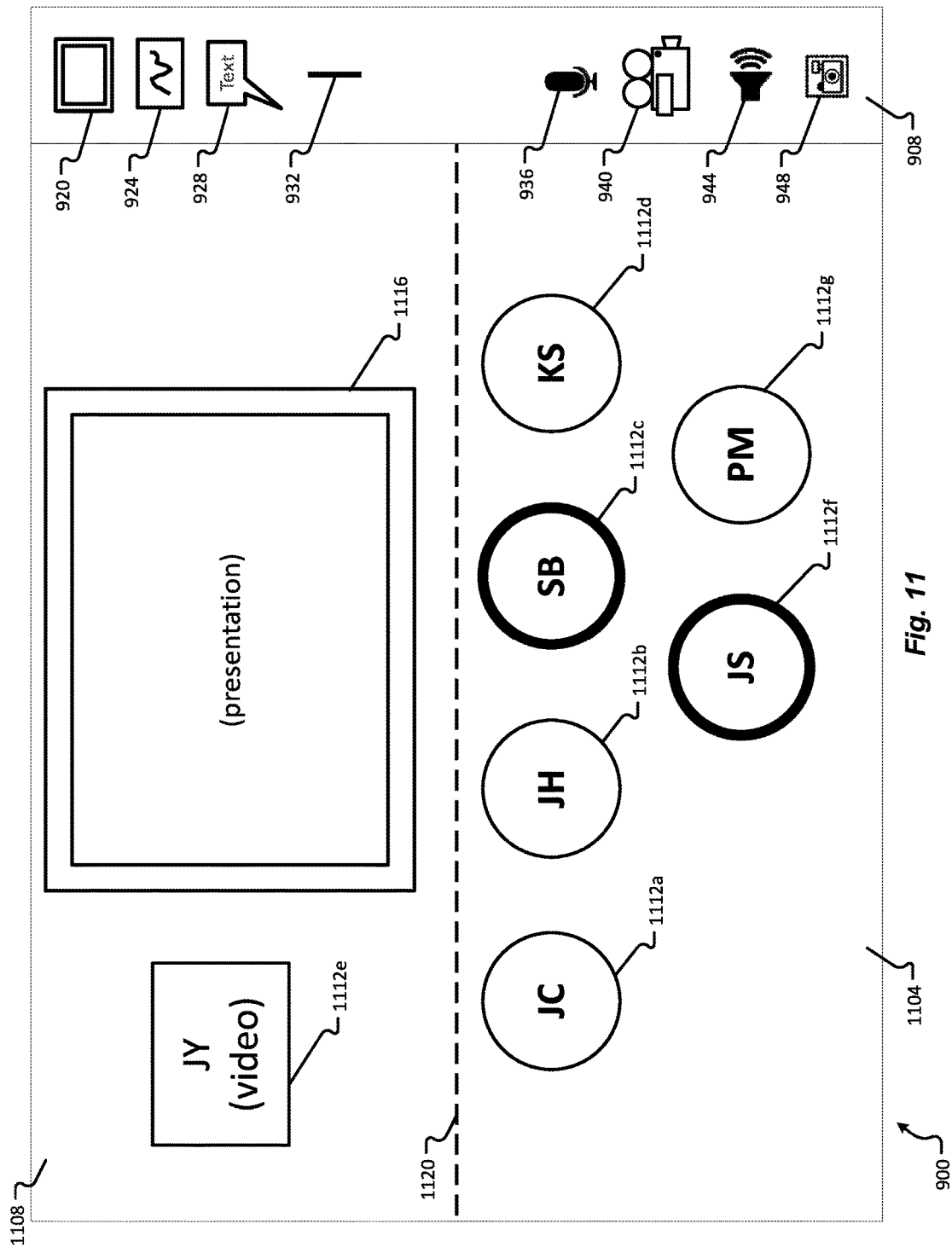
FIG. 11 is yet another screenshot displayed on a graphical user interface of a communication device according to some embodiments of the present disclosure.
Figure 12:
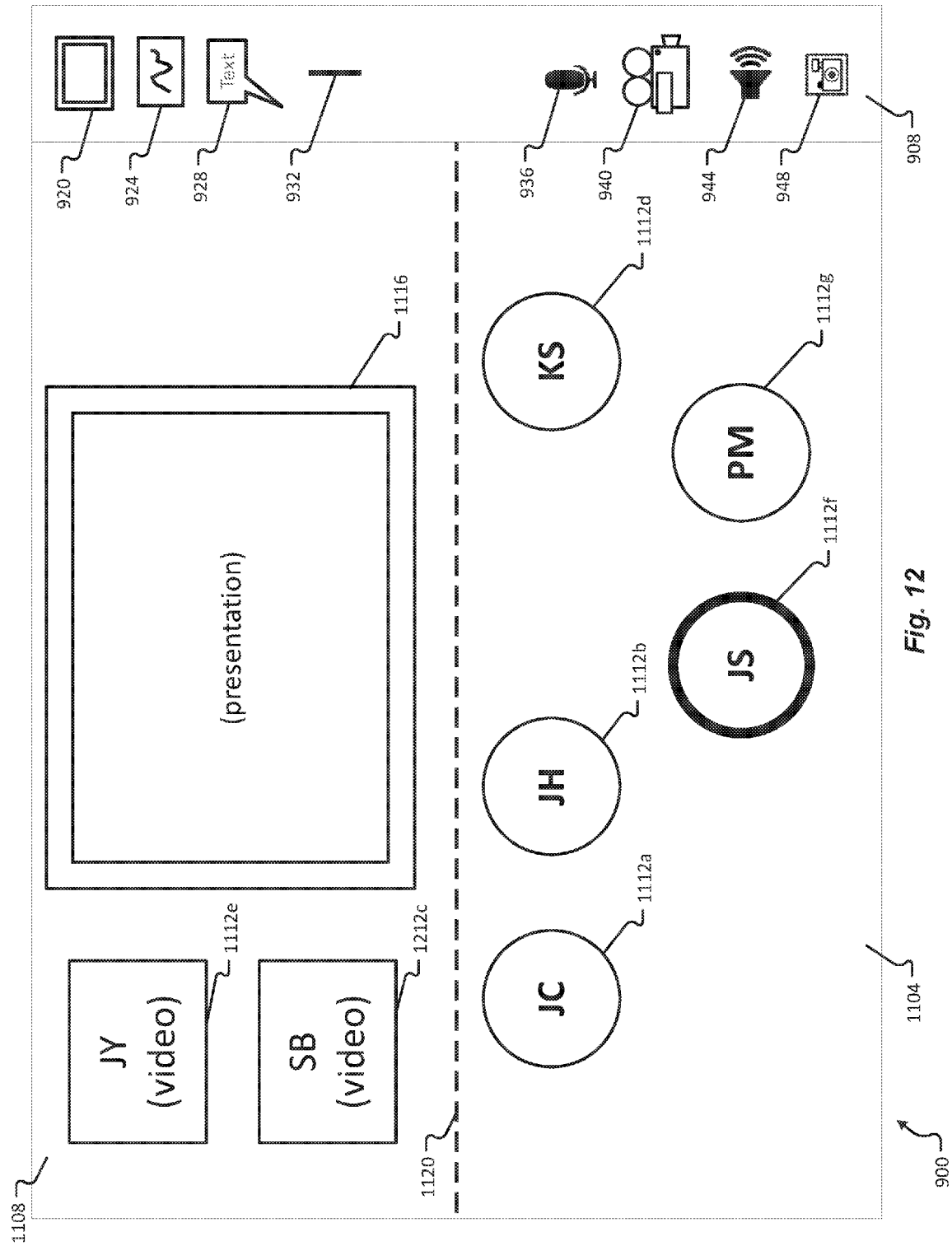
FIG. 12 is still another screenshot displayed on a graphical user interface of a communication device according to some embodiments of the present disclosure.
Figure 13:
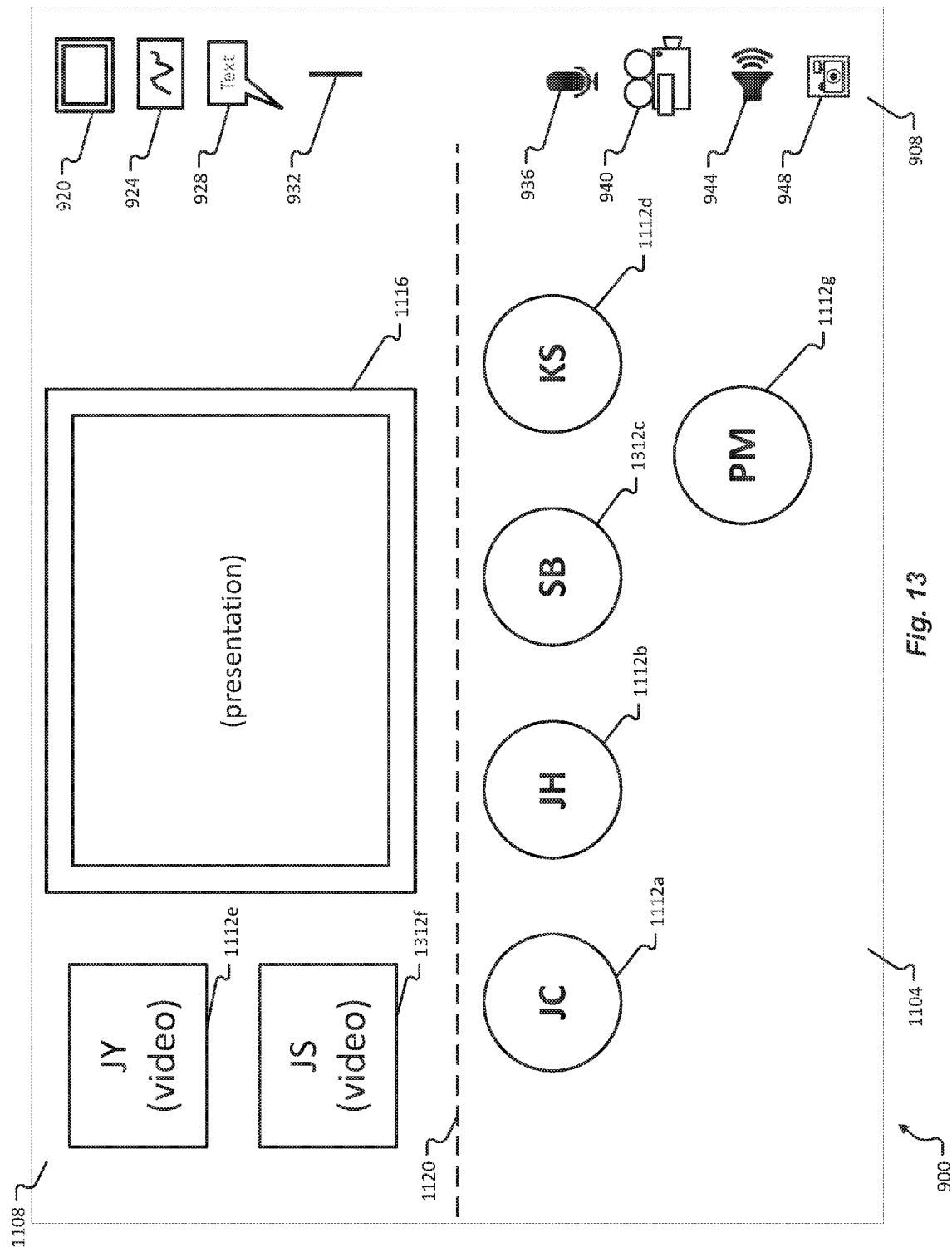
FIG. 13 is yet another screenshot displayed on a graphical user interface of a communication device according to some embodiments of the present disclosure.
Figure 14:
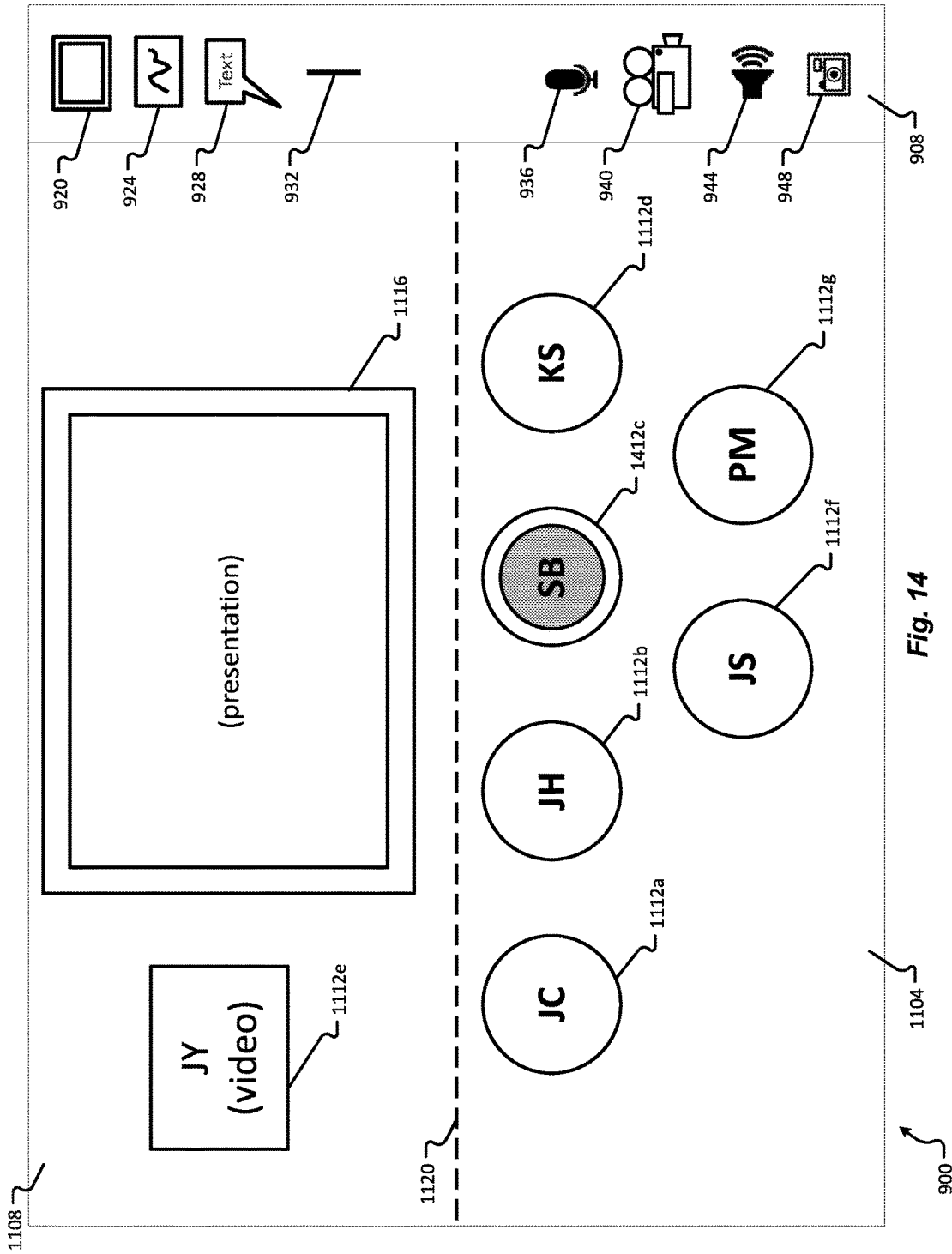
FIG. 14 is still another screenshot displayed on a graphical user interface of a communication device according to some embodiments of the present disclosure.

Thus, in one embodiment, a first participant SB may make a first request to be moved to the presentation area, and a second participant JS may make a second request to be moved to the presentation area. The participants SB and JS are added to a promotion queue when their requests are made. The promotion queue may be stored in the memory 204 or 304 of a communication device 104 or a collaboration server 116, respectively. The icons 1112c and 1112f representing the participants SB and JS may be highlighted, as illustrated in FIG. 11, to indicate that they have pending promotion requests. When the participant JY is finished speaking or is ready to allow someone else to speak, the participant JY may select his or her icon 1112e (via his or her communication device 104e), in response to which trigger the participant SB's request may be granted (e.g. because the participant SB has been in the promotion queue longer than the participant JS), as illustrated in FIG. 12. When the participant SB's request is granted, the participant SB may be removed from the promotion queue. Similarly, once the participant SB is finished speaking or otherwise presenting, the participant SB may provide a completion indication. For example, the participant SB may select his or her own icon 1212c, in response to which trigger the participant JS's request may be granted. The participant JS's icon 1112f may then be moved into the presentation area 1108, where it becomes the icon 1312f, as illustrated in FIG. 13. When the participant JS's request is granted, the participant JS may be removed from the promotion queue. At the same time, the participant SB's icon 1312c may be moved back to the audience area 1104, where it is no longer highlighted (as the participant SB no longer has a pending request to be moved to the presentation area 1108), and where the participant SB adopts or resumes the privileges and capabilities of the audience area 1104 (e.g. the participant SB's audio and/or video are muted, at least by default, with respect to other participants in the audience area 1104 and the presentation area 1108). When the participant JS is finished speaking or otherwise presenting, the participant JS may provide a completion indication. For example, the participant JS may select his or her own icon 1312f. If another participant is in the promotion queue, the other participant's promotion request may be granted in response to the completion indication from the participant JS. If no other participant is in the promotion queue, the completion indication may result in the participant JS being returned to the audience area 1104, where his or her icon is no longer highlighted and where he or she adopts or resumes the privileges and capabilities of the audience area 1104.

As participants are moved from the audience area 1104 to the presentation area 1108 and back again, a primary presenter (in FIGS. 11-13, participant JY) may remain in the presentation area 1108, and may maintain the privileges and capabilities of the presentation area 1108. This allows, for example, the primary presenter (e.g. participant JY) and the temporary presenter (e.g. participant SB or participant JS) to engage in a dialogue that the remaining participants in the audience area 1104 can hear and see. Additionally, movement of a temporary presenter from the presentation area 1108 to the audience area 1104 may constitute a trigger that causes another participant with a pending request to the moved from the audience area 1104 to the presentation area 1108.

Where multiple participants have a pending promotion request, the icon corresponding to each participant who makes such a request may be highlighted when the promotion request is made, so that the presenting participant and participants in the audience area 1104 can see which participants have made a promotion request and how many participants have made a request. The highlighting may be different for each participant, and the difference in highlighting may correspond to or reflect the order in which each participant's request was made. In embodiments where the trigger comprises the presenter selecting an icon corresponding to a participant with an outstanding request (such that the outstanding request is granted when the presenter selects the icon), the presenter can then determine, based on the highlighting, which participant has been waiting the longest to have an outstanding request granted. In other embodiments, the interaction workspace 900 may display an ordered list of participants with a pending request to be moved to the presentation area 1108, which may be visible to participants in the presentation area 1108, participants in the audience area 1104, or all participants in the interactive workspace 900.

In some embodiments, participants in a multiparty interaction may be assigned or otherwise associated with priority information, which may be based on role, importance, or some other hierarchy or organizational structure. The priority information may be entered on an organization-wide level (e.g. by a third party service provider that contracts with an organization to provide embodiments of the systems and methods described herein for multiparty interactions, or by an organization that itself manages and uses embodiments of the systems and methods described herein), or the priority information may be entered on an individual basis by each participant, whether as part of setting up an account with a service provider to gain access to embodiments of the systems and methods described herein, or as part of logging into a multiparty interaction using embodiments of the systems and methods described herein. Priority information entered on an organization-wide level may be saved, for example, in the memory 304 of a collaboration server 116. Priority information entered on an individual level may be saved, for example, in the memory 304 of a collaboration server 116, or in the memory 204 of a communication device 104. In some embodiments, priority information is not saved in the memory 304 of a collaboration server 116 or in the memory 204 of a communication device 104, but is rather made available to a collaboration server 116 and/or a communication device 104 from another storage site for use in the systems and methods described herein. For example, priority information may stored in the cloud, and may not need to be entered in embodiments of the systems and methods described herein at all.

Once provided to a multiparty interaction system, the priority information may be used as a factor or input in determining the order participants in a promotion queue are promoted. For example, if several participants have pending promotion requests (such that the several participants are in a promotion queue), and one of them is a manager while the rest are rank-and-file employees, the manager's promotion request may be granted first, even if the manager's promotion request does not have the longest pendency. When the manager's request is granted, the manager is removed from the promotion queue. The priority information may also be the basis for applying a different set of default privileges or capabilities to participants of higher rank or of greater relative importance. For example, a participant with a greater relative priority than other participants may maintain unmuted audio when in an audience area in which the audio of other participants is muted. Additionally, for multiparty interactions in which participants are assigned a predetermined amount of time to speak to other participants, participants with a greater relative priority than other participants may be given more time than the other participants.

In some embodiments, the interaction workspace 900 may provide an option for promotion requests to be granted automatically or manually. Thus, a moderator of a multiparty interaction, an organizing participant of a multiparty interaction, a primary presenter in a multiparty interaction, or a responsible participant in a multiparty interaction may be able to select manual or automatic promotion, and may further be able to save that selection for use during the multiparty interaction and, in some embodiments, for use in future multiparty interactions. When automatic promotion is selected, the selecting participant or moderator may further be given the option to select whether automatic promotions should be granted based on the order in which promotion requests are received, or based on the relative importance of participants with pending promotion requests, or in some other order. The selecting participant or moderator may further be able to set a time limit on promotions, such that participants (other than the primary presenter or primary presenters) who are promoted have a predetermined amount of time to speak before they will be returned to the audience area of the interaction workspace 900. The interaction workspace 900 may allow such selections to be saved (e.g. in a memory 204 of a communication interface 104, or in a memory 304 of a collaboration server 116) for the present multiparty interaction and/or for future multiparty interactions involving the selecting participant or moderator.

When a selecting participant or moderator chooses to grant promotion requests manually, then promotion requests may only be granted when an authorized participant (e.g. the primary presenter) or a moderator selects the icon of a participant with a pending promotion request, or when some other predetermined manual action is taken.

The method 500 may also include returning a promoted participant to the audience area once the promoted participant no longer desires to have the privileges or capabilities of a presenter, or when a predetermined time period expires. In the former instance, the promoted participant may select his or her icon, drag his or her icon back to the audience area, or complete another predetermined task in order to be automatically returned to the audience area, or to indicate to a moderator that the participant would like to be returned to the audience area.

Figure 6:
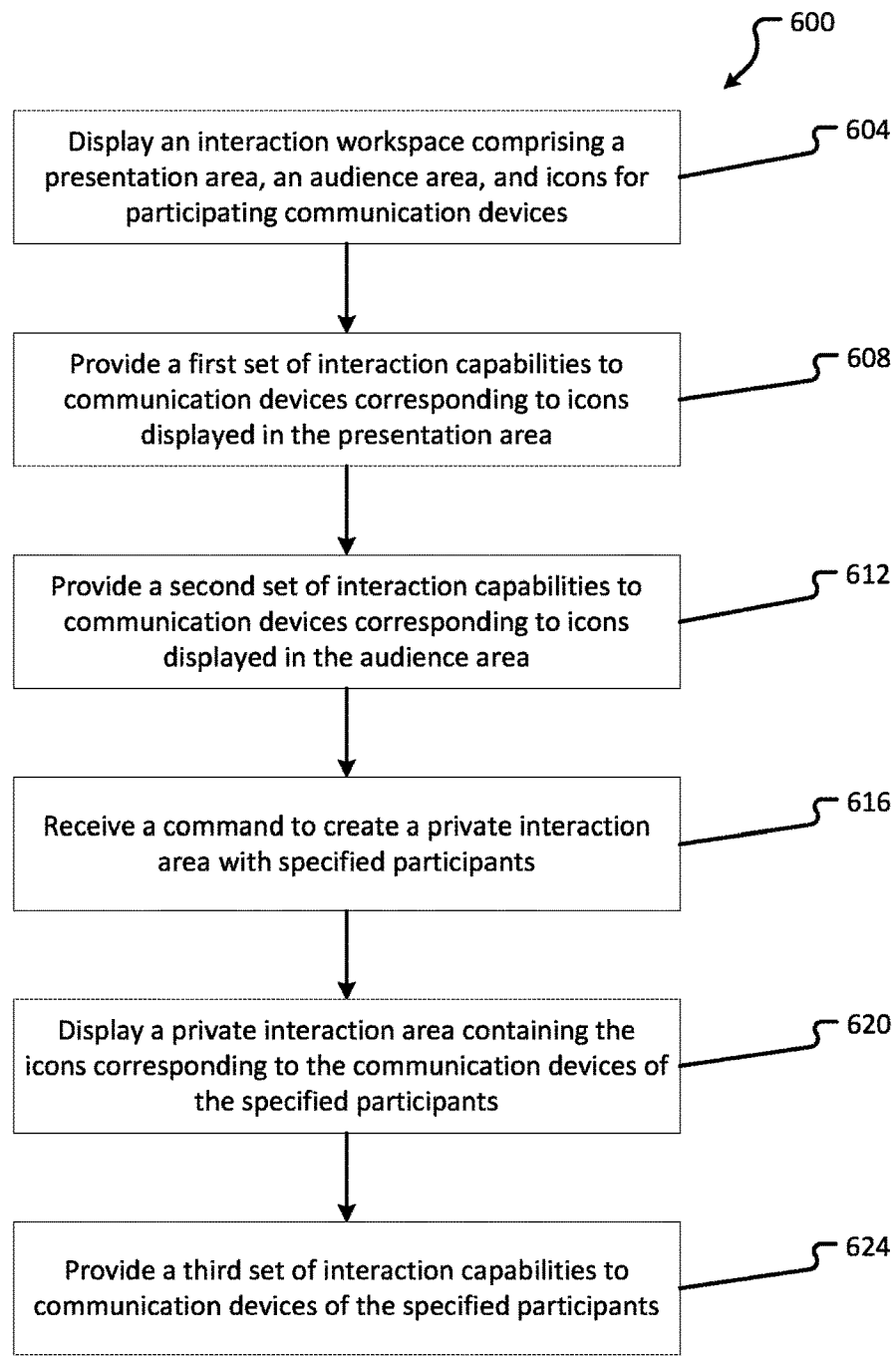
FIG. 6 is a flow diagram of a method according to yet another embodiment of the present disclosure.

Turning now to FIG. 6, a method 600 according to embodiments of the present disclosure comprises displaying an interaction workspace comprising a presentation area, an audience area, and icons for participating communication devices (step 604). The presentation area, the audience area, and the icons for participating communication devices may be displayed in substantially the same manner as described with respect to step 508 of the method 500, although as will be further discussed below, not all of the icons need be displayed in the presentation area and the audience area.

The method 600 further comprises providing a first set of interaction capabilities to communication devices corresponding to icons displayed in the presentation area (step 608). By way of example and not limitation, the first set of interaction capabilities may be capabilities relating to whether the audio and/or video of the communication devices 104 is muted or unmuted with respect to other communication devices 104 in the presentation area (e.g. other communication devices 104 represented by icons displayed within the presentation area); whether the audio and/or video of the communication devices 104 is muted or unmuted with respect to other communication devices 104 outside of the presentation area generally (e.g. other communication devices 104 represented by icons displayed anywhere outside of the presentation area); whether the audio and/or video of the communication devices 104 is muted or unmuted with respect to other communication devices 104 in specific interaction areas outside of the presentation area (e.g. other communication devices 104 represented by icons displayed in specific interaction areas outside of the presentation area); whether each communication device 104 within the presentation area has control over the mute status of its audio and/or video; whether each communication device 104 is represented by a simple icon, an icon with a still image, or a live video feed; whether each communication device has control over how it is represented (e.g. by a simple icon, an icon with a still image, or a live video feed); and/or whether each communication device 104 within the presentation area is able to use the presentation tool 920, the whiteboard tool 924, the texting tool 928, and/or the partition tool 932.

In embodiments, communication devices 104 corresponding to icons displayed in a presentation area such as the presentation area 1108 are provided with a first set of interaction capabilities that includes unmuted audio and video with respect to other participants in the presentation area, unmuted audio and video with respect to other participants in the audience area, and unmuted audio and video with respect to other participants in private meeting areas. Additionally, the first set of interaction capabilities may include the ability to display (or, in some embodiments, the mandatory display) of a live video feed of participants in the presentation area with respect to other areas, using a video camera 220 of the communication device 104 of each participant in the presentation area. Thus, a participant in a presentation area 1108 may have a "transmission capability" allowing the participant to transmit presentation communications, which may comprise any one or more of audio, video, and data signals, to the participants in an audience area 1104 (or, stated differently, allowing the participants in the audience area 1104 to receive, hear, and/or view the presentation communications from the participant in the presentation area 1108).

The method 600 still further comprises providing a second set of interaction capabilities to communication devices corresponding to icons displayed in the audience area (step 612). By way of example and not limitation, the second set of interaction capabilities may be capabilities relating to whether the audio and/or video of the communication devices 104 is muted or unmuted with respect to other communication devices 104 in the audience area (e.g. other communication devices 104 represented by icons displayed in the audience area); whether the audio and/or video of the communication devices 104 is muted or unmuted with respect to other communication devices 104 outside of the audience area generally (e.g. other communication devices 104 represented by icons displayed outside of the audience area); whether the audio and/or video of the communication devices 104 is muted or unmuted with respect to other communication devices 104 in specific interaction areas outside of the audience area (e.g. other communication devices 104 represented by icons displayed in specific interaction areas outside of the audience area); whether each communication device 104 within the presentation area has control over the mute status of its audio and/or video; whether each communication device 104 is represented by a simple icon, an icon with a still image, or a live video feed; and/or whether each communication device 104 has control over how it is represented (e.g. by a simple icon, an icon with a still image, or a live video feed).

In embodiments, communication devices 104 corresponding to icons displayed in an audience area such as the audience area 1104 are provided with a second set of interaction capabilities that includes muted audio and video with respect to other participants in the audience area 1104 and muted audio and video with respect to other participants in the presentation area 1108. Additionally, the second set of interaction capabilities may include the ability to be represented within the audience area 1104 by a simple icon 912 or by an icon with a still image (whether the image is taken using a camera 216 of the communication device 104 of the corresponding participant, or is downloaded from the cloud, or is stored on the network (e.g. in a memory 304 of the collaboration server 116), or is stored locally (e.g. in a memory 204 of the communication device 104)). Thus, a participant in the audience area 1104 may have a "reception capability" allowing the participant to receive presentation communications from one or more participants in a presentation area 1108 (or, stated differently, allowing the participant in the audience area 1104 to hear and/or view the presentation communications from the participant in the presentation area 1108).

The method 600 further includes receiving a command to create a private interaction area with specific participants (step 616). The command may comprise or result from the use by a participant in the multiparty interaction of the partition tool 932. For example, a participant may drag the partition tool 932 to one of the audience area and the presentation area, which action may comprise or result in the transmission of a command to create a private interaction area. The participant may then drag to the newly created private interaction area the icon representing each specific participant to be invited to the private interaction area, which may comprise or result in the transmission of a command to add the specified participants to the private interaction area. Alternatively, the participant may then select one or more icons corresponding to participants to be invited to the private meeting area, which may comprise or result in the transmission of a command to add the specified participants to the private interaction area.

As another example, a participant may drag the partition tool 932 to his or her own icon within the interaction workspace 900, which may comprise or result in the transmission of a command to create a private interaction area. As before, the participant may then drag to the private interaction area the icon representing each participant to be invited to the private interaction area, which may comprise or result in the generation of a command to add the specified participants to the private interaction area. As yet another example, a participant may drag the partition tool 932 to an icon representing each desired participant in a private interaction area, which may comprise or result in the transmission of a command to add each desired participant to a new private interaction area. The private interaction area may then be created and automatically populated with the specified participant(s), including the participant who dragged the partition tool 932 to the icon(s) of the other specified participants.

The method 600 still further includes displaying a private interaction area containing the icons corresponding to the communication devices of the specified participants (step 620). The private interaction area 1612 of FIG. 16 is an example of a displayed private interaction area. The private interaction area is displayed within the interaction workspace 900, using the graphical user interface 240 of the communication device 104 of at least each participant in the private interaction area. In some embodiments, only participants in the private interaction area are shown the private interaction area on their respective communication devices 104 (or, more particularly, on the graphical user interface 240 of their respective communication devices 104). In other embodiments, all participants in the overall interaction are shown the private interaction area on their respective communication devices 104 (via the graphical user interfaces 240 thereof). Such display (at least toward participants who are not located in the private interaction area) may or may not include the icons (including any live video feeds) corresponding to the participants in the private interaction area, the number of participants in the private interaction area, or any indication of which participant(s) within the private interaction area is (are) speaking to other participants in the private interaction area. In some embodiments, the private interaction area may be displayed only to participants in the private interaction area, as well as to a moderator of the multiparty interaction, and/or to one or more participants within the multiparty interaction having a supervisory role or title (which may be determined, for example, based on priority information stored in a memory 204 or 304 of a communication device 104 or collaboration server 116, respectively).

Additionally, the private interaction area may be displayed as a portion of the audience area, as a portion of the presentation area, or as a portion of the overall interaction workspace 900. The icons of participants in the private interaction area may or may not also be displayed in the area in which the icons were located when the private interaction area was created and/or when the participants joined the private interaction area. For example, in the embodiment of FIG. 16, the participants KS, PM, and SB are displayed in the private meeting area or private interaction area 1612, as well as in the audience area 1604.

Also included in the method 600 may be providing a third set of interaction capabilities to the communication devices of the specified participants (e.g. of the participants in the private interaction area) (step 624). By way of example and not limitation, the third set of interaction capabilities may be capabilities relating to whether the audio and/or video of the communication devices 104 is muted or unmuted with respect to other communication devices 104 in the private interaction area; whether the audio and/or video of the communication devices 104 is muted or unmuted with respect to other communication devices 104 outside of the private interaction area; whether each communication device 104 within the private interaction area has control over the mute status of its audio and/or video; and/or whether each communication device 104 is represented by a simple icon, an icon with a still image, or a live video feed within the private interaction area.

In embodiments, then, communication devices 104 corresponding to icons displayed in a private interaction area such as the private interaction area 1612 are provided with a third set of interaction capabilities that includes unmuted audio and video with respect to other participants within the private interaction area, and muted audio and video with respect to participants in the presentation and audience areas. Additionally, the third set of interaction capabilities may include the ability to be represented (within the private meeting area) by a simple icon 912, by an icon with a still image (whether the image is taken using a camera 216 of the communication device 104 of the corresponding participant, or is downloaded from the cloud, or is stored on the network (e.g. in a memory 304 of the collaboration server 116), or is stored locally (e.g. in a memory 204 of the communication device 104)), and/or by a live video feed.

In embodiments according to the present disclosure, a participant who moves from one area to another area of the interaction workspace 900 adopts the set of interaction capabilities associated with the area into which the participant moves. Thus, if a participant is represented by an icon 912 displayed in an audience area 1104, then the participant will have the set of interaction capabilities corresponding to the audience area 1104 as long as the participant's icon 912 is displayed in the audience area 1104. If the participant's icon is moved to the presentation area 1108, then the participant adopts the set of interaction capabilities corresponding to the presentation area 1108, for as long as the participant's icon 912 is displayed in the presentation area 1108. If the participant's icon is then moved back to the audience area 1104, then the participant again adopts the set of interaction capabilities corresponding to the audience area 1104.

When a participant joins or is added to a private interaction area such as the private interaction area 1612, and the participant maintains a presence in an audience area 1604, then the participant maintains the set of interaction capabilities associated with the audience area 1604 with respect to other participants in the audience area 1604 and any participants in the presentation area 1608, except to the extent such interaction capabilities are modified or replaced by any interaction capabilities in the set of interaction capabilities associated with the private interaction area 1612 with respect to other participants within the private interaction area 1612.

For example, an audience area 1604 may be associated with a set of interaction capabilities that includes representation of each participant by a simple icon, and muted audio with respect to other participants in the audience area 1604 and any participants in the presentation area 1608. A private meeting area 1612 may be associated with a set of interaction capabilities that includes representation of each participant by a live video feed, and unmuted audio with respect to other participants in the private meeting area 1612. Thus, a participant PM who is in both the audience area 1604 and the private meeting area 1612 is represented by a simple icon 1112*g* within the audience area 1604, and has muted audio with respect to other participants in the audience area 1604 and with respect to the two participants in the presentation area 1608. However, within the private meeting area 1612, the participant PM is represented by a live video feed 1620*b*, which may be visible to other participants in the private meeting area 1612 but not to participants who are not in the private meeting area 1612. The participant PM also has unmuted audio with respect to other participants in the private meeting area 1612, but not with respect to participants who are not in the private meeting area 1612.

Other interaction capabilities may be included in the set of interaction capabilities associated with a given area. For example, in some embodiments according to the present disclosure, a set of interaction capabilities may include a whisper mode capability. In some embodiments, the whisper mode capability may allow a participant to select, within the interaction workspace 900 displayed on a graphical user interface 240 of the participant's communication device 104, the icon of another participant with whom the selecting participant would like to initiate communications via whisper mode. For example, a participant JS may select an icon 1412*c* of a participant SB to initiate whisper mode communications with the participant SB. Upon initiating the whisper mode with respect to the participant SB, the participant SB's icon 1412*c* may be modified to indicate that the participant SB is in whisper mode. The participant SB's icon 1412*c* may be modified as displayed to every other participant in the multiparty interaction via his or her respective communication device 104, or the participant SB's icon 1412*c* may be modified as displayed only to the participant JS (e.g. the participant with whom the participant SB is communicating via whisper mode) via the communication device 104 of the participant JS. In some embodiments, the participant SB's icon 1412*c* may be modified in a first way as displayed on the communication device 104 of the participant JS (with whom participant SB is connected via the whisper mode), and in a second, different way as displayed on the communication devices 104 of the remaining participants in the private meeting area. In this way, the participant JS can identify, by looking at the displayed interaction workspace 900, with whom he or she is communicating via whisper mode, and other participants can see that the participant SB (and, in some embodiments, the participant JS as well) is in a whisper mode and is therefore unavailable to participate in another whisper mode.

When two participants in a multiparty interaction communicate via whisper mode, the audio of the participants is unmuted with respect to each other, and spatial audio (also referred to herein as 3D spatial audio or 3D audio) may be used to provide a first apparent source of incoming audio signals from the other whisper mode participant and a second, different apparent source to incoming audio signals from the presenter and/or from other participants. The spatial audio can be generated, for example, in a collaboration server before being transmitted to individual communication devices, or each individual communication device may generate the spatial audio. The spatial audio may further be used to orient the apparent sources of different incoming audio signals in the same way as the displayed orientation of the actual sources of the different incoming audio signals. In other words, if a participant JS utilizes whisper mode with the participant SB, the communication device 104 of the participant JS may use spatial audio to reproduce audio signals received from the participant SB with an apparent source that is to the right of the apparent source of reproduced audio signals received from the presenter, participant JY, because the icon 1412*c* of the participant SB is displayed to the right of the live video feed 1112*e* of the participant JY in the interaction workspace 900.

Although not required for purposes of the present disclosure, use of spatial audio enhances the ability of participants in a multiparty interaction to distinguish between or among different audio sources, and to quickly identify which participant in the interaction is speaking at a given moment. As may be appreciated, spatial audio may be utilized even outside of whisper mode, to reproduce audio signals received from different participants with different apparent sources.

Other means of distinguishing different audio sources may also be used within the scope of the present disclosure. For example, audio from one source may be reproduced at a greater volume than audio from another source. Additionally or alternatively, audio from one source may be processed in a way that causes it to sound differently than audio from another source. For example, speech colorization may be used to make voice communications from one source sound differently than unprocessed voice communications from another source, or from voice communications from another source that are processed in a different way. Any audio characteristic of a given audio source may be altered to enable a participant to distinguish audio communications from different sources.

Whisper mode may also be used to broadcast a communication to all participants in the same interaction area, or to all participants in a different interaction area. When whisper mode is used to broadcast a communication to multiple participants in a given area, the icons representing the participants communicating via whisper mode may all be modified to indicate that a whisper mode is active, or the icon representing the participant who is the source of a whisper mode communication may be modified (e.g. as is the icon 1412*c* in FIG. 14) so that other participants in the interaction area can identify from whom they are receiving a whisper mode broadcast communication.

Another capability that may be included or excluded from a given set of interaction capabilities may be individualized texting between participants in the same interaction area. For example, participants in the audience area 1104 may be permitted to use the texting tool 928 to send text messages to another selected participant from the audience area 1104. Similarly, a given set of interaction capabilities may include or exclude the capability to send a texting broadcast to all participants located in the same interaction area as the sending participant, or to all participants located in a different interaction area than the sending participant. For example, in some embodiments a participant in an audience area 1104 may be permitted to use the texting tool 928 to send a text message to every other participant in the audience area 1104. As another example, a participant in an audience area 1104 may be permitted to send a text message to all participants in a presentation area 1108 of the interaction workspace 900, or in a private meeting area 1612 of the interaction workspace 900.

Still another capability that may be included or excluded from a given set of interaction capabilities may be the ability to share a presentation screen or a whiteboard with other participants in the same interaction area. For example, a participant in an audience area 1104 may use the whiteboard tool 924 to share a whiteboard with another participant in the audience area 1104. The whiteboard may then be visible only to the two participants, or it may be visible to everyone else in the interaction area (e.g. the audience area 1104). In some embodiments, a shared whiteboard may only be used (e.g. drawn on, via the graphical user interface 240 of a participant's communication device 104) by the originating participant (e.g. the participant that utilized the whiteboard tool 924 to share the whiteboard), while in other embodiments, the originating participant may selectively allow other participants with whom the whiteboard is shared to use the whiteboard, or other participants with whom the whiteboard is shared may have the capability to use the shared whiteboard without any control by the originating participant. Similarly, in some embodiments, participants in a given area may have, as part of their set of interaction capabilities, a capability to share a presentation screen or a whiteboard with other participants in a different interaction area. For example, a participant in a presentation area may have the capability to utilize the presentation tool 920 to share a presentation screen such as the presentation screen 1116 with participants in an audience area such as the audience area 1104.

According to some embodiments of the present disclosure, a participant can move his or her own icon to a given interaction area (e.g. a presentation area 1608, an audience area 1604, and/or a private meeting area 1612) to gain the capabilities of that interaction area. In other embodiments of the present disclosure, a presenter, a moderator, or another authorized participant controls the movement of participants from one interaction area to another. In some embodiments, such as the embodiment of FIG. 18, some participants may be permitted to move freely among the various interaction areas or virtual booths 1804*a*, 1804*b*, and 1804*c*, while other participants (e.g. those presenting at a given interaction area or booth) may not be permitted to freely move to another interaction area or booth without permission or other involvement of a moderator or authorized participant.

Figure 7:
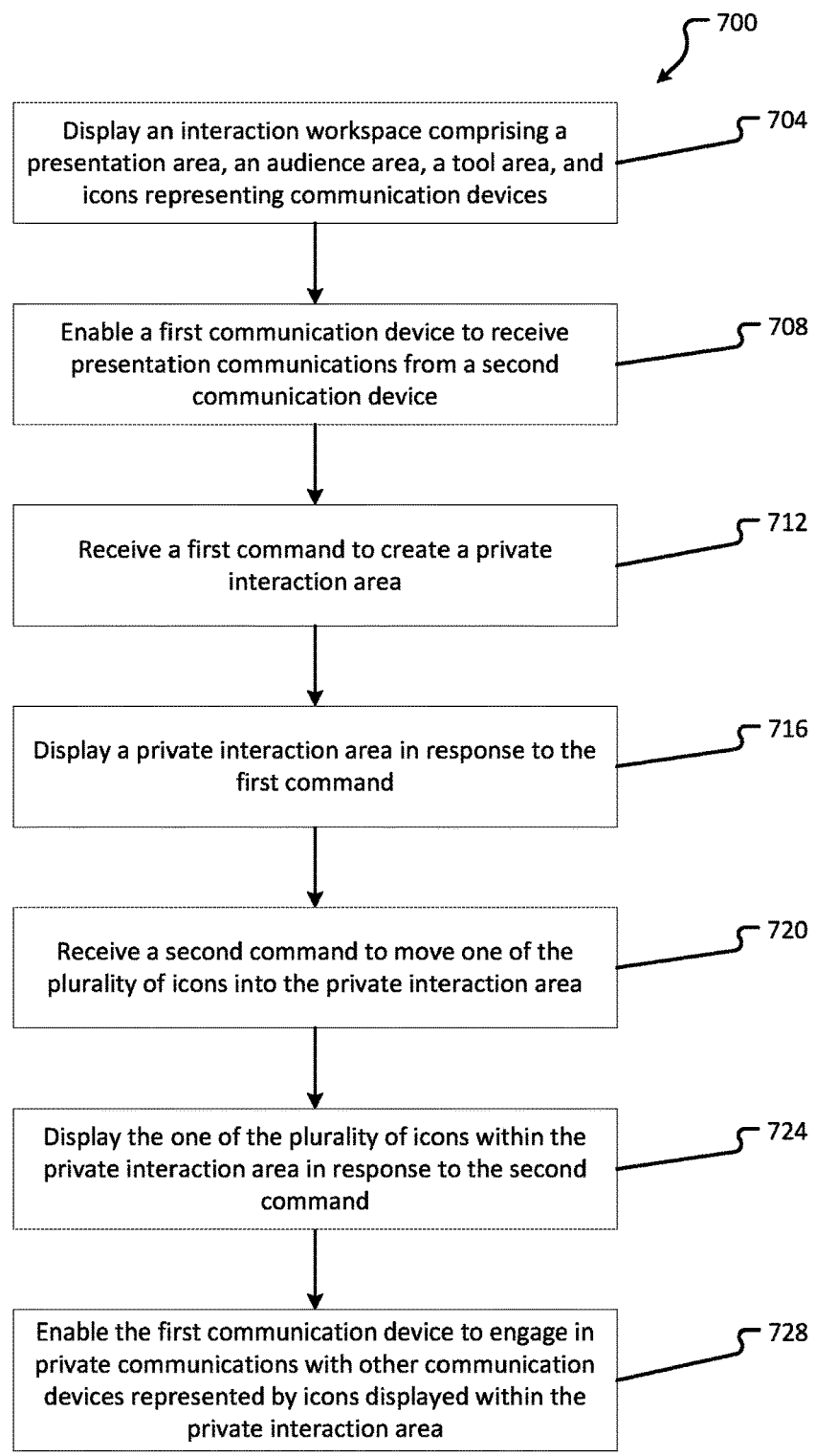
FIG. 7 is a flow diagram of a method according to still another embodiment of the present disclosure.

With reference now to FIG. 7, a method 700 according to some embodiments of the present disclosure comprises displaying an interaction workspace comprising a presentation area, an audience area, a tool area, and icons representing communication devices (step 704). The presentation area, audience area, tool area, and icons are displayed on the graphical user interface 240 of a communication device 104 of a participant in a multiparty interaction represented by the interaction workspace. The communication devices represented by the icons may be, for example, communication devices 104. The presentation area, audience area, and icons may be displayed substantially as described above with respect to steps 404 and 412 of the method 400, step 508 of the method 500, and/or step 604 of the method 600. In some embodiments, the tool area may be displayed substantially as the tool area 908 depicted in FIGS. 9-18. For example, the tool area may be displayed as part of the interaction workspace 900, and may be displayed as containing any one or more of the presentation tool 920, the whiteboard tool 924, the texting tool 928, the partition tool 932, the microphone control tool 936, the video camera tool 940, the speaker control tool 944, and the snapshot tool 948.

The method 700 also comprises enabling a first communication device to receive presentation communications from a second communication device (step 708). The presentation communications may be any one or more of audio, video, and data signals transmitted by a communication device 104 corresponding to a participant located in the displayed presentation area (or, in other words, corresponding to an icon displayed in the presentation area). Thus, for example, the second communication device may be a communication device 104 of a participant JY located in a presentation area 1108, and the first communication device may be a communication device 104 of a participant JC located in an audience area 1104. The presentation communications may comprise the live video feed 1112*e*, any presentation materials displayed on the presentation screen 1116, and audio communications initiated by the participant JY and/or the presentation materials displayed on the presentation screen 1116.

The method 700 may further comprise receiving a first command to create a private interaction area (step 712). The first command may comprise, for example, a participant KS represented by an icon 1112*d* displayed in the audience area 1104 dragging the partition tool 932 to the audience area 1104. As another example, the first command may comprise a participant PM represented by an icon 1112*g* displayed in the audience area 1104 dragging the partition tool 932 to an icon 1112*c* representing a participant SB with whom the participant PM would like to communicate in a private interaction area. Alternatively, the first command may comprise, for example, a participant JY, represented by an icon 1112*e* in the presentation area 1108, selecting the partition tool 932 (e.g. in conjunction with a request that one or more participants in the audience area 1104 form a breakout group to discuss an issue raised during the participant JY's presentation).

The method 700 may also comprise displaying, in response to the first command, a private interaction area (step 716). The private interaction area may be, for example, a private interaction area 1612. The private interaction area is displayed as part of the interaction workspace 900, and may be displayed as part of the presentation area 1108, as part of the audience area 1104, or, as with the private interaction area 1612, as an area separate from the presentation area 1608 and the audience area 1604. The private interaction area may be displayed on the graphical user interface 240 of the communication device 104 of each participant of the multiparty interaction, or it may be displayed only on the graphical user interface 240 of those participants in the multiparty interaction who are participants (or who have been invited to participate) in the private meeting area. The private interaction area may be displayed with an opaque wall or partition 1616 to indicate that audio communications within the private interaction area will not be audible to participants outside of the private interaction area and vice versa.

In embodiments, the method 700 further comprises receiving a second command to move one of the plurality of icons into the private interaction area (step 720). The second command may comprise a participant dragging his or her icon into the private interaction area. For example, the participant SB may drag his or her icon 1112*c* to the private interaction area. Alternatively, the second command may comprise the participant who issued, via his or her communication device 104, the first command to create the private interaction area 1612, dragging one or more icons of other participants to the private interaction area 1612. For example, if the participant KS issued the first command via his or her communication device 104, then the participant KS may drag the icons 1112*c* and 1112*g* corresponding to the participants SB and PM to the private interaction area 1612. As still another alternative, a moderator of the multiparty interaction may drag the icons of selected participants into the private interaction area 1612. For example, a moderator may drag the icons 1112*c*, 1112*d*, and 1112*g* to the private interaction area 1612.

In any of the foregoing embodiments, the second command may be generated, issued, or received in response to any predetermined action by a participant or moderator of the multiparty interaction. For example, in addition to moving participants from one area to another by dragging the participants' icons from the current area to the new area, movement of participants (or the generation or issuance of commands to move participants) may be accomplished by typing in a movement command (e.g. via a keyboard), selecting an option from a drop down menu, drawing (e.g. with a mouse or a finger) a circle around a plurality of participants and the area to which the selected participants should be moved, or in any other suitable manner.

The method 700 still further comprises displaying the one of the plurality of icons within the private interaction area in response to the second command (step 724). The displaying may comprise no longer displaying the one of the plurality of icons in the interaction area in which it was previously displayed, or it may occur in addition to the continued display of the one of the plurality of icons in the interaction area in which it was previously displayed. For example, the icon representing a participant previously located in an audience area 1604 may be displayed, in response to the second command, only in the private meeting area 1612. Alternatively, as depicted in FIG. 16, the icons 1112*c*, 1112*d*, and 1112*g* representing the participants KS, PM, and SB, respectively, may continue to be displayed in the audience area 1604, and icons 1620*a*, 1620*b*, and 1620*c* representing the same participants KS, PM, and SB may also be displayed in the private meeting area 1612. In some embodiments, the one of the plurality of icons may be displayed within the private interaction area in the same form in which it was previously displayed (or is still displayed) in another area. For example, if an icon was previously displayed in an audience area as a simple icon, it may be displayed in the private interaction area as a simple icon. Similarly, if an icon was previously displayed in an audience area as a still image or a live video feed, then it may be displayed in the private interaction area as a still image or a live video feed, respectively. In other embodiments, the one of the plurality of icons may be displayed within the private interaction area in a different form than the form in which it was previously displayed (or is still displayed) in another area. For example, as depicted in FIG. 16, an icon 1112*c* representing the participant SB in the audience area is a simple icon, but the icon 1620c representing the participant SB in the private interaction area 1612 is displayed as a live video feed.

In some embodiments, when a participant is invited into or moved into a private interaction area by another participant or by a moderator, the invited or moved participant is given the option to accept the invitation or the move or to decline the invitation or the move. If the participant accepts the invitation or the move, then the participant's icon is moved to, added to, or remains in the private interaction area. If the participant declines the invitation or the move, then the participant's icon is not moved to or added to, or the participant's icon is removed from, the private interaction area.

The method 700 may still further comprise enabling the first communication device to engage in private communications with other communication devices represented by icons displayed within the private interaction area. Thus, for example, the participants KS, PM, and SB, represented by live video feed icons 1620a, 1620b, and 1620c, respectively, may be enabled to engage in private communications (e.g. audio communications that are not audible outside of the private interaction area, and possibly video or data communications that are not visible to participants outside of the private interaction area) with each other via their respective communication devices 104. In particular, the participant KS may transmit, using his or her communication device 104, audio, video, and/or data signals to the communication devices 104 of the participants PM and SB, and may receive audio, video, and/or data signals from the communication devices 104 of the participants PM and SB at the communication device 104 of the participant KS. The participants PM and SB may each have similar or identical capabilities.

In some embodiments, participants within a private interaction area 1612 of an interaction workspace 900 may still be able to hear and observe activity in other areas of the interaction workspace 900, including activity in the audience area 1604 and activity in the presentation area 1608. In this manner, the participants in the private interaction area 1612 may, for example, follow along with what is being shown and/or discussed in the presentation area 1608, while still being able to engage in communications that are not audible and/or visible to, and thus do not interrupt or otherwise distract, the presenter or other participants in the presentation area 1608 and the audience area 1604.

Whenever a participant is present in multiple areas of the interaction workspace 900 (e.g. in a private interaction area 1612 as well as an audience area 1604), and/or whenever a participant is engaged in multiple levels of communication (e.g. listening to/watching a presentation from a presentation area 1608 and participating in whisper mode communications with another participant in an audience area 1604), any audio communications being received by the communication device 104 of the participant may be reproduced using spatial audio to assist the participant in distinguishing between audio communications from different sources. Thus, for example, the communication device 104 of the participant PM may reproduce audio communications received from the presenter-participants JY and JS with an apparent source to the left of the participant PM, and may reproduce audio communications received from the participant PM's fellow private interaction area participants KS and SB with an apparent source to the right of the participant PM, thus matching the graphical orientation of the icons 1112e, 1312f, 1620a, and 1620c with respect to the icon 1112g representing the participant PM.

Alternatively, because the participant PM is also represented by the icon 1620b, the communication device 104 may reproduce audio communications from the participant SB with an apparent source behind the participant PM, and audio communications from the participant KS with an apparent source in front of the participant PM, thus representing the graphical arrangement of the icons 1620a and 1620c with respect to the icon 1620b. In some embodiments, where a participant is represented by multiple icons in multiple interaction areas, the participant may be enabled to choose which icon representing the participant should be used as the reference point for determining where to place the apparent source of audio communications from other participants. For example, the participant PM may, in some embodiments, be able to choose whether the icon 1112g or the icon 1620b should be used as the reference point from which to determine an appropriate apparent source for reproducing audio signals received from the other participants in the multiparty interaction.

Additionally, a participant in a private interaction area may be able to selectively mute and/or unmute audio and/or video communications from other participants within the private interaction area, and/or to mute and/or unmute audio and/or video communications from other participants outside of the private interaction area. As an example, if a participant KS (represented by the icon 1620a) wants to be able to hear and/or see key parts of the participant JY's (represented by the icon 1112e) presentation, then the participant KS may selectively mute the audio and/or video of the participants PM and SB (which muting may only be effective with respect to the communication device 104 of the participant KS). Similarly, if a participant PM (represented by the icon 1620b) wants to focus on a discussion occurring in the private interaction area 1612, the participant PM may selectively mute the audio and/or video of the presenters JY (represented by the icon 1112e) and JS (represented by the icon 1312f) (which muting, again, may only be effective with respect to the communication device 104 of the participant PM).

Notwithstanding the foregoing, default muting settings (e.g. a default setting that participants in an audience area 1604 are muted with respect to each other, while participants in a private meeting area 1612 are not muted with respect to each other) may be applied automatically as a participant is moved into or out of a given interaction area, such that the participant retains the interaction capabilities associated with the area or areas in which the participant is currently located.

Figure 8:
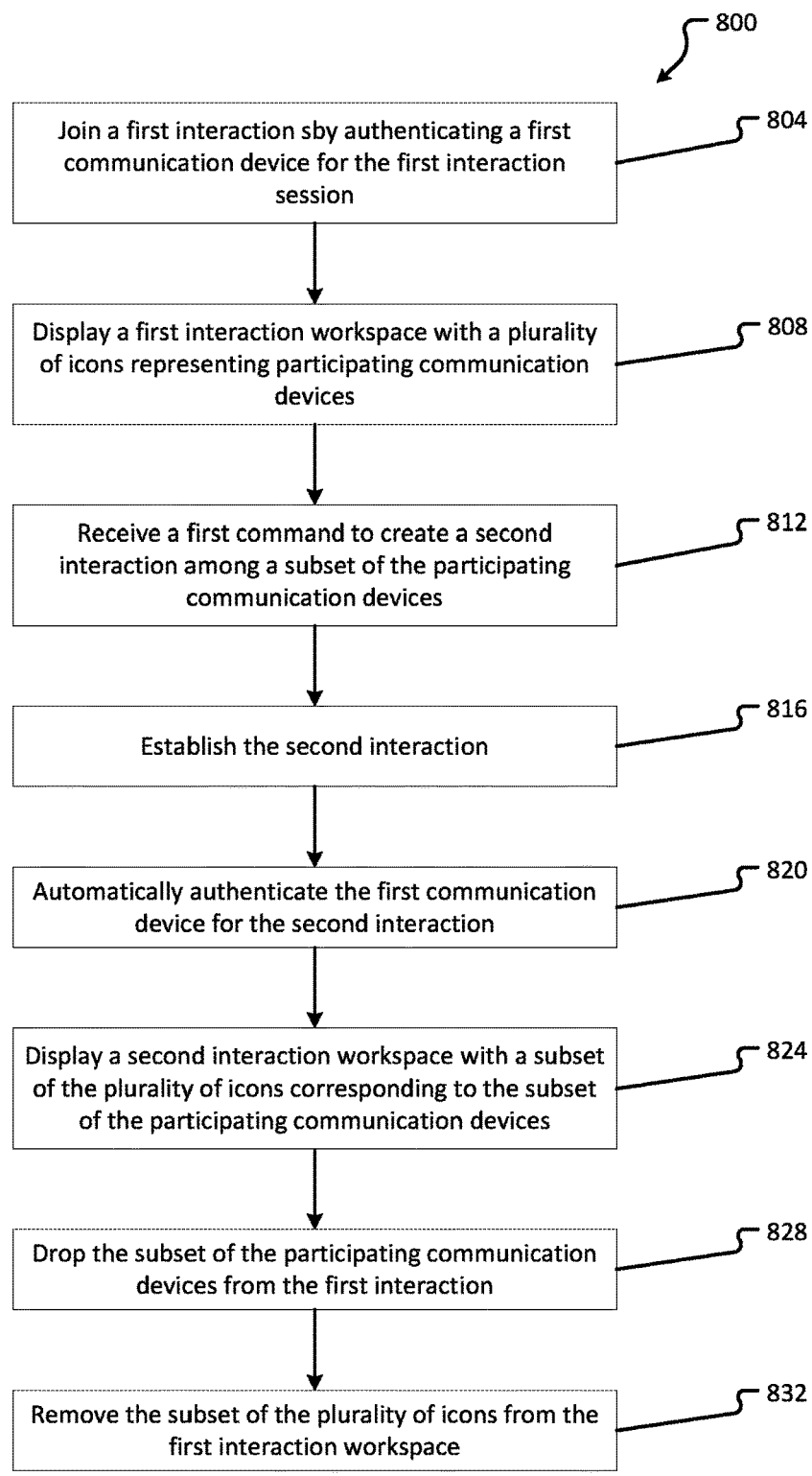
FIG. 8 is a flow diagram of a method according to a further embodiment of the present disclosure.
Figure 9:
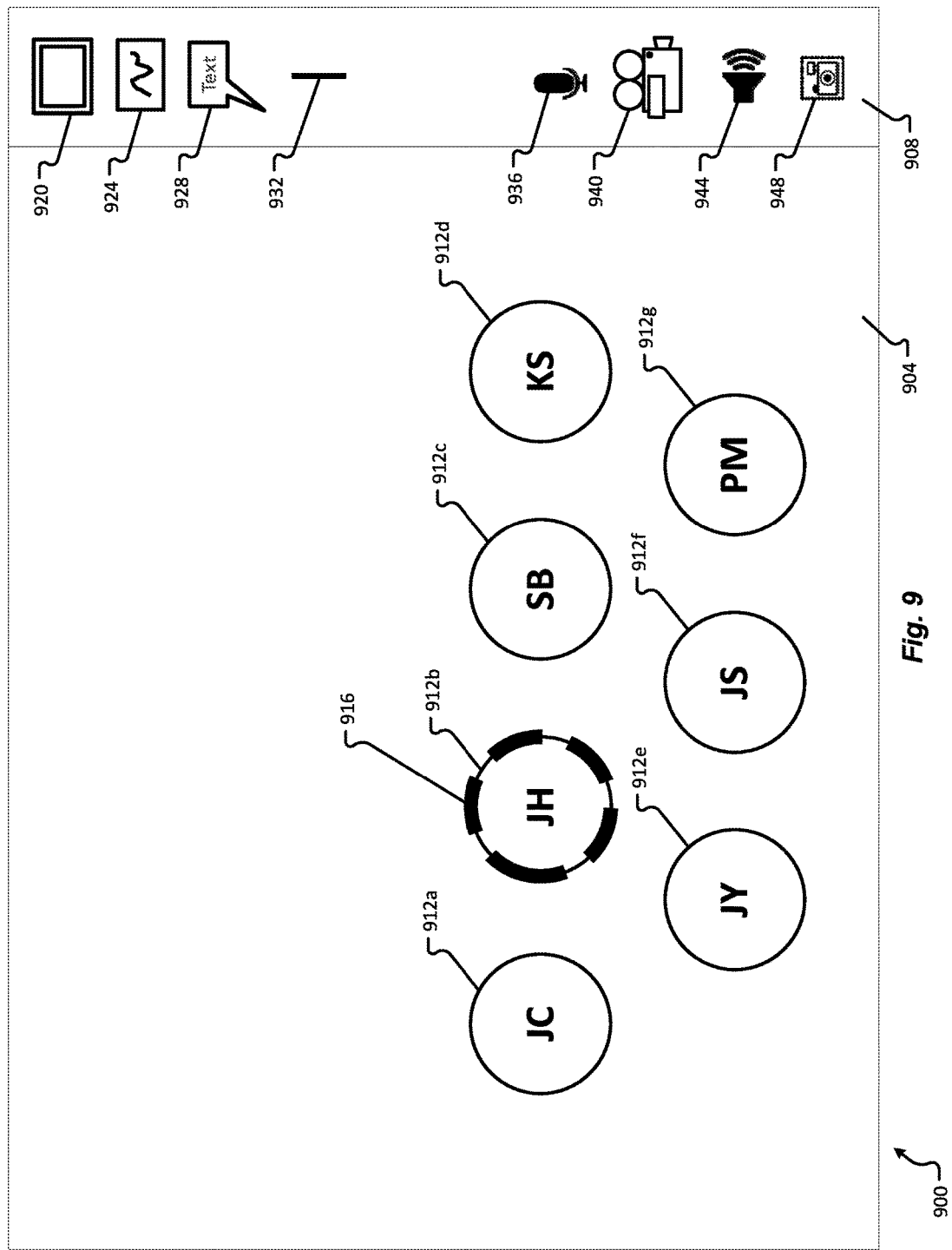
FIG. 9 is a screenshot displayed on a graphical user interface of a communication device according to some embodiments of the present disclosure.

Turning now to FIG. 8, a method 800 according to embodiments of the present disclosure comprises joining a first interaction by authenticating a first communication device for the first interaction (step 804). Examples of authentication may include, but are not limited to, simple authentication based on site codes, trusted data formats, shared secrets, certificates, and/or the like. The authenticating may include providing credentials (whether as stored in the memory of the first communication device or as provided by a user of the first communication device), via the first communication device, to another computing device (e.g. a communication device 104 or a collaboration server 116), which may then be compared by the other computing device to credentials stored in a memory 204 or 304 of the other computing device. If the credentials match, then the authentication process may be successfully terminated and the first communication device may be granted authorization to join the first interaction. If the credentials do not match, then the authentication process may be repeated so that different credentials may be provided, and/or the first communication device may not be permitted to join the first interaction. In some embodiments, the authenticating may comprise, rather than comparing received credentials with stored credentials, using received credentials as an input to one or more algorithms, and comparing the resulting output of the one or more algorithms to information stored in a memory 204 or 304 of the other computer device.

The method 800 further comprises displaying a first interaction workspace with a plurality of icons representing participating communication devices (step 808). The first interaction workspace may be the same as or similar to an interaction workspace 900, and the icons may be the same as or similar to the icons 912. In some embodiments, the icons 912 may be simple icons (e.g. icons 1012a, 1012b), still images (e.g. icon 1012e), and/or live video feeds (e.g. icons 1012c, 1012d, 1012f, and 1012g). The first interaction workspace may comprise one interaction area or multiple interaction areas, which may include a presentation area, an audience area, one or more private meeting areas, and/or one or more virtual booths. The first interaction workspace may be displayed on a graphical user interface 240 of a participating communication device 104 or on any other suitable device. The display may be based on instructions included in a collaboration application 108 stored in a memory 204 and executed by a processor 208 of a communication device 104, or it may be based on instructions included in a collaboration service 120 stored in a memory 304 and executed by a processor 308 of a collaboration server 116. Where the display of the first interaction workspace is based on instructions stored remotely from the graphical user interface 240 or other suitable device on which the first interaction workspace is displayed, a communication network such as the Internet, a peer-to-peer connection, or a local area network may be used to transfer any needed data or other communications between the graphical user interface 240 or other suitable device on the one hand, and the device in which the instructions are stored remotely on the other. In some embodiments, the first interaction workspace may be displayed in a browser, while in other embodiments the first interaction workspace may run and/or be displayed independently of other software applications.

The method 800 also comprises receiving a first command to create a second interaction among a subset of the participating communication devices (step 812). The first command may comprise a participant dragging an icon or a group of icons to a new tab in a browser in which the first interaction workspace is displayed. Alternatively, the first command may comprise selecting an option from a drop-down menu, where the option corresponds to creating a new or second interaction. As another alternative, the first command may comprise selecting a tool from a tool area of the first interaction workspace, or using a tool from a tool area of the first interaction workspace in a predetermined manner. As yet another alternative, the first command may comprise dragging a participant icon or a group of participant icons outside of the first interaction workspace in a particular direction.

The method 800 further comprises establishing the second interaction (step 816). Establishing the second interaction may comprise multiple steps, including defining the second interaction, instantiating the second interaction, and, in some embodiments, authenticating the second interaction. Defining the second interaction may comprise identifying the parameters and/or settings that will characterize the second interaction. Some or all of those parameters may be adopted from the first interaction and/or selected or determined based on one or more parameters or settings of and/or relevant information from the first interaction. Such parameters and/or information may correspond to, for example, the number, type, and visual arrangement of interaction areas within the first interaction; the manner and location in which participant icons are displayed within the first interaction (e.g. as a simple icon, a still image, and/or a live video feed; in a presentation area, an audience area, and/or a private interaction area); the default capabilities of participants within each interaction area of the first interaction; identification and/or billing information of the first interaction (e.g. if the first and interaction are hosted by a third-party service provider, and the third-party service provider uses a separate billing or customer ID number for each customer, then the second interaction may assume the same billing or customer ID number as the first interaction); any presentation materials that were being used or presented in the first interaction area; and so forth. The parameters, settings, and/or information of the first interaction may be customizable, such that a participant in or moderator of the first interaction may be able to modify or configure the parameters, settings, and/or information according to his or her preferences. Additionally, some of the parameters, settings, and/or information may apply to the entire interaction, while others may be communication device-specific or participant-specific. For example, each participant may be able to customize the display of the icon representing that participant within an interaction workspace (e.g. to be a simple icon, a still image, or a live video feed). In some embodiments, establishing the second interaction may comprise adopting an attribute set of the first interaction, which attribute set may include a display mode attribute (e.g. an attribute related to how a participant icon is displayed, whether as a simple icon, a still image, or a live video feed), as well as a workspace location attribute (e.g. an attribute related to in which area each participant icon is displayed).

Instantiating and authenticating the second interaction may comprise establishing at least an initial connection and/or communication channel between at least one communication device 104 and at least one other device, whether another communication device 104 and/or a collaboration server 116, and performing at least one authentication process to establish a level of trust between or among the connected devices. In embodiments, the instantiating does not use any existing communication channel or connection utilized by the first interaction. In other embodiments, the instantiating may use an existing communication channel or connection utilized by the first interaction, but in such a way that if the first interaction were terminated, the second interaction could continue uninterrupted. Instantiating and/or authenticating the second interaction may further comprise establishing an encrypted communication channel, depending on the level of security needed for the second interaction. The instantiating may further comprise establishing all proper media flows needed to support the second interaction workspace, although in some embodiments such flows may be established as each communication device is joined to the second interaction.

The method 800 still further comprises automatically authenticating the first communication device for the second interaction (step 820). The automatic authentication may comprise the same authentication process as discussed above with respect to step 804, or a different authentication process. The automatic authentication of the first communication device for the second interaction may utilize the same credentials that were previously provided in connection with authentication of the first communication device for the first interaction, such that the participant using the first communication device need not enter or otherwise provide the credentials again. In some embodiments, the credentials entered or provided during authentication of the first communication device are stored on the first communication device but not on a collaboration server, to reduce the risk of the credentials being compromised by a hacker or other illicit actor. The credentials may be encrypted, regardless of where they are stored. In other embodiments, the second interaction is able to authenticate the first communication device based on the existence of the first interaction (or, for example, based on the fact that a command was received from within the first interaction workspace to create a second interaction, which command could only have been given by a known and trusted participant in the first interaction) but without accessing or otherwise utilizing the credentials provided for purposes of authenticating the first communication device for the first interaction.

Although not illustrated in FIG. 8, the method 800 may further comprise automatically authenticating each one of the subset of the participating communication devices to be included in the second interaction. The automatic authentication of each one of the subset of the participating communication devices may be conducted in the same manner as described above with respect to the automatic authentication of the first communication device.

Another aspect of the method 800 is displaying a second interaction workspace with a subset of the plurality of icons corresponding to the subset of the participating communication devices (step 824). In addition to the adoption by the second interaction of one or more characteristics or other aspects of the first interaction, the second interaction workspace may adopt one or more characteristics or other aspects of the first interaction workspace. For example, the second interaction workspace may adopt the visual appearance of the first interaction workspace (which visual appearance of the first interaction workspace may, for example, be modifiable by a participant in the first interaction via the participant's communication device 104). Alternatively, the second interaction workspace may be displayed in a default format that does not reflect any customizations that were made to the first interaction workspace before the second interaction workspace was created. Any presentation materials that were being used in the first interaction may be automatically transferred into the second interaction, and such materials may be automatically queued to the point they had reached when the first command was received (e.g., if a slideshow had reached slide 20 before the first command was received, then the same slide show may be provided in the second interaction, and may be automatically queued to slide 20).

The subset of the plurality of icons may be displayed in the second interaction workspace in substantially the same or in a similar manner to the manner in which they are or were displayed in the first interaction. For example, an icon that was displayed as a simple icon (e.g. an icon 1012a, 1012b), a still image (e.g. icon 1012e), and/or a live video feed (e.g. icons 1012c, 1012d, 1012f, and 1012g) may be displayed in the same form, at least initially, in the second interaction workspace. Once the second interaction workspace and the plurality of icons are displayed, a participant viewing the displayed second interaction workspace and subset of the plurality of icons may modify the same so that they are no longer substantially the same as or similar to the first interaction workspace and/or the subset of the plurality of icons as displayed in the first interaction workspace.

In addition to populating the second interaction space with the plurality of icons representing the subset of the participating communication devices, the method 800 may comprise endowing or otherwise providing each participant icon in the second interaction workspace with the same privileges and/or capabilities that were previously held by or associated with the participant in question in the first interaction workspace. For example, if one of the plurality of icons added to the second interaction space represented a presenter (e.g. a participant located in the presentation area of the first interaction workspace) and two others of the plurality of icons added to the second interaction space represented participants in the audience area of the first interaction workspace, then the presenter's icon may be displayed in a presentation area of the second interaction workspace, and the other two participants' icons may be displayed in an audience area of the second interaction workspace. Additionally, if the presenter was previously unmuted with respect to participants in the audience area, and the participants in the audience area were previously muted with respect to the presenter and each other, then the same muting characteristics may be applied to the participants in the second interaction workspace. Alternatively, every participant that is added to the second interaction workspace may be initially endowed or otherwise provided with the same set of capabilities and/or privileges as every other participant in the second interaction workspace, which capabilities and/or privileges may change as the participants organize themselves (or are organized by a moderator) into desired interaction areas.

As may be appreciated from the foregoing disclosure, each communication device participating in the first and/or second interactions displays the first and/or second interaction workspaces, respectively, via the graphical user interface thereof. Users of the communication devices may adjust one or more parameters of the first and/or second interaction workspaces to fit their own preferences. For example, a first user or participant might increase the size of a presentation area to be larger than a default presentation area size, while reducing the size of the audience area accordingly. Another participant may increase the size of a private meeting area, while reducing the size of a presentation area and an audience area accordingly. To the extent that participants using participating communication devices and who have customized the visual display of the first interaction are included in the subset of participating communication devices that are part of the second interaction, the second interaction workspace may adopt the same customizations as displayed to each of the participants. In other words, if a participant has customized the first interaction workspace and is then included in a second interaction, then when the second interaction workspace is displayed on the graphical user interface 240 of the communication device 104 of the participant, the second interaction workspace may include some or all of the same customizations that were made by the participant to the first interaction workspace. However, when the second interaction workspace does not contain all of the elements of the first interaction workspace (e.g. all of the same interaction areas), any customizations to or based upon the non-included elements may not be reflected in the second interaction workspace as displayed to the participant.

The method 800 additionally comprises dropping the subset of the participating communication devices from the first interaction (step 828), and removing the subset of the plurality of icons from the first interaction workspace (step 832). Once each communication device within the subset of the participating communication devices has been authenticated for the second interaction, the same communication devices are dropped or otherwise removed from the first interaction, and the icons representing those communication devices (as well as the participants using those communication devices) are removed from the display of the first interaction workspace. At this point, the transfer of the subset of the participating communication devices from the first interaction to the second interaction is complete, with the first interaction operating independently from and in a parallel to (at least until one of the first and second interaction is terminated) the second interaction. As a result, termination of the first interaction will not affect the second interaction, which, once established, does not depend in any way on the first interaction.

As an alternative to dropping the subset of the participating communication devices from the first interaction and removing the subset of the plurality of icons from the first interaction workspace, the subset of the participating communication devices may be suspended from the first interaction and their representative icons may be grayed out or otherwise modified to reflect the suspension. Additionally, the subset of the participating communication devices may be fully muted with respect to the first interaction. Then, when the second interaction is terminated (or when a participant leaves the second interaction/interaction workspace), the subset of the participating communication devices (or the communication device corresponding to the participant) may return to the first interaction, where they (or it) may be reinstated with the same privileges and/or capabilities they had when they were suspended, and the icons corresponding to the subset of the participating communication devices within the first interaction may be restored to their original state. In such embodiments, the second interaction and interaction workspace serve as a virtual "second room," in which conversations or discussions need not be related to or affected by the conversation or discussion in the first interaction workspace. The second interaction may be terminated at a command from any participant of the second interaction, or at a command from the participant of the second interaction who issued the first command or caused the first command to be issued.

In some embodiments, a collaboration application 108 and or a collaboration service 120 may be configured to allow one or more participants to choose from among a plurality of parameters, settings, characteristics, and/or other items that define new interactions, and to save such parameters, settings, characteristics, and/or other items. Then, when new interactions are established, the saved parameters, settings, characteristics, and/or other items may be used to properly define and instantiate the new interactions.

In some embodiments, the first command of step 812 may be direction-specific, such that dragging a participant icon or a group of participant icons in a first direction generates or constitutes a command to create a second interaction that can subsequently be accessed by swiping or scrolling in the first direction, and dragging a participant icon or a group of participant icons in a second direction generates or constitutes a command to create another interaction that can subsequently be accessed by swiping or scrolling in the second direction, and so on. Thus, the present disclosure is not limited to the creation of a second interaction from a first interaction, but rather encompasses the creation of a plurality of additional interactions from a first interaction.

Also in some embodiments, a second interaction area may be created based on an existing private interaction area. For example, a participant may create a private interaction area within a first interaction workspace of a first interaction, and may then complete a predetermined action that causes the participants in the private interaction area to be transferred or otherwise joined to a new second interaction having a second interaction workspace. In such embodiments, the private interaction area of the first interaction workspace may remain in the first interaction workspace, and the participants therein may be suspended with respect to the first interaction, as described above. Alternatively, the private interaction area of the first interaction workspace may be closed or otherwise terminated, and the participants therein may be dropped or otherwise removed from the first interaction.

At least one benefit of systems and methods according to embodiments of the present disclosure is a reduction in the amount of data that must be exchanged via a communication network 112 or over a peer-to-peer connection between multiple communication devices 104, by reducing or eliminating the need to obtain information, signals, or commands from one or more communication devices participating in a multiparty interaction, and/or by reducing or eliminating the transmission of unnecessary or undesirable signals. For the same reasons, at least another benefit of systems and methods according to some embodiments of the present disclosure is that fewer processing steps are needed to implement various features and/or functions and/or to achieve desired or needed outcomes than are needed in the prior art, thus reducing the workload on one or more processors 208 and/or processors 308 and freeing those processors to work on other tasks. At least another benefit of systems and methods according to some embodiments of the present disclosure, which results from the benefits identified above, is that a collaboration server 116 and/or one or more communication devices 104 can implement various features and/or functions and/or achieve desired or needed outcomes more quickly than in the prior art.

More specifically, at least one benefit of the method 400 and systems employing the same, according to embodiments of the present disclosure, is a reduction in the amount of data that must be exchanged via a communication network 112 or over a peer-to-peer connection between multiple communication devices 104, because media signals that might otherwise have been transmitted from participants in the audience area are automatically muted. Similarly, at least another benefit of the method 400 and systems employing the same, according to embodiments of the present disclosure, is that the processor(s) 208 and/or 308, which provide filtering and multiplexing of media signals received from the various communication devices participating in a given multiparty interaction, need not filter and/or multiplex as many media signals (because of the automatic muting of the audio signals of communication devices corresponding to participants in the audience area). This reduced processing load frees up the processor(s) 208 and/or 308 to handle other processing tasks, consumes less power (which, though generally beneficial, is particularly beneficial if the communication device is a battery-powered mobile device), extends the lifespan of the processor(s) 208 and/or 308, and allows needed operations to be completed more quickly.

Similarly, at least one benefit of the method 500 and systems employing the same, according to embodiments of the present disclosure, is a reduction in the amount of data that must be exchanged via a communication network 112 or over a peer-to-peer connection between multiple communication devices 104, because rather than multiple participants talking over each other or otherwise trying to command the attention of other participants, the promotion queue allows participants to be promoted in an orderly manner and in such a way that the number of participants who may transmit media signals is limited to those in the presentation area. At least another benefit of the method 500 and systems employing the same, according to embodiments of the present disclosure, is that the processor(s) 208 and/or 308, which provide filtering and multiplexing of media signals received from the various communication devices participating in a given multiparty interaction, need not filter and/or multiplex as many media signals (because only those participants in the presentation area are enabled to transmit media signals, or at least certain media signals). This reduced processing load frees up the processor(s) 208 and/or 308 to handle other processing tasks, consumes less power (which, though generally beneficial, is particularly beneficial if the communication device is a battery-powered mobile device), extends the lifespan of the processor(s) 208 and/or 308, and allows needed operations to be completed more quickly.

Likewise, at least one benefit of the method 600 and systems employing the same, according to embodiments of the present disclosure, is a reduction in the amount of data that must be exchanged via a communication network 112 or over a peer-to-peer connection between multiple communication devices 104, because rather than allowing all participants in a multiparty interaction to send media signals simultaneously, the application of area-specific interaction capabilities (including, for example, capabilities related to which participants may transmit media signals to which other participants) to participants in any given area limits the extent to which media signals are transmitted. At least another benefit of the method 600 and systems employing the same, according to embodiments of the present disclosure, is that the processor(s) 208 and/or 308, which provide filtering and multiplexing of media signals received from the various communication devices participating in a given multiparty interaction, need not filter and/or multiplex as many media signals (because the area-specific interaction capabilities limit which participants may send various types of media signals). This reduced processing load frees up the processor(s) 208 and/or 308 to handle other processing tasks, consumes less power (which, though generally beneficial, is particularly beneficial if the communication device is a battery-powered mobile device), extends the lifespan of the processor(s) 208 and/or 308, and allows needed operations to be completed more quickly.

Additionally, at least one benefit of the method 700 and systems employing the same, according to embodiments of the present disclosure, is a reduction in the amount of data that must be exchanged via a communication network 112 or over a peer-to-peer connection between multiple communication devices 104, because rather than allowing all participants in a multiparty interaction to send media signals simultaneously, only participants in a presentation area and in a private interaction area are allowed to transmit at least certain media signals, and the media signals transmitted by participants in the private interaction area are only directed to other participants in the private interaction area. At least another benefit of the method 700 and systems employing the same, according to embodiments of the present disclosure, is that the processor(s) 208 and/or 308, which provide filtering and multiplexing of media signals received from the various communication devices participating in a given multiparty interaction, need not filter and/or multiplex as many media signals as they would if all participants in a multi-party interaction were enabled to send media signals simultaneously (because only participants in a presentation area and in a private interaction area are allowed to transmit at least certain media signals, and the media signals transmitted by participants in the private interaction area are only directed to other participants in the private interaction area). This reduced processing load frees up the processor(s) 208 and/or 308 to handle other processing tasks, consumes less power (which, though generally beneficial, is particularly beneficial if the communication device is a battery-powered mobile device), extends the lifespan of the processor(s) 208 and/or 308, and allows needed operations to be completed more quickly. Additionally, another benefit of the method 700 and systems employing the same, according to embodiments of the present disclosure, is that it allows a single communication device to facilitate receipt of communications from a presenter participant in a multiparty interaction while also facilitating transmission and receipt of communications among participants in the multiparty interaction in the private interaction area, whereas before the present disclosure, the communications among participants in the private interaction area likely would have occurred via a separate communication network (e.g. a cellular network) and/or with separate communication devices (e.g. cellular phones).

Further, at least one benefit of the method 800 and systems employing the same, according to embodiments of the present disclosure, is a reduction in the amount of data that must be exchanged via a communication network 112 or over a peer-to-peer connection between multiple communication devices 104, because authentication information, presentation materials, and/or interaction settings for a second interaction need not be requested and/or received from one or more communication devices. For the same reasons, at least another benefit of the method 600 and systems employing the same, according to embodiments of the present disclosure, is that the processor(s) 208 and/or 308 need not perform as many operations to establish a second interaction. This reduced processing load frees up the processor(s) 208 and/or 308 to handle other processing tasks, consumes less power (which, though generally beneficial, is particularly beneficial if the communication device is a battery-powered mobile device), extends the lifespan of the processor(s) 208 and/or 308, and allows needed operations to be completed more quickly. Indeed, at least another benefit of the method 800 and systems employing the same, according to embodiments of the present disclosure, is that a collaboration server 116 and/or one or more communication devices 104 can establish a second interaction more quickly than in the prior art.

As persons of ordinary skill in the art will appreciate based on the foregoing disclosure, certain steps in methods according to the present disclosure may be carried out by a communication device, while other steps in methods according to the present disclosure may be carried out by a collaboration server. In some embodiments, for example, a collaboration server may assign or associate one or more communication devices participating in a multiparty interaction with one or more areas of the multiparty interaction (e.g. with an audience area, a presentation area, or a private interaction area), but may not display icons corresponding to the one or more communication devices in a visual representation of the one or more areas. Similarly, and also by way of example, a communication device may display, in a visual representation of one or more areas of a multiparty interaction, icons corresponding to the one or more communication devices participating in the multiparty interaction, but may or may not receive a request or command to associate, assign, or reassign a particular communication device to another area of the multiparty interaction. Additionally, a communication device may be used to host a multiparty interaction (e.g. via a peer-to-peer network), or it may be used to participate in a multiparty interaction hosted by a collaboration server or by another communication device. Based on whether the communication device is hosting the multiparty interaction or not, the communication device may perform more or fewer steps of a method according to embodiments of the present disclosure.

The exemplary systems and methods of this disclosure have been described in relation to communication devices, systems, and methods for use in multiparty interactions. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein.

Furthermore, while the exemplary aspects, embodiments, options, and/or configurations illustrated herein show the various components of a device or system collocated, certain components of the system can be located remotely, at distant portions of a distributed network, such as a LAN and/or the Internet, or within a dedicated system. Additionally, it should be appreciated that some components of a system can be combined into one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet other embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In other embodiments, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

What is claimed is:

1. A method comprising:
    establishing a collaboration interaction among a plurality of communication devices, each of the plurality of communication devices corresponding to one of a plurality of participants in the collaboration interaction, the collaboration interaction comprising at least one media channel via which media signals received from any one of the plurality of communication devices can be sent to the remaining ones of the plurality of communication devices;
    sending a first instruction to a first communication device of the plurality of communication devices that causes the first communication device to display, via a graphical user interface of the first communication device, an interaction workspace for the collaboration interaction comprising a plurality of icons distributed between a first area for the collaboration interaction having a first muting behavior and a second area for the collaboration interaction having a second muting behavior, each of the plurality of icons corresponding to one of the plurality of participants;
    applying the first muting behavior for the collaboration interaction when each one of the plurality of communication devices corresponding to the ones of the plurality of icons is displayed in the first area for the collaboration interaction and the second muting behavior when each one of the plurality of communication devices corresponding to the ones of the plurality of icons is displayed in the second area for the collaboration interaction, and
    receiving a second instruction from the first communication device that indicates that an individual participant of the plurality of participants has dragged a texting tool onto an icon representing the individual participant to send a text message to every other participant in the collaboration interaction.

2. The method of claim 1, wherein the first muting behavior comprises muting the media signals received from each of the plurality of communication devices corresponding to one of the plurality of icons displayed in the first area for the collaboration interaction and the second muting behavior comprises unmuting the media signals received from each of the plurality of communication devices corresponding to one of the plurality of icons displayed in the second area for the collaboration interaction.

3. The method of claim 1, wherein the first muting behavior comprises unmuting the media signals received from each of the plurality of communication devices corresponding to one of the plurality of icons displayed in the first area for the collaboration interaction and the second muting behavior comprises muting the media signals received from each of the plurality of communication devices corresponding to one of the plurality of icons displayed in the second area for the collaboration interaction.

4. The method of claim 1, wherein the first area for the collaboration interaction is an audience area and the second area for the collaboration interaction is a presentation area.

5. The method of claim 1, further comprising:
    receiving a first request to move one of the plurality of icons from the first area for the collaboration interaction to the second area for the collaboration interaction;
    in response to the first request, sending a third instruction to the first communication device that causes the first communication device to display, via the graphical user interface, the one of the plurality of icons in the second area for the collaboration interaction; and
    applying the second muting behavior to the one of the plurality of communication devices corresponding to the one of the plurality of icons in response to the first request.

6. The method of claim 2, wherein the muting comprises sending an instruction that causes each of the plurality of communication devices corresponding to one of the plurality of icons displayed in the first area for the collaboration interaction to stop sending media signals via the at least one media channel.

7. The method of claim 2, wherein the muting comprises executing an instruction that causes media signals received via the at least one media channel from each of the plurality of communication devices corresponding to one of the plurality of icons displayed in the first area for the collaboration interaction not to be sent to the remaining ones of the plurality of communication devices.

8. The method of claim 2, wherein the muting comprises sending an instruction that causes media signals received via the at least one media channel from each of the plurality of communication devices corresponding to one of the plurality of icons displayed in the first area for the collaboration interaction and sent via the at least one media channel to each of the remaining ones of the plurality of communication devices to be ignored by each of the remaining ones of the plurality of communication devices.

9. The method of claim 5, wherein the first request comprises an indication that one of the plurality of participants has moved one of the plurality of icons from the first area for the collaboration interaction to the second area for the collaboration interaction.

10. The method of claim 1, wherein the first muting behavior mutes a video stream of the collaboration interaction and does not mute an audio stream of the collaboration interaction.

11. The method of claim 1, wherein the interaction workspace further comprises a third area having a third muting behavior, the method further comprising:
sending a second instruction to the first communication device that causes the first communication device to display, via the graphical user interface, at least two of the plurality of icons in the third area; and
applying the third muting behavior when each one of the plurality of communication devices corresponding to the ones of the plurality of icons are displayed in the third area,
wherein the third muting behavior comprises muting the media signals received from each of the plurality of communication devices corresponding to ones of the plurality of icons displayed in the third area with respect to each of the plurality of communication devices corresponding to the ones of the plurality of icons displayed in the first and second areas for the collaboration interaction, and unmuting the media signals received from each one of the plurality of communication devices corresponding to the ones of the plurality of icons displayed in the third area with respect to every other one of the plurality of communication devices corresponding to the ones of the plurality of icons displayed in the third area.

12. A server comprising:
a communication interface for sending signals to, and receiving signals from, a first communication device;
a processor; and
a memory, the memory storing instructions for execution by the processor that, when executed by the processor, cause the processor to:
send a first instruction to the first communication device that causes the first communication device to display, on a graphical user interface of the first communication device, an interaction workspace for a collaboration interaction comprising a plurality of icons distributed between a first area for the collaboration interaction having a first muting behavior and a second area for the collaboration interaction having a second muting behavior, each of the plurality of icons corresponding to one of a plurality of communication devices, wherein the plurality of communication devices includes the first communication device;
apply the first muting behavior for the collaboration interaction when each one of the plurality of communication devices corresponding to one of the plurality of icons is displayed in the first area for the collaboration interaction, and the second muting behavior when each one of the plurality of communication devices corresponding to one of the plurality of icons is displayed in the second area for the collaboration interaction;
in response to a request to move a first one of the plurality of icons from the first area for the collaboration interaction to the second area for the collaboration interaction, send a second instruction to the first communication device that causes the first communication device to display, on the graphical user interface, the first one of the plurality of icons in the second area for the collaboration interaction;
apply the second muting behavior to the first one of the plurality of icons in response to the request; and
receiving a third instruction from the first communication device that indicates that an individual participant of a plurality of participant has dragged a texting tool onto an icon representing the individual participant to send a text message to every other participant in the collaboration interaction.

13. The server of claim 12, wherein the first area for the collaboration interaction is an audience area and the second area for the collaboration interaction is a presentation area.

14. The server of claim 12, wherein the first muting behavior comprises muting media signals from each of the plurality of communication devices corresponding to one of the plurality of icons displayed in the first area for the collaboration interaction, and the second muting behavior comprises unmuting media signals from each of the plurality of communication devices corresponding to one of the plurality of icons displayed in the second area for the collaboration interaction.

15. The server of claim 14, wherein the media signals comprise at least one of audio signals and video signals.

16. The server of claim 12, wherein the request is received via the communication interface.

17. A collaboration server comprising:
a communication interface;
a processor; and
a memory, the memory storing instructions for execution by the processor that, when executed by the processor, cause the processor to:
establish a collaboration interaction among a plurality of communication devices, the collaboration interaction comprising at least one media channel via which media signals received from any one of the plurality of communication devices can be sent to the remaining ones of the plurality of communication devices;
assign at least one of the plurality of communication devices of the collaboration interaction to a first area for the collaboration interaction and a remainder of the plurality of communication devices to a second area of the collaboration interaction;
apply a first muting behavior when each one of the plurality of communication devices is assigned to the first area of the collaboration interaction and a second muting behavior when each one of the plurality of communication devices is assigned to the second area of the collaboration interaction;
receive a first request from one of the plurality of communication devices assigned to the first area of the collaboration interaction to be reassigned to the second area of the collaboration interaction;
in response to the first request, reassign the one of the plurality of communication devices to the second area of the collaboration interaction and apply the second muting behavior to the one of the plurality of communication devices; and
receiving a second request from the one of the plurality of communication devices that indicates that an individual participant of a plurality of participant has dragged a texting tool onto an icon representing the individual participant to send a text message to every other participant in the collaboration interaction.

18. The collaboration server of claim 17, wherein the first muting behavior comprises muting the media signals received from each of the plurality of communication devices associated with the first area for the collaboration interaction, and the second muting behavior comprises unmuting the media signals received from each of the plurality of communication devices associated with the second area for the collaboration interaction.

19. The collaboration server of claim 17, wherein the media signals comprise at least one of audio signals or video signals.

20. The server of claim 12, wherein the first muting behavior mutes a video stream of the collaboration interaction and does not mute an audio stream of the collaboration interaction.

* * * * *

UNITED STATES PATENT AND TRADEMARK OFFICE
CERTIFICATE OF CORRECTION

PATENT NO. : 10,250,848 B2
APPLICATION NO. : 15/173350
DATED : April 2, 2019
INVENTOR(S) : John H. Yoakum Page 1 of 1

It is certified that error appears in the above-identified patent and that said Letters Patent is hereby corrected as shown below:

In the Claims

At Column 58, Line 5, delete "interaction," and replace it with --interaction;-- therein.

At Column 60, Line 9, delete "participant" and replace it with --participants-- therein.

At Column 60, Line 64, delete the second occurrence of "participant" and replace it with --participants-- therein.

Signed and Sealed this
Fourteenth Day of May, 2019

Andrei Iancu
*Director of the United States Patent and Trademark Office*